United States Patent
Kim et al.

(10) Patent No.: US 11,044,470 B2
(45) Date of Patent: Jun. 22, 2021

(54) VIDEO SIGNAL PROCESSING METHOD AND DEVICE USING REFERENCE SAMPLE

(71) Applicants: WILUS INSTITUTE OF STANDARDS AND TECHNOLOGY INC., Seongnam-si (KR); HUMAX CO., LTD., Yongin-si (KR)

(72) Inventors: Dongcheol Kim, Suwon-Si (KR); Geonjung Ko, Seoul (KR); Jaehong Jung, Seoul (KR); Juhyung Son, Uiwang-Si (KR); Jinsam Kwak, Anyang-Si (KR)

(73) Assignees: Wilus Institute of Standards and Technology Inc., Seongnam-si (KR); Humax Co., Ltd., Yongin-si (KR)

( * ) Notice: Subject to any disclaimer, the term of this patent is extended or adjusted under 35 U.S.C. 154(b) by 0 days.

(21) Appl. No.: 17/089,267

(22) Filed: Nov. 4, 2020

(65) Prior Publication Data

US 2021/0051319 A1    Feb. 18, 2021

Related U.S. Application Data

(63) Continuation of application No. PCT/KR2019/005750, filed on May 13, 2019.

(30) Foreign Application Priority Data

May 12, 2018 (KR) .......................... 10-2018-0054588
May 25, 2018 (KR) .......................... 10-2018-0059797
(Continued)

(51) Int. Cl.
*H04N 19/105* (2014.01)
*H04N 19/176* (2014.01)

(52) U.S. Cl.
CPC .......... *H04N 19/105* (2014.11); *H04N 19/176* (2014.11)

(58) Field of Classification Search
CPC combination set(s) only.
See application file for complete search history.

(56) References Cited

U.S. PATENT DOCUMENTS

2020/0304806 A1 * 9/2020 Zhao .................... H04N 19/593

FOREIGN PATENT DOCUMENTS

| KR | 101348544 B1 |   | 12/2013 |
| KR | 101348544 B1 | * | 1/2014 |

(Continued)

OTHER PUBLICATIONS

International Search Report & Written Opinion of the International Searching Authoriity_PCT/KR2019/005750_dated Sep. 10, 2019.

*Primary Examiner* — Joon Kwon

(57) ABSTRACT

A video signal processing method comprises the steps of: acquiring reference samples on a first side of a current block and reference samples on a second side thereof on the basis of pre-restored samples neighboring the current block; acquiring a direct current (DC) value for a prediction of the current block on the basis of a reference sample set composed of at least some of the reference samples on the first side and the reference samples on the second side, wherein the reference sample set includes the number of reference samples raised to a power of 2, obtained by excluding some of the reference samples on the first side and the reference samples on the second side, if the length of the first side and the length of the second side are different; and restoring the current block on the basis of the DC value.

20 Claims, 29 Drawing Sheets

(30) Foreign Application Priority Data

Jun. 12, 2018 (KR) ........................ 10-2018-0067786
Jul. 2, 2018 (KR) ........................ 10-2018-0076740

(56) References Cited

FOREIGN PATENT DOCUMENTS

| | | | |
|---|---|---|---|
| KR | 1020170026276 A | 3/2017 |
| KR | 1020180009318 A | 1/2018 |
| KR | 1020180030791 A | 3/2018 |
| KR | 1020180040577 A | 4/2018 |

\* cited by examiner (a) Luma QTBT structure  (b) Chroma QTBT structure

VIDEO SIGNAL PROCESSING METHOD AND DEVICE USING REFERENCE SAMPLE

CROSS-REFERENCE TO RELATED APPLICATIONS

This application is a continuation of pending PCT International Application No. PCT/KR2019/005750, which was filed on May 13, 2019, and which claims priority under 35 U.S.C 119(a) to Korean Patent Application No. 10-2018-0054588 filed with the Korean Intellectual Property Office on May 12, 2018, Korean Patent Application No. 10-2018-0059797 filed with the Korean Intellectual Property Office on May 25, 2018, Korean Patent Application No. 10-2018-0067786 filed with the Korean Intellectual Property Office on Jun. 12, 2018, and Korean Patent Application No. 10-2018-0076740 filed with the Korean Intellectual Property Office on Jul. 2, 2018. The disclosures of the above patent applications are incorporated herein by reference in their entirety.

TECHNICAL FIELD

The present invention relates to a video signal processing method and apparatus, and more particularly, to a video signal processing method and apparatus for encoding or decoding a video signal.

BACKGROUND ART

Compression coding refers to a series of signal processing techniques for transmitting digitized information through a communication line or storing information in a form suitable for a storage medium. An object of compression encoding includes objects such as voice, video, and text, and in particular, a technique for performing compression encoding on an image is referred to as video compression. Compression coding for a video signal is performed by removing excess information in consideration of spatial correlation, temporal correlation, and stochastic correlation. However, with the recent development of various media and data transmission media, a more efficient video signal processing method and apparatus are required.

DETAILED DESCRIPTION OF THE INVENTION

Technical Problem

The present invention has an object to increase the coding efficiency of a video signal. In addition, the present invention has an object to increase signaling efficiency related to prediction of the current block using reference samples of the current block.

Technical Solution

In order to solve the above problems, the present disclosure provides a video signal processing device and a video signal processing method as follows.

First, an embodiment of the present disclosure provides a video signal processing method including: obtaining reference samples on a first side and reference samples on a second side of a current block based on pre-reconstructed samples around the current block; obtaining a direct current (DC) value for prediction of the current block based on a reference sample set including at least some of the reference samples on the first side and the reference samples on the second side, the reference sample set including $2^n$ reference samples, excluding some reference samples from the reference samples on the first side and the reference samples on the second side, if a length of the first side and a length of the second side are different from each other; and reconstructing the current block based on the DC value.

In addition, an embodiment of the present disclosure may provide a video signal decoding device including a processor, and the processor may be configured to obtain reference samples on a first side and reference samples on a second side of a current block based on pre-reconstructed samples around the current block, obtain a direct current (DC) value for prediction of the current block based on a reference sample set including at least some of the reference samples on the first side and the reference samples on the second side, the reference sample set including $2^n$ reference samples, excluding some reference samples from the reference samples on the first side and the reference samples on the second side, if a length of the first side and a length of the second side are different from each other, and reconstruct the current block based on the DC value.

The reference sample set may include $2^n$ reference samples, excluding as many as reference samples corresponding to the length of the shorter one of the first side and the second side from all of the reference samples on the first side and the reference samples on the second side.

The reference sample set may include reference samples on any one side of the first side and the second side of the current block.

The reference sample set may include reference samples on the longer one of the first side and the second side.

The reference sample set may include the remaining reference samples, excluding reference samples on the shorter one of the first side and the second side from the reference samples on the first side and the reference samples on the second side.

The processor may be configured to compare the length of the first side with the length of the second side, and if the length of the first side is greater than the length of the second side as a result of the comparison, obtain the DC value based on the reference sample set including the reference samples on the first side.

The processor may be configured to obtain the DC value based on an average of the reference samples on the first side if the length of the first side is greater than the length of the second side.

The processor may be configured to obtain the DC value based on the length of the longer one of the first side and the second side as a result of the comparison.

In addition, an embodiment of the present disclosure may provide a video signal encoding device including a processor, and the processor may be configured to obtain reference samples on a first side and reference samples on a second side of a current block based on pre-reconstructed samples around the current block, obtain a direct current (DC) value for prediction of the current block based on a reference sample set including at least some of the reference samples on the first side and the reference samples on the second side, the reference sample set including $2^n$ reference samples, excluding some reference samples from the reference samples on the first side and the reference samples on the second side, if a length of the first side and a length of the second side are different from each other, generate a prediction block of the current block based on the DC value, obtain a residual signal of the current block based on the prediction block, and generate a bitstream including the residual signal of the current block.

In addition, an embodiment of the present disclosure may provide a computer-readable recording medium storing a bitstream, and the bitstream may include information on an intra-prediction mode of an intra-predicted current block among blocks obtained by dividing a picture constituting a video into a hierarchical structure, and a residual signal of the current block. The computer-readable recording medium may include the bitstream that is obtained through the steps of obtaining reference samples on a first side and reference samples on a second side of a current block based on pre-reconstructed samples around the current block, obtaining a direct current (DC) value for prediction of the current block based on a reference sample set including at least some of the reference samples on the first side and the reference samples on the second side, the reference sample set including $2^n$ reference samples, excluding some reference samples from the reference samples on the first side and the reference samples on the second side, if a length of the first side and a length of the second side are different from each other, and predicting the current block based on the DC value.

In addition, an embodiment of the present disclosure may provide a video signal processing device including a processor, and the processor may be configured to obtain reference samples on a first side and reference samples on a second side of a current block based on pre-reconstructed samples around the current block, if a length of the first side and a length of the second side are different from each other, obtain a direct current (DC) value for prediction of the current block based on the remaining reference samples, excluding the reference samples on any one side of the first side and the second side from the plurality of reference samples, and predict the current block based on the DC value. In this case, the first side and the second signal may be perpendicular to each other.

The processor may obtain the DC value based on an average of the reference samples on the one side.

The one side may be the longer one of the first side and the second side. In this case, the processor may obtain the DC value based on the reference samples on the longer one of the first side and the second side.

The processor may be configured to compare the length of the first side with the length of the second side, and if the length of the second side is greater than the length of the first side as a result of the comparison, obtain the DC value based on an average of the reference samples on the second side.

The number of reference samples on the first side and the number of reference samples on the second side may be 2 to the power of n, respectively. The sum of the number of reference samples on the first side and the number of reference samples on the second side may not be 2 to the power of n.

Advantageous Effects

According to an embodiment of the present disclosure, it is possible to improve efficiency for coding a video signal. In addition, according to an embodiment of the present disclosure, it is possible to enhance prediction performance in intra-prediction of a current block.

According to an embodiment of the present disclosure, it is possible to reduce the computational complexity required for generation of a prediction block of a current block.

MODE FOR CARRYING OUT THE INVENTION

Terms used in this specification may be currently widely used general terms in consideration of functions in the present invention but may vary according to the intents of those skilled in the art, customs, or the advent of new technology. Additionally, in certain cases, there may be terms the applicant selects arbitrarily and, in this case, their meanings are described in a corresponding description part of the present invention. Accordingly, terms used in this specification should be interpreted based on the substantial meanings of the terms and contents over the whole specification.

In this specification, some terms may be interpreted as follows. Coding may be interpreted as encoding or decoding in some cases. In the present specification, an apparatus for generating a video signal bitstream by performing encoding (coding) of a video signal is referred to as an encoding apparatus or an encoder, and an apparatus that performs decoding (decoding) of a video signal bitstream to reconstruct a video signal is referred to as a decoding apparatus or decoder. In addition, in this specification, the video signal processing apparatus is used as a term of a concept including both an encoder and a decoder. Information is a term including all values, parameters, coefficients, elements, etc. In some cases, the meaning is interpreted differently, so the present invention is not limited thereto. 'Unit' is used as a meaning to refer to a basic unit of image processing or a specific position of a picture, and refers to an image region including both a luma component and a chroma component. In addition, 'block' refers to an image region including a specific component among luma components and chroma components (i.e., Cb and Cr). However, depending on the embodiment, terms such as 'unit', 'block', 'partition' and 'region' may be used interchangeably. In addition, in this specification, a unit may be used as a concept including all of a coding unit, a prediction unit, and a transform unit. The picture indicates a field or frame, and according to an embodiment, the terms may be used interchangeably.

Figure 1:
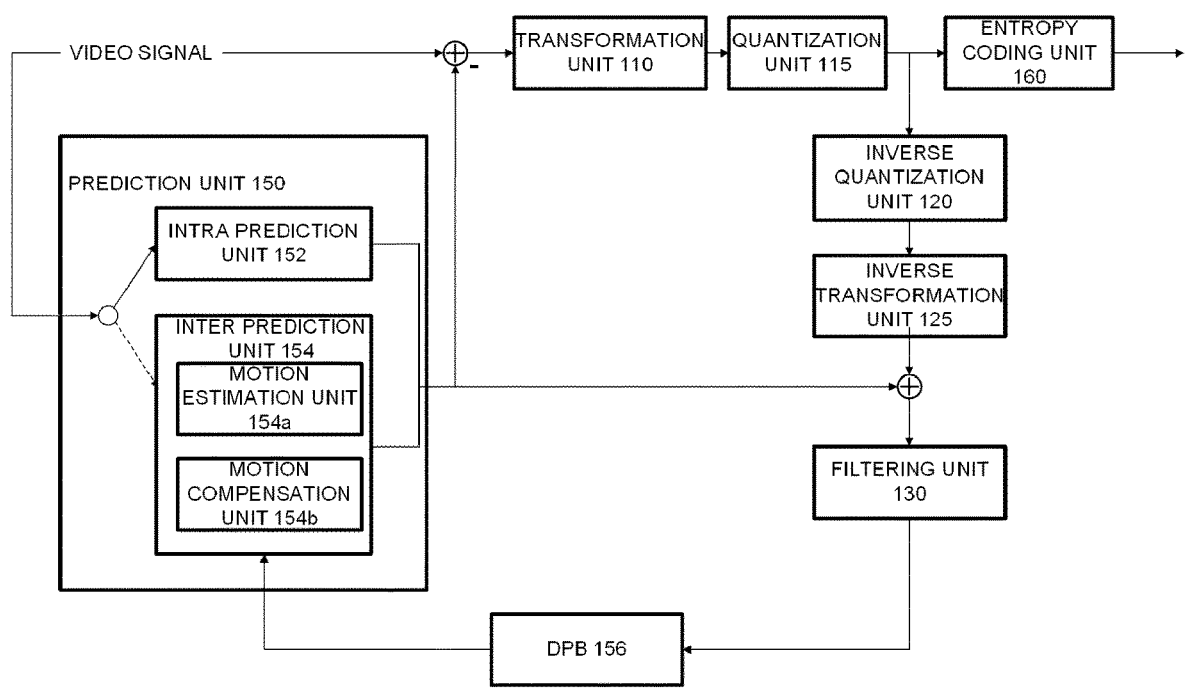
FIG. 1 is a schematic block diagram of a video signal encoding apparatus according to an embodiment of the present invention.

FIG. 1 is a schematic block diagram of a video signal encoding apparatus according to an embodiment of the present invention. Referring to FIG. 1, the encoding apparatus 100 of the present invention includes a transformation unit 110, a quantization unit 115, an inverse quantization unit 120, an inverse transformation unit 125, a filtering unit 130, a prediction unit 150, and an entropy coding unit 160.

The transformation unit 110 obtains a value of a transform coefficient by transforming a residual signal, which is a difference between the inputted video signal and the predicted signal generated by the prediction unit 150. For example, a Discrete Cosine Transform (DCT), a Discrete Sine Transform (DST), or a Wavelet Transform can be used. The DCT and DST perform transformation by splitting the input picture signal into blocks. In the transformation, coding efficiency may vary according to the distribution and characteristics of values in the transformation region. The quantization unit 115 quantizes the value of the transform coefficient value outputted from the transformation unit 110.

In order to improve coding efficiency, instead of coding the picture signal as it is, a method of predicting a picture using a region already coded through the prediction unit 150 and obtaining a reconstructed picture by adding a residual value between the original picture and the predicted picture to the predicted picture is used. In order to prevent mismatches in the encoder and decoder, information that can be used in the decoder should be used when performing prediction in the encoder. For this, the encoder performs a process of reconstructing the encoded current block again. The inverse quantization unit 120 inverse-quantizes the value of the transform coefficient, and the inverse transformation unit 125 reconstructs the residual value using the inverse quantized transform coefficient value. Meanwhile, the filtering unit 130 performs filtering operations to improve the quality of the reconstructed picture and to improve the coding efficiency. For example, a deblocking filter, a sample adaptive offset (SAO), and an adaptive loop filter may be included. The filtered picture is outputted or stored in a decoded picture buffer (DPB) 156 for use as a reference picture.

The prediction unit 150 includes an intra prediction unit 152 and an inter prediction unit 154. The intra prediction unit 152 performs intra prediction in the current picture, and the inter prediction unit 154 performs inter prediction to predict the current picture by using the reference picture stored in the DPB 156. The intra prediction unit 152 performs intra prediction from reconstructed samples in the current picture, and transmits intra coding information to the entropy coding unit 160. The intra encoding information may include at least one of an intra prediction mode, a Most Probable Mode (MPM) flag, and an MPM index. The inter prediction unit 154 may include a motion estimation unit 154a and a motion compensation unit 154b. The motion estimation unit 154a refers to a specific region of the reconstructed reference picture to obtain a motion vector value of the current region. The motion estimation unit 154a transmits motion information set (reference picture index, motion vector information, etc.) on the reference region to the entropy coding unit 160. The motion compensation unit 154b performs motion compensation using the motion vector value transmitted from the motion estimation unit 154*a*. The inter prediction unit 154 transmits inter encoding information including motion information set on a reference region to the entropy coding unit 160.

According to an additional embodiment, the prediction unit 150 may include an intra-block copy (BC) prediction unit (not shown). The intra-BC prediction unit performs intra-BC prediction based on reconstructed samples in the current picture, and transmits intra-BC encoding information to the entropy coding unit 160. The intra-BC prediction unit obtains a block vector value of the current area with reference to a specific area in the current picture. The intra-BC prediction unit may perform intra-BC prediction using the obtained block vector value. The intra-BC prediction unit transmits intra-BC encoding information to the entropy coding unit 160. The intra-BC encoding information may include block vector information.

When the picture prediction described above is performed, the transformation unit 110 transforms a residual value between the original picture and the predicted picture to obtain a transform coefficient value. In this case, the transformation may be performed in a specific block unit within a picture, and the size of a specific block may be varied within a preset range. The quantization unit 115 quantizes the transform coefficient value generated in the transformation unit 110 and transmits it to the entropy coding unit 160.

The entropy coding unit 160 entropy-codes quantized transform coefficients, intra coding information, and inter coding information to generate a video signal bitstream. In the entropy coding unit 160, a variable length coding (VLC) method, an arithmetic coding method, or the like can be used. The VLC method transforms inputted symbols into successive codewords, and the length of the codewords may be variable. For example, frequently occurring symbols are expressed as short codewords, and less frequently occurring symbols are expressed as long codewords. As the VLC method, a context-based adaptive variable length coding (CAVLC) method may be used. Arithmetic coding transforms successive data symbols into a single decimal point, and arithmetic coding can obtain the optimal number of decimal bits needed to represent each symbol. As arithmetic coding, context-based adaptive arithmetic coding (CABAC) may be used.

The generated bitstream is encapsulated using a network abstraction layer (NAL) unit as a basic unit. The NAL unit includes an integer number of coded coding tree units. In order to decode a bitstream in a video decoder, first, the bitstream must be separated in NAL units, and then each separated NAL unit must be decoded. Meanwhile, information necessary for decoding a video signal bitstream may be transmitted through an upper level set of Raw Byte Sequence Payload (RBSP) such as Picture Parameter Set (PPS), Sequence Parameter Set (SPS), Video Parameter Set (VPS), and the like.

Meanwhile, the block diagram of FIG. 1 shows an encoding apparatus 100 according to an embodiment of the present invention, and separately displayed blocks logically distinguish and show the elements of the encoding apparatus 100. Accordingly, the elements of the above-described encoding apparatus 100 may be mounted as one chip or as a plurality of chips depending on the design of the device. According to an embodiment, the operation of each element of the above-described encoding apparatus 100 may be performed by a processor (not shown).

Figure 2:
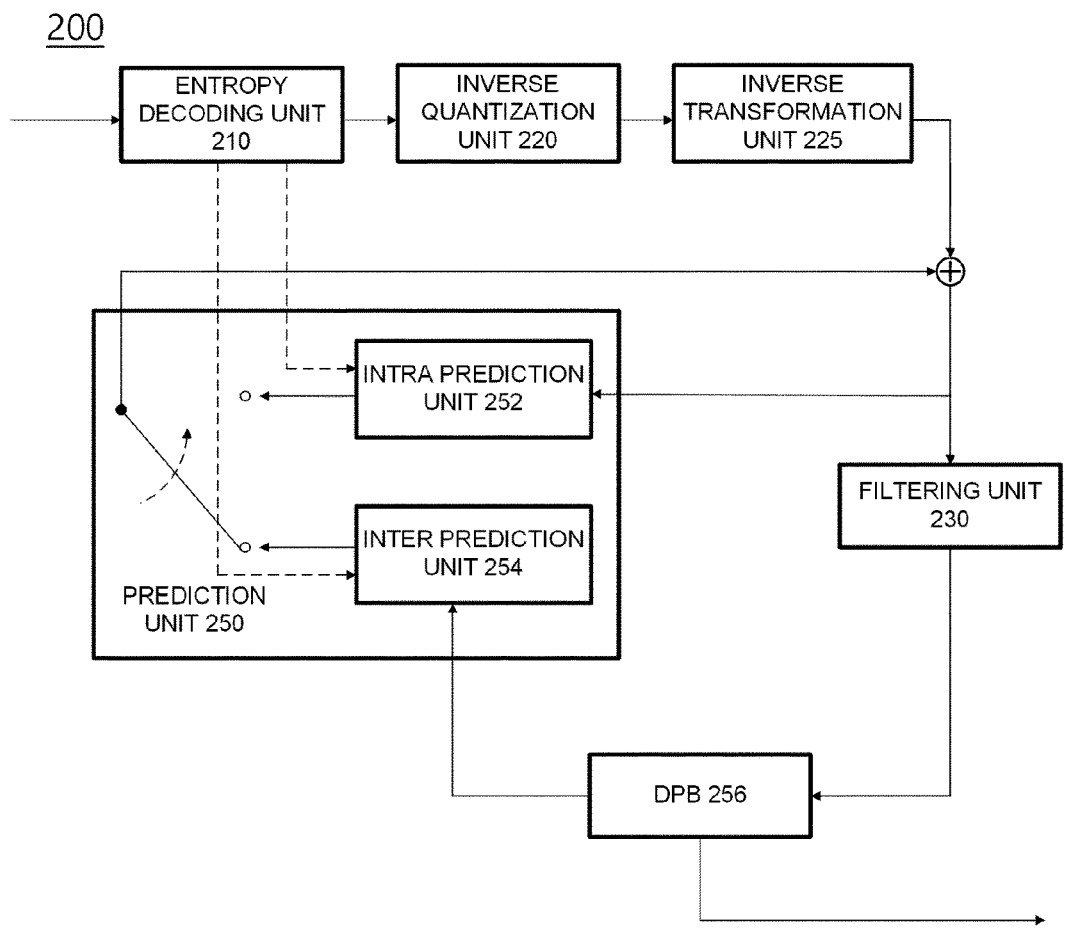
FIG. 2 is a schematic block diagram of a video signal decoding apparatus according to an embodiment of the present invention.

FIG. 2 is a schematic block diagram of a video signal decoding apparatus 200 according to an embodiment of the present invention. Referring to FIG. 2, the decoding apparatus 200 of the present invention includes an entropy decoding unit 210, an inverse quantization unit 220, an inverse transformation unit 225, a filtering unit 230, and a prediction unit 250.

The entropy decoding unit 210 entropy-decodes a video signal bitstream, and extracts transform coefficients, intra encoding information, and inter encoding information for each region. The inverse quantization unit 220 inverse-quantizes the entropy decoded transform coefficient, and the inverse transformation unit 225 reconstructs the residual value using the inverse quantized transform coefficient. The video signal processing apparatus 200 reconstructs the original pixel value by adding the residual value obtained in the inverse transformation unit 225 and the predictor obtained in the prediction unit 250.

Meanwhile, the filtering unit 230 performs filtering on a picture to improve image quality. This may include a deblocking filter for reducing block distortion and/or an adaptive loop filter for removing distortion of the entire picture. The filtered picture is outputted or stored in the DPB 256 for use as a reference picture for the next picture.

The prediction unit 250 includes an intra prediction unit 252 and an inter prediction unit 254. The prediction unit 250 generates a prediction picture by using the encoding type decoded through the entropy decoding unit 210 described above, transform coefficients for each region, and intra/inter encoding information. In order to reconstruct a current block in which decoding is performed, a decoded region of the current picture or other pictures including the current block may be used. In a reconstruction, only a current picture, that is, a picture (or, tile/slice) that performs only intra prediction or intra BC prediction, is called an intra picture or an I picture (or, tile/slice), and a picture (or, tile/slice) that can perform all of intra prediction, inter prediction, and intra BC prediction is called an inter picture (or, tile/slice). In order to predict sample values of each block among inter pictures (or, tiles/slices), a picture (or, tile/slice) using up to one motion vector and a reference picture index is called a predictive picture or P picture (or, tile/slice), and a picture (or tile/slice) using up to two motion vectors and a reference picture index is called a bi-predictive picture or a B picture (or tile/slice). In other words, the P picture (or, tile/slice) uses up to one motion information set to predict each block, and the B picture (or, tile/slice) uses up to two motion information sets to predict each block. Here, the motion information set includes one or more motion vectors and one reference picture index.

The intra prediction unit 252 generates a prediction block using the intra encoding information and reconstructed samples in the current picture. As described above, the intra encoding information may include at least one of an intra prediction mode, a Most Probable Mode (MPM) flag, and an MPM index. The intra prediction unit 252 predicts the sample values of the current block by using the reconstructed samples located on the left and/or upper side of the current block as reference samples. In this disclosure, reconstructed samples, reference samples, and samples of the current block may represent pixels. Also, sample values may represent pixel values.

According to an embodiment, the reference samples may be samples included in a neighboring block of the current block. For example, the reference samples may be samples on the line adjacent to the left boundary of the current block and/or samples on the line adjacent to the upper boundary thereof. Also, the reference samples may be samples located on a line within a predetermined distance from the left boundary of the current block and/or samples located on a line within a predetermined distance from the upper boundary of the current block among the samples of neighboring blocks of the current block. In this case, the neighboring block of the current block may include the left (L) block, the upper (A) block, the below left (BL) block, the above right (AR) block, or the above left (AL) block.

The inter prediction unit 254 generates a prediction block using reference pictures and inter encoding information stored in the DPB 256. The inter coding information may include motion information set (reference picture index, motion vector information, etc.) of the current block for the reference block. Inter prediction may include L0 prediction, L1 prediction, and bi-prediction. L0 prediction means prediction using one reference picture included in the L0 picture list, and L1 prediction means prediction using one reference picture included in the L1 picture list. For this, one set of motion information (e.g., motion vector and reference picture index) may be required. In the bi-prediction method, up to two reference regions may be used, and the two reference regions may exist in the same reference picture or may exist in different pictures. That is, in the bi-prediction method, up to two sets of motion information (e.g., a motion vector and a reference picture index) may be used and two motion vectors may correspond to the same reference picture index or different reference picture indexes. In this case, the reference pictures may be displayed (or outputted) both before and after the current picture in time aspect.

The inter prediction unit 254 may obtain a reference block of the current block using a motion vector and a reference picture index. The reference block is in a reference picture corresponding to a reference picture index. Also, a sample value of a block specified by a motion vector or an interpolated value thereof can be used as a predictor of the current block. For motion prediction with sub-pel unit pixel accuracy, for example, an 8-tap interpolation filter for a luma signal and a 4-tap interpolation filter for a chroma signal can be used. However, the interpolation filter for motion prediction in sub-pel units is not limited thereto. In this way, the inter prediction unit 254 performs motion compensation to predict the texture of the current unit from motion pictures reconstructed previously. In this case, the inter prediction unit may use a motion information set.

According to an additional embodiment, the prediction unit 250 may include an intra-BC prediction unit (not shown). The intra-BC prediction unit performs intra-BC prediction based on reconstructed samples in the current picture, and transmits intra-BC encoding information to the entropy coding unit 160. The intra-BC prediction unit obtains a block vector value of the current area with reference to a specific area in the current picture. The intra-BC prediction unit may perform intra-BC prediction using the obtained block vector value. The intra-BC prediction unit transmits intra-BC encoding information to the entropy coding unit 160. The intra-BC encoding information may include block vector information.

The reconstructed video picture is generated by adding the predictor outputted from the intra prediction unit 252 or the inter prediction unit 254 and the residual value outputted from the inverse transformation unit 225. That is, the video signal decoding apparatus 200 reconstructs the current block using the prediction block generated by the prediction unit 250 and the residual obtained from the inverse transformation unit 225.

Meanwhile, the block diagram of FIG. 2 shows a decoding apparatus 200 according to an embodiment of the present invention, and separately displayed blocks logically distinguish and show the elements of the decoding apparatus 200. Accordingly, the elements of the above-described decoding apparatus 200 may be mounted as one chip or as a plurality of chips depending on the design of the device. According to an embodiment, the operation of each element of the above-described decoding apparatus 200 may be performed by a processor (not shown).

Figure 3:
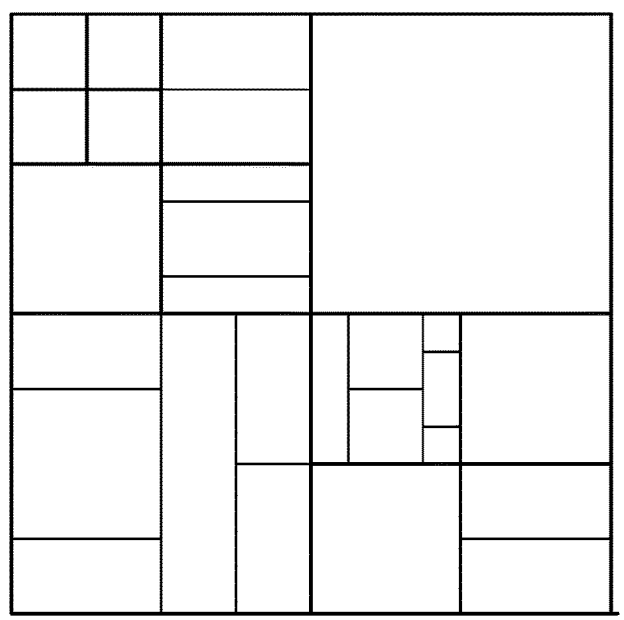
FIG. 3 shows an embodiment in which a coding tree unit is divided into coding units in a picture.

FIG. 3 illustrates an embodiment in which a coding tree unit (CTU) is split into coding units (CUs) in a picture. In the coding process of a video signal, a picture may be split into a sequence of coding tree units (CTUs). The coding tree unit is composed of an N×N block of luma samples and two blocks of chroma samples corresponding thereto. The coding tree unit can be split into a plurality of coding units. The coding tree unit is not split and may be a leaf node. In this case, the coding tree unit itself may be a coding unit. The coding unit refers to a basic unit for processing a picture in the process of processing the video signal described above, that is, intra/inter prediction, transformation, quantization, and/or entropy coding. The size and shape of the coding unit in one picture may not be constant. The coding unit may have a square or rectangular shape. The rectangular coding unit (or rectangular block) includes a vertical coding unit (or vertical block) and a horizontal coding unit (or horizontal block). In the present specification, the vertical block is a block whose height is greater than the width, and the horizontal block is a block whose width is greater than the height. Further, in this specification, a non-square block may refer to a rectangular block, but the present invention is not limited thereto.

Referring to FIG. 3, the coding tree unit is first split into a quad tree (QT) structure. That is, one node having a 2N×2N size in a quad tree structure may be split into four nodes having an N×N size. In the present specification, the quad tree may also be referred to as a quaternary tree. Quad tree split can be performed recursively, and not all nodes need to be split with the same depth.

Meanwhile, the leaf node of the above-described quad tree may be further split into a multi-type tree (MTT) structure. According to an embodiment of the present invention, in a multi-type tree structure, one node may be split into a binary or ternary tree structure of horizontal or vertical division. That is, in the multi-type tree structure, there are four split structures such as vertical binary split, horizontal binary split, vertical ternary split, and horizontal ternary split. According to an embodiment of the present invention, in each of the tree structures, the width and height of the nodes may all have powers of 2. For example, in a binary tree (BT) structure, a node of a 2N×2N size may be split into two N×2N nodes by vertical binary split, and split into two 2N×N nodes by horizontal binary split. In addition, in a ternary tree (TT) structure, a node of a 2N×2N size is split into (N/2)X2N, N×2N, and (N/2)X2N nodes by vertical ternary split, and split into 2N×(N/2), 2N×N, and 2N×(N/2) nodes by horizontal ternary split. This multi-type tree split can be performed recursively.

The leaf node of the multi-type tree can be a coding unit. If splitting for the coding unit is not indicated or the coding unit is not large for the maximum transform length, the coding unit is used as a unit of prediction and transform without further division. On the other hand, at least one of the following parameters in the above-described quad tree and multi-type tree may be predefined or transmitted through a higher level set of RBSPs such as PPS, SPS, VPS, and the like. 1) CTU size: root node size of quad tree, 2) minimum QT size MinQtSize: minimum allowed QT leaf node size, 3) maximum BT size MaxBtSize: maximum allowed BT root node size, 4) Maximum TT size MaxTt-Size: maximum allowed TT root node size, 5) Maximum MTT depth MaxMttDepth: maximum allowed depth of MTT split from QT's leaf node, 6) Minimum BT size MinBtSize: minimum allowed BT leaf node size, 7) Minimum TT size MinTtSize: minimum allowed TT leaf node size.

Figure 4:
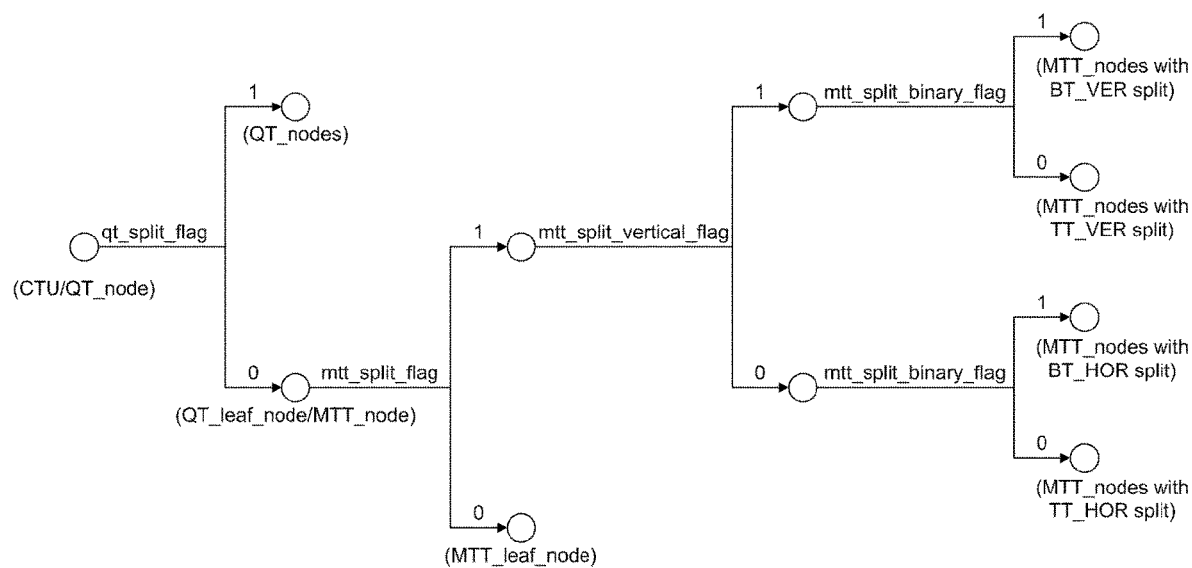
FIG. 4 shows an embodiment of a method for signaling a division of a quad tree and a multi-type tree.

FIG. 4 shows an embodiment of a method for signaling the split of a quad tree and a multi-type tree. Preset flags may be used to signal the split of the above-described quad tree and multi-type tree. Referring to FIG. 4, at least one of a flag 'qt_split_flag' indicating whether to split the quad tree node, a flag 'mtt_split_flag' indicating whether to split the multi-type tree node, a flag 'mtt_split_vertical_flag' indicating a split direction of a multi-type tree node, or a flag 'mtt_split_binary_flag' indicating a split shape of a multi-type tree node may be used.

According to an embodiment of the present invention, the coding tree unit is a root node of a quad tree, and can be first split into a quad tree structure. In the quad tree structure, 'qt_split_flag' is signaled for each node 'QT_node'. If the value of 'qt_split_flag' is 1, the node is split into 4 square nodes, and if the value of 'qt_split_flag' is 0, the corresponding node becomes the leaf node 'QT_leaf_node' of the quad tree.

Each quad tree leaf node 'QT_leaf_node' may be further split into a multi-type tree structure. In the multi-type tree structure, 'mtt_split_flag' is signaled for each node 'MTT_node'. When the value of 'mtt_split_flag' is 1, the corresponding node is split into a plurality of rectangular nodes, and when the value of 'mtt_split_flag' is 0, the corresponding node is a leaf node 'MTT_leaf_node' of the multi-type tree. When the multi-type tree node 'MTT_node' is split into a plurality of rectangular nodes (i.e., when the value of 'mtt_split_flag' is 1), 'mtt_split_vertical_flag' and 'mtt_split_binary_flag' for the node 'MTT_node' may be additionally signaled. When the value of 'mtt_split_vertical_flag' is 1, vertical split of node 'MTT_node' is indicated, and when the value of 'mtt_split_vertical_flag' is 0, horizontal split of node 'MTT_node' is indicated. In addition, when the value of 'mtt_split_binary_flag' is 1, the node 'MTT_node' is split into 2 rectangular nodes, and when the value of 'mtt_split_binary_flag' is 0, the node 'MTT_node' is split into 3 rectangular nodes.

Picture prediction (motion compensation) for coding is performed on a coding unit that is no longer divided (i.e., a leaf node of a coding unit tree). Hereinafter, the basic unit for performing the prediction will be referred to as a "prediction unit" or a "prediction block".

Hereinafter, the term "unit" used herein may replace the prediction unit, which is a basic unit for performing prediction. However, the present disclosure is not limited thereto, and "unit" may be understood as a concept broadly encompassing the coding unit.

Figure 5:
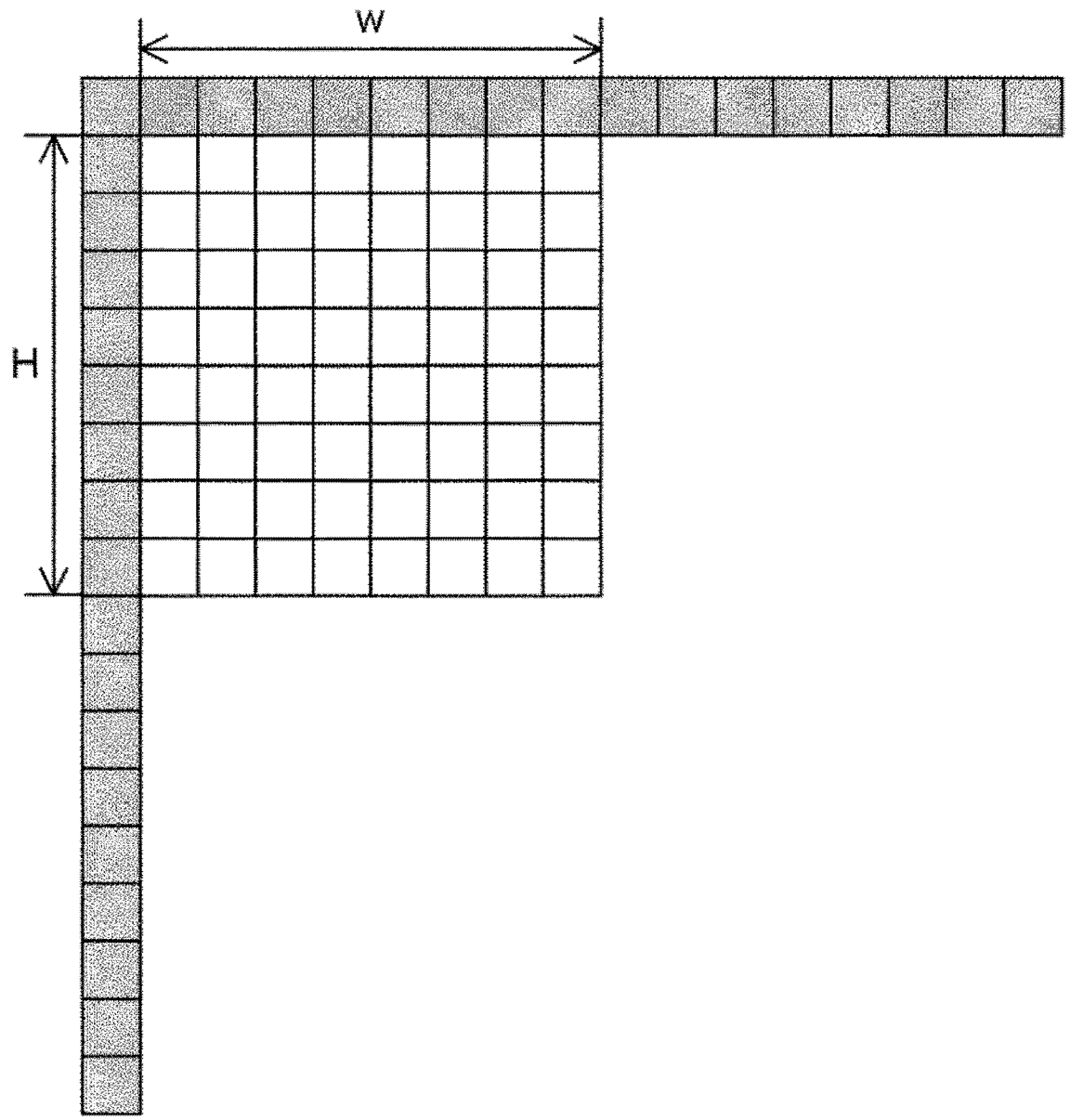
FIGS. 5 and 6 illustrate an intra-prediction method in more detail according to an embodiment of the present disclosure.
Figure 6:
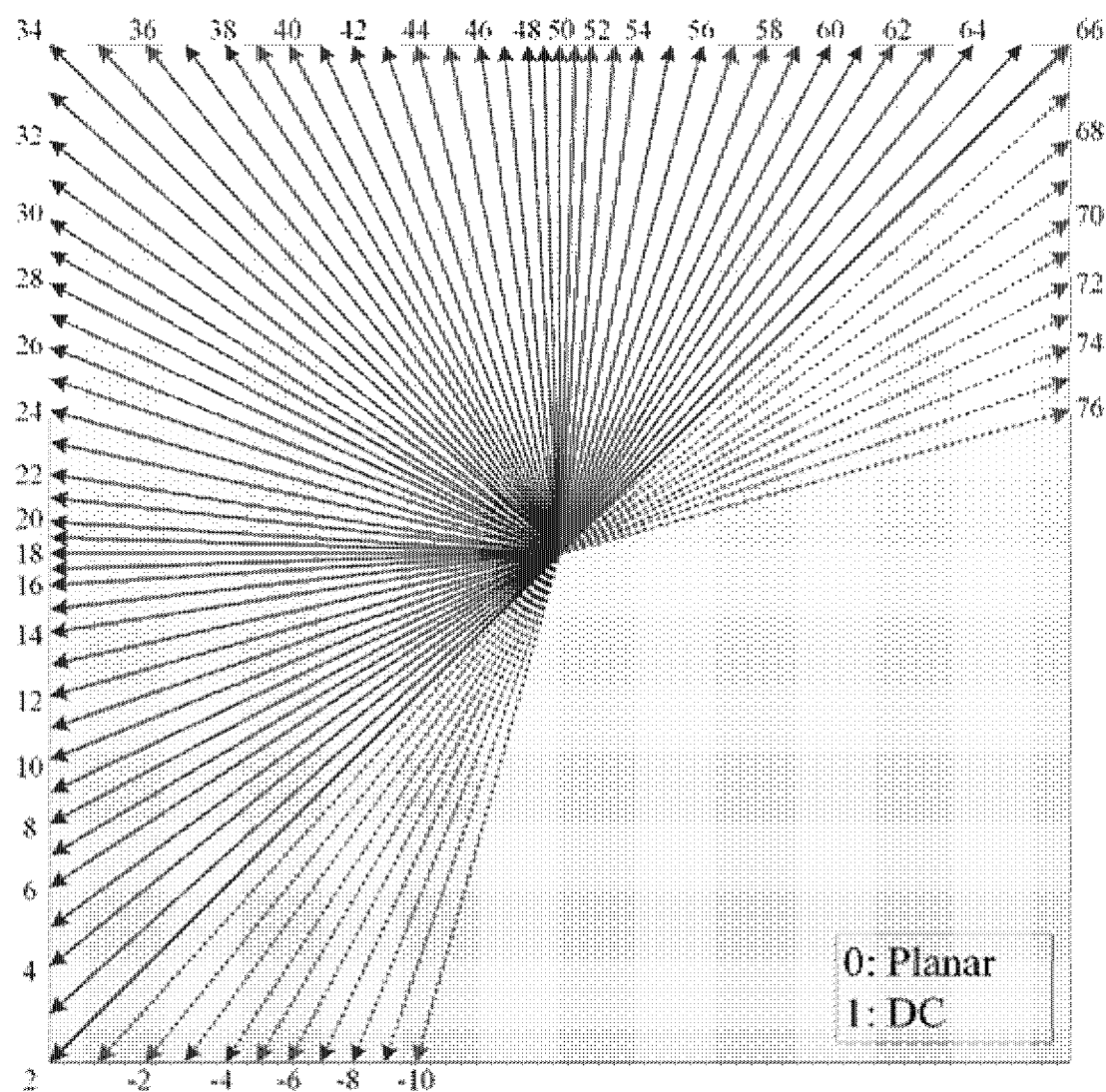

FIGS. 5 and 6 more specifically illustrate an intra prediction method according to an embodiment of the present invention. As described above, the intra prediction unit predicts the sample values of the current block by using the reconstructed samples located on the left and/or upper side of the current block as reference samples.

First, FIG. 5 shows an embodiment of reference samples used for prediction of a current block in an intra prediction mode. According to an embodiment, the reference samples may be samples adjacent to the left boundary of the current block and/or samples adjacent to the upper boundary. As shown in FIG. 5, when the size of the current block is W×H and samples of a single reference line adjacent to the current block are used for intra prediction, reference samples may be configured using a maximum of 2W+2H+1 neighboring samples located on the left and/or upper side of the current block.

According to a further embodiment of the present invention, samples on a plurality of reference lines may be used for intra prediction of the current block. The plurality of reference lines may consist of n lines located within a predetermined distance from the boundary of the current block. In this case, separate reference line information indicating at least one reference line used for intra prediction of the current block may be signaled. Specifically, the reference line information may include an index indicating any one of a plurality of reference lines.

In the present disclosure, the reference samples on a specific side of the current block may be reference samples that fall within a range of the height or width of the current block, among the reference samples around the corresponding side. In addition, the reference samples around the specific side may be samples on any one of a plurality of reference lines. For example, the reference samples on the left side of the current block may be reference samples that fall within a range of the height of the current block, among the reference samples around the left side. The reference samples on the left side of the current block may be reference samples that fall within a range of the width of the current block, among the reference samples around the left side. In addition, the reference samples on a specific side may be referred to as reference samples corresponding to a specific side in the present disclosure.

In addition, if at least some of the samples to be used as reference samples have not yet been reconstructed, the intra-prediction unit may perform a reference sample padding process to obtain reference samples. In addition, the intra-prediction unit may perform a reference sample filtering process in order to reduce errors in intra-prediction. That is, the intra-prediction unit may perform filtering on the samples around the current block and/or the reference samples obtained by the reference sample padding process, thereby obtaining filtered reference samples. The intra-prediction unit predicts samples of the current block using unfiltered reference samples or filtered reference samples.

Next, FIG. 6 shows an embodiment of prediction modes used for intra prediction. For intra prediction, intra prediction mode information indicating an intra prediction direction may be signaled. The intra prediction mode information indicates one of a plurality of intra prediction modes included in the intra prediction mode set. When the current block is an intra prediction block, the decoder receives intra prediction mode information of the current block from the bitstream. The intra prediction unit of the decoder performs intra prediction on the current block based on the extracted intra prediction mode information.

According to an embodiment of the present invention, the intra prediction mode set may include all intra prediction modes used in intra prediction (e.g., a total of 67 intra prediction modes). More specifically, the intra prediction mode set may include a planar mode, a direct current (DC) mode, and a plurality (e.g., 65) of angle modes (i.e., directional modes). In some embodiments, the intra prediction mode set may consist of some of all intra prediction modes. Each intra prediction mode may be indicated through a preset index (i.e., intra prediction mode index). For example, as shown in FIG. 6, the intra prediction mode index 0 indicates a planar mode, and the intra prediction mode index 1 indicates a DC mode. Also, the intra prediction mode indexes 2 to 66 may indicate different angle modes, respectively. In this case, the intra prediction mode index 2 indicates a horizontal diagonal (HDIA) mode, the intra prediction mode index 18 indicates a horizontal (Horizontal, HOR) mode, the intra prediction mode index 34 indicates a diagonal (DIA) mode, the intra prediction mode index 50 indicates a vertical (VER) mode, and the intra prediction mode index 66 indicates a vertical diagonal (VDIA) mode.

Figure 7:
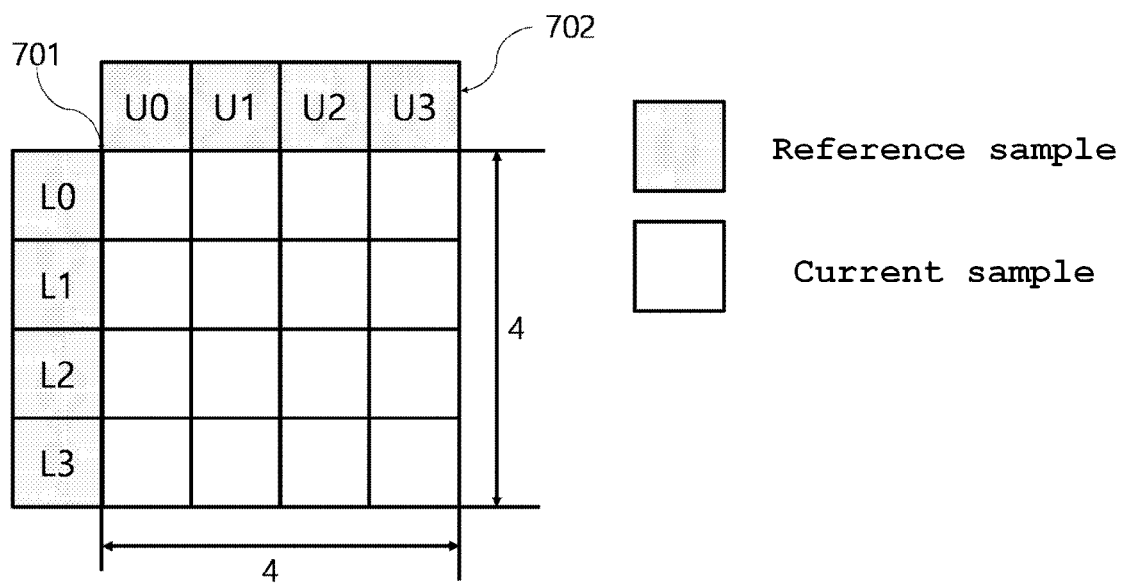
FIG. 7 is a diagram illustrating an embodiment of a method of predicting a current block in the case where an intra-prediction mode of the current block is a DC mode.

FIG. 7 is a diagram illustrating an embodiment of a method of predicting a current block in the case where an intra-prediction mode of the current block is a DC mode. According to an embodiment, the decoder may obtain intra-prediction mode information for prediction of a current block. For example, the intra-prediction mode information on the current block may indicate any one of intra-prediction modes included in an intra-prediction mode set. The intra-prediction mode information for prediction of a current block may indicate a DC mode. In this case, the decoder may reconstruct the current block based on the DC mode.

Specifically, the encoder and the decoder may obtain a prediction block of the current block based on a direct current (DC) value. A DC value may be obtained based on the reference samples of the current block. Specifically, a DC value of the current block may be obtained based on a plurality of reference samples corresponding to the upper side and the left side of the current block. A DC value of the current block may be obtained based on the average of values of a plurality of reference samples corresponding to the upper side and the left side of the current block. If a prediction mode of the current block is a DC mode, all prediction sample values in the prediction block may be obtained based on a single DC value. The decoder may reconstruct the current block based on the obtained prediction block.

In addition, the encoder may obtain a residual signal of the current block based on the prediction block. The encoder may encode the residual signal of the current block, thereby generating a bitstream including the residual signal. In addition, the encoder may transmit the generated bitstream to the decoder. The decoder may receive a bitstream including the residual signal of the current block from the encoder. The decoder may reconstruct the current block based on the obtained prediction block and the received residual signal. According to an additional embodiment, boundary filtering such as position-dependent intra-prediction combination (PDPC) may be performed on the prediction block of the current block. In this case, the residual signal may be obtained based on the encoder-filtered prediction block. In addition, the decoder may reconstruct the current block based on the filtered prediction block.

Hereinafter, a method of obtaining a DC value of a current block according to an embodiment of the present disclosure will be described in detail. In the present disclosure, a DC value of a current block represents a DC value for prediction of a current block. Referring to FIG. 7, a DC value for prediction of a current block 701 may be obtained based on a plurality of reference samples 702 corresponding to the upper side and the left side of the current block 701. For example, a DC value may be obtained based on the average of a plurality of reference samples 702 of the current block 701. As shown in FIG. 7, if the current block 701 has a size of 4×4, four reference samples U0, U1, U2, and U3 corresponding to the upper side and four reference samples L0, L1, L2, and L3 corresponding to the left side may be used to obtain a DC value. For example, a DC value of the current block 701 may be the average of sample values of a plurality of reference samples U0, U1, U2, U3, L0, L1, L2, and L3.

Specifically, the encoder and the decoder may calculate the average of the reference samples U0, U1, U2, U3, L0, L1, L2, and L3 corresponding to the upper side and the left side of the current block, thereby obtaining a DC value of the current block 701. In this case, a division operation may be performed to obtain the average of the sample values. However, the division operation may be a factor that increases the complexity and the amount of computation in processing a video signal when implementing hardware or software.

Meanwhile, if a divisor is 2 to the power of n in the division operation, a shift operator may replace the division operator. That is, if a divisor is 2 to the power of n, the encoder and the decoder may perform a division operation using a shift operator. Accordingly, if the number of reference sample values to be calculated to obtain an average value is 2 to the power of n, the encoder and the decoder may obtain an average of the reference sample values using a shift operator. In the present disclosure, the shift operation or operator may be a bit-wise arithmetic shift operation or operator.

For example, the encoder and the decoder may perform a shift operation on the total sum of sample values of the reference samples corresponding to the upper side and the left side of the current block. The encoder and the decoder may shift the total sum of the sample values by a shift parameter. The shift parameter may be determined based on the length of at least one of the width or the height of the current block. For example, the shift parameter may be the sum of the width and the height of the current block. The sum of the width and the height of the current block may be the number of reference samples used to obtain a DC value. Accordingly, the encoder and the decoder may obtain a DC value of the current block without performing a division operation. This may be expressed as Equation 1 below.

$$(\text{SUM}(W+H)+\text{offset}) \gg \log 2(W+H) \qquad \text{[Equation 1]}$$

In Equation 1, W represents the width of the current block, and H represents the height of the current block. In addition, SUM(W+H) represents the total sum of values of W upper reference samples corresponding to the upper side of the current block and values of H left reference samples corresponding to the left side thereof. ">>" represents a shift operator. Specifically, ">>" represents a right shift operator. The right shift operator binarizes the factor input to the operator, and shifts the binarized factor to the right by a shift parameter.

In Equation 1, offset may be a parameter for rounding off the fractional part of the average value. According to an embodiment, offset may be determined based on the length of at least one of the width or the height of the current block. Specifically, offset may be a value obtained by dividing the sum of the width and the height of the current block by 2. That is, offset may be a value obtained by dividing the number of reference samples used to obtain a DC value by 2. For example, offset may be expressed as $2^{\wedge}(\log 2(W+H)-1)$.

As shown in FIG. 7, if the height and the width of the current block are the same, the number of reference samples used to obtain a DC value of the current block may be 2 to the power of n. As described above, the encoder and the decoder may obtain the average of values of $2^n$ reference samples using a shift operator. The encoder and the decoder may obtain a DC value of the current block using only an add operation and a shift operation. Accordingly, the encoder and the decoder according to an embodiment of the present disclosure may be implemented as low complexity hardware or software, compared to the case of obtaining a DC value using a division operation.

Meanwhile, the shape of the current block may not be a square depending on a method in which the current block is split from a coding tree unit. As described above, the size and shape of a prediction unit, which is split from a coding tree unit, may not be constant. For example, the current block may be a rectangular block in which the height and the width of the current block are different from each other. If the current block is a rectangular block, the number of reference samples corresponding to the upper side and the left side of the current block may not be 2 to the power of n. That is, the sum of the number of samples corresponding to the length of the upper side of the current block and the number of samples corresponding to the length of the left side thereof may not be 2 to the power of n.

For example, the current block may be a rectangular block of which the height and the width are "4" and "8", respectively. In this case, the number of reference samples corresponding to the upper side and the left side of the current block is 4+8 (i.e., 12). If the number of reference samples used to obtain a DC value is not 2 to the power of n, it may be difficult for the encoder and the decoder to obtain a DC value by the same method as that in FIG. 7. That is, if the height and the width of the current block are different, the encoder and the decoder may perform a division operation. However, if a processing procedure includes a division operation, the computation speed may be reduced due to an increase in complexity.

Accordingly, in the case where the height and the width of the current block are different from each other, the encoder and the decoder may obtain a DC value of the current block using a method different from that in the case where the height and the width of the current block are the same. For example, the encoder and the decoder according to an embodiment of the present disclosure may obtain a DC value of the current block based on a reference sample set including some of the reference samples corresponding to the left side and the upper side of the current block. In this case, the number of reference samples included in the reference sample set may be 2 to the power of n. In addition, the reference sample set may include reference samples located at predetermined positions. The reference sample set may include reference samples that satisfy predetermined conditions.

Figure 8:
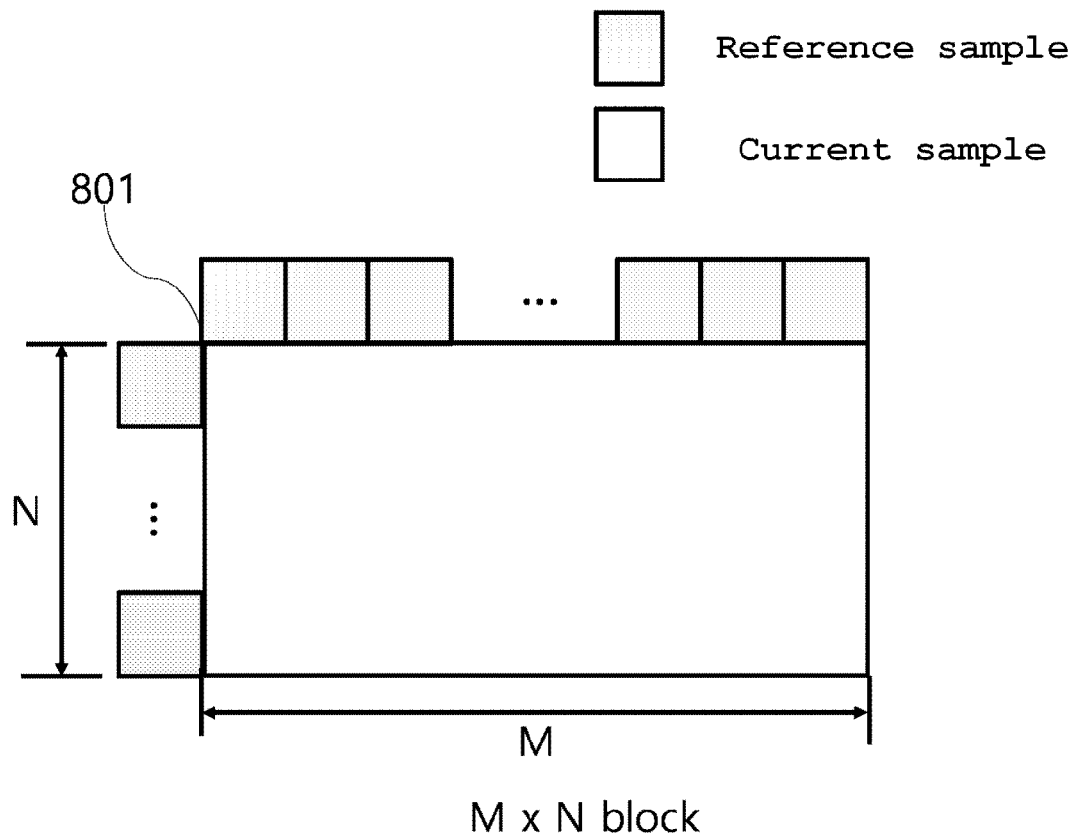
FIG. 8 is a diagram illustrating a method of obtaining a DC value of a current block in the case where the height and the width of the current block are different from each other according to an embodiment of the present disclosure.

FIG. 8 is a diagram illustrating a method of obtaining a DC value of a current block in the case where the height and the width of the current block are different from each other according to an embodiment of the present disclosure. According to an embodiment, the encoder and the decoder may compare the length of a first side and the length of the second side of the current block. In the present disclosure, the first side may be any one of the upper side and the left side of the current block. In addition, the second side may be the remaining one of the upper side and the left side of the current block. If the length of the first side and the length of the second side are the same as a result of the comparison, the encoder and the decoder may obtain a DC value of the current block by the method described above with reference to FIG. 7.

On the other hand, if the length of the first side and the length of the second side are different from each other as a result of the comparison, the encoder and the decoder may configure a reference sample set including some of all the reference samples. The encoder and the decoder may configure a reference sample set including $2^n$ reference samples, which include some of the reference samples on the first side and the reference samples on the second side of the current block. The encoder and the decoder may obtain a reference sample set including $2^n$ reference samples, excluding some reference samples from the reference samples on the first and the reference samples on the second sides. In addition, the encoder and the decoder may obtain a DC value of the current block based on the reference sample set. The encoder and the decoder may predict the current block based on the obtained DC value.

In FIG. 8, a current block 801 may be a rectangular block of which the height N and the width M are different from each other. In this case, the number of DC reference samples corresponding to the first side and the second side of the current block 801 may be M+N. In the present disclosure, the term "DC reference samples" may be used to indicate all of a plurality of reference samples corresponding to the upper side and left side of the current block. A DC value of the current block 801 may be obtained based on a reference sample set including (M'+N') reference samples that are some of the (M+N) DC reference samples. In this case, (M'+N') may be expressed as $2^k$ (where, k is an integer). In addition, (M'+N') may be less than (M+N). For example, the reference sample set may include the remaining reference samples, excluding at least some of the reference samples on a shorter side from the DC reference samples. In addition, the reference sample set may include the remaining reference samples, excluding at least some of the reference samples on a longer side from the DC reference samples. Hereinafter, a method of obtaining a DC value of a current block in the case where the height and the width of the current block are different from each other will be described in detail.

According to an embodiment of the present disclosure, a DC value of the current block may be obtained based on at least one reference sample set. According to an embodiment, the encoder and the decoder may obtain a DC value of the current block based on one reference sample set. For example, a DC value of the current block 801 may be obtained based on the average of values of reference samples included in the reference sample set. Equation 2 shows a method of obtaining a DC value based on the reference sample set. Referring to Equation 2, the encoder and the decoder may obtain a DC value of the current block without performing a division operation.

$$(SUM(M'+N')+\text{offset}) >> \log 2(M'+N') \qquad \text{[Equation 2]}$$

In Equation 2, SUM(M'+N') represents the sum of values of reference samples included in the reference sample set, among the values of reference samples corresponding to the upper side and the left side of the current block. In addition, M' represents the number of reference samples included in the reference sample set, among the reference samples corresponding to the upper side. N' represents the number of reference samples included in the reference sample set, among the reference samples corresponding to the left side. Offset may be a parameter for rounding off the fractional part of the average value. For example, offset may be "(M'+N')>>1".

According to an additional embodiment, the encoder and the decoder may obtain a DC value of the current block based on a plurality of reference sample sets. This will be described in detail with reference to FIG. 14. Hereinafter, various methods of configuring a reference sample set for obtaining a DC value of a current block in the case where the height and the width of the current block are different from each other will be described.

Figure 9:
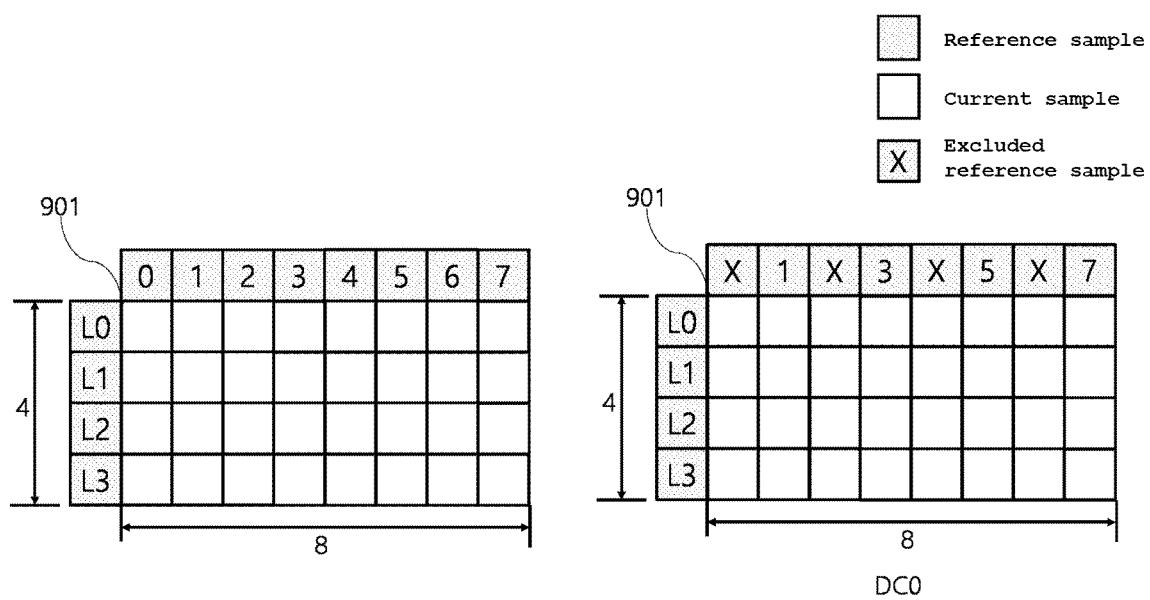
FIGS. 9, 10, and 11 are diagrams illustrating an embodiment of a method of configuring a reference sample set in the case where the height and the width of a current block are different from each other.
Figure 10:
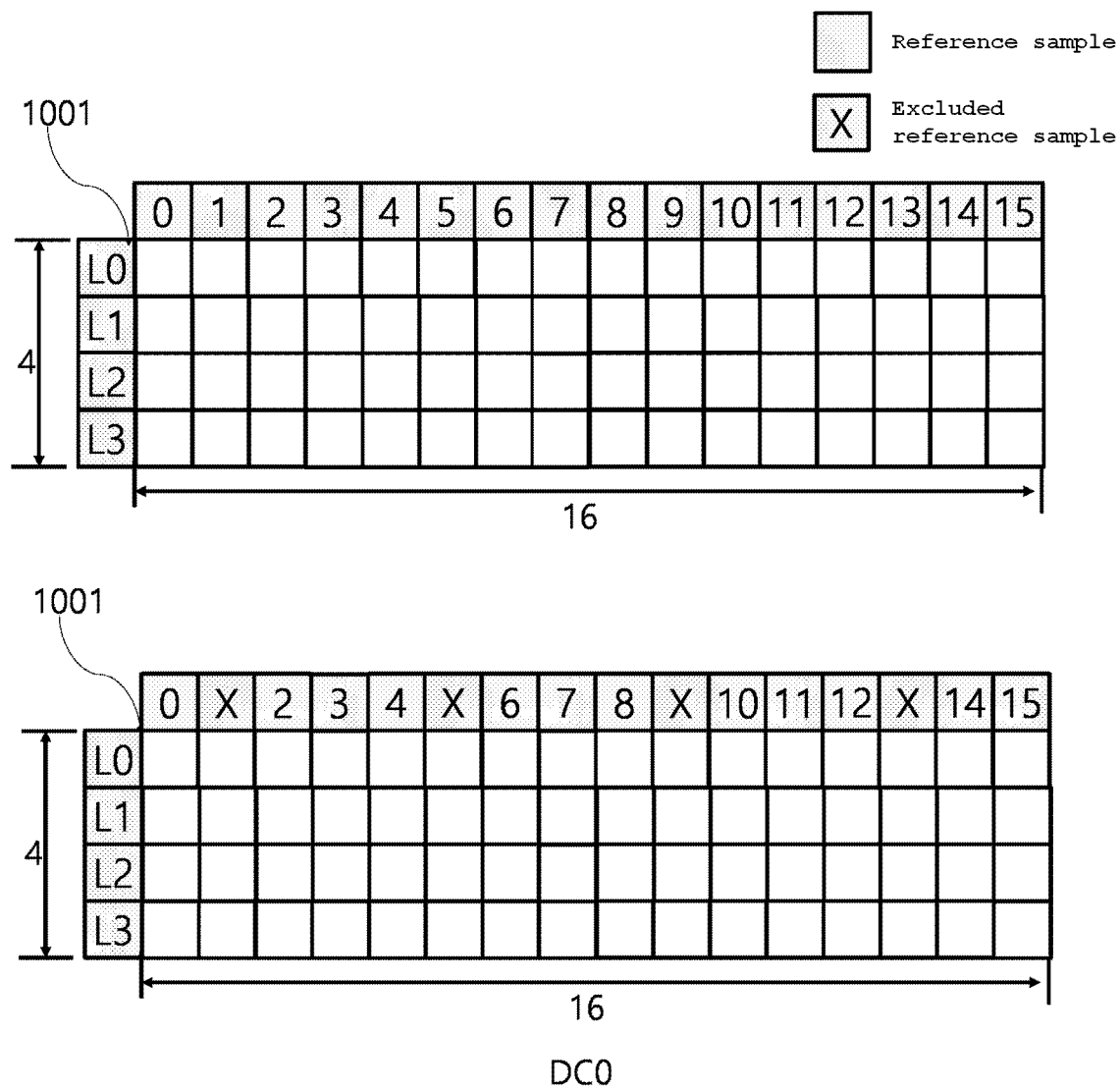
Figure 11:
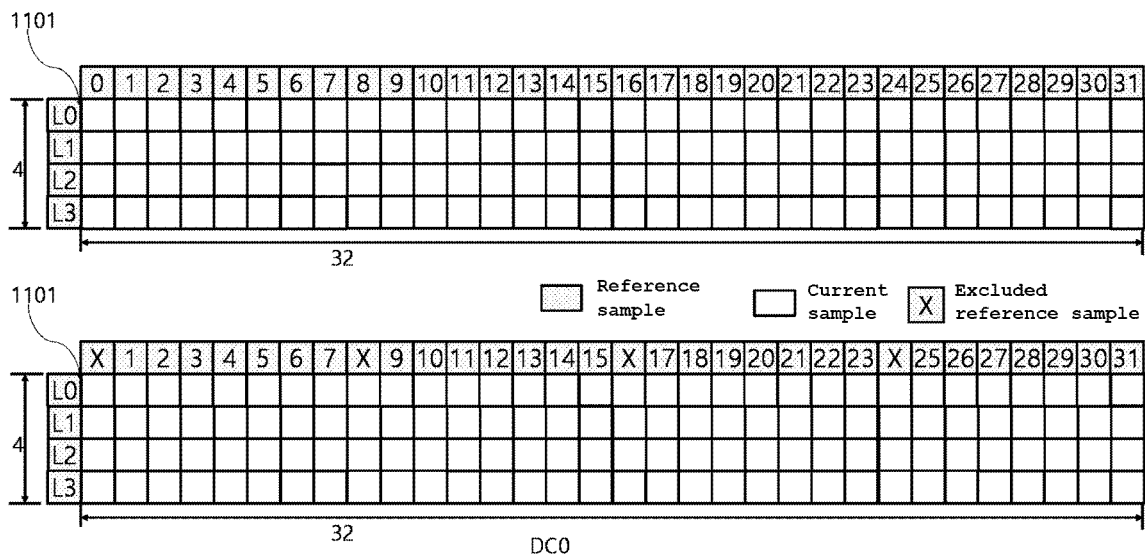

FIGS. 9, 10, and 11 are diagrams illustrating an embodiment of a method of configuring a reference sample set in the case where the height and the width of a current block are different from each other. Referring to FIG. 9, a current block 901 is a rectangular block of which the height and the width are "4" and "8", respectively. In this case, the total number of reference samples corresponding to the upper side and the left side of the current block 901 is 4+8 (i.e., 12). As described above, if the number of reference samples used to obtain a DC value is not 2 to the power of n, it is difficult to replace a division operator with a shift operator. In the case where a DC value is obtained based on the average of all of 12 reference samples L0, L1, L2, L3, 0, 1, 2, 3, 4, 5, 6, and 7 of the current block 901, a division operation must be performed by the encoder and the decoder.

As described above, a DC value of the current block 901 may be obtained based on some of the reference samples corresponding to the upper side and the left side of the current block. In this case, the encoder and the decoder may obtain a DC value of the current block without performing a division operation. For example, a DC value of the current block 901 may be obtained based on a reference sample set DC0 including some of the 12 reference samples L0, L1, L2, L3, 0, 1, 2, 3, 4, 5, 6, and 7. The encoder and the decoder may configure a reference sample set according to a rule predefined between the encoder and the decoder. According to an embodiment, the reference sample set DC0 may include the remaining reference samples, excluding a predetermined number of samples from the reference samples corresponding to the upper side and the left side of the current block 901. For example, the encoder and the decoder may configure a reference sample set including the remaining reference samples. In this case, the number of the remaining reference samples may be 2 to the power of n.

According to an embodiment of the present disclosure, the predetermined number may be the number of samples corresponding to the length of a specific side. The total number of DC reference samples of the current block may be the sum of the width and the height of the current block. For example, if the width of the current block is M and the height thereof is N, a reference sample set may include M or N reference samples. If a number of reference samples corresponding to the length of a specific side are excluded from all of the DC reference samples, the number of reference samples included in the reference sample set may become 2 to the power of n. According to an embodiment, the specific side may be the shorter one of the first side and the second side of the current block. In this case, the reference sample set may include the remaining reference samples, excluding a number of reference samples corresponding to the length of the shorter side from all of the DC reference samples. That is, the number of reference samples included in the reference sample set may be the number of samples corresponding to the length of the longer one of the first side and the second side of the current block. If the width of the current block is greater than the height thereof, the specific side may be the left side. In addition, if the width of the current block is smaller than the height thereof, the specific side may be the upper side.

According to an embodiment of the present disclosure, the reference sample set may include the remaining reference samples, excluding as many as reference samples on the shorter side from the DC reference samples of the current block. In this case, Equation 2 described above with reference to FIG. 8 may be expressed as (SUM (number of remaining reference samples)+(length of longer side>>1)) >>log 2 (length of longer side). Here, "length of longer side" may be the length of the longer one among the first side and the second side of the current block. As shown in Equation above, the encoder and the decoder may obtain a DC value of the current block based on the length of the longer one among the first side and the second side of the current block.

In FIG. 9, the reference sample set DC0 may include the remaining reference samples L1, L2, L3, L4, 1, 3, 5, and 7, excluding reference samples corresponding to the number of samples on the shorter side from the reference samples L1, L2, L3, L4, 0, 1, 2, 3, 4, 5, 6, and 7 corresponding to the left side and the upper side of the current block 901. In addition, a DC value of the current block 901 may be obtained based on the average of values of the reference samples included in the reference sample set DC0. In this case, a method of determining the positions of the reference samples that are included in the reference sample set or the positions of the DC reference samples that are not included in the reference sample set will be described later. In the present disclosure, the position of the reference sample may be a relative position to the position of an upper left sample of the current block.

According to an embodiment, the reference sample set may include some of the reference samples on the longer side of the current block and all of the reference samples on the shorter side of the current block. For example, the encoder and the decoder may select some of the reference samples on the longer side of the current block. In addition, the encoder and the decoder may configure a reference sample set including some selected reference samples on the longer side and reference samples on the shorter side, which are adjacent thereto.

According to a specific embodiment, some of the reference samples 0, 1, 2, 3, 4, 5, 6, and 7 on the longer side may be excluded. That is, the reference sample set may include only some of the reference samples 0, 1, 2, 3, 4, 5, 6, and 7 on the longer side. The reference sample set may include the remaining reference samples, excluding reference samples at specific positions from the reference samples on the longer side.

For example, the specific position may be determined based on the ratio of the shorter side to the longer side of the current block. Specifically, the interval between the reference samples that are not included in the reference sample set, among the DC reference samples, may be determined based on the ratio of the shorter side to the longer side of the current block. In the embodiment of FIG. 9, the ratio of the shorter side to the longer side may be "8/4" (i.e., "2"). In this case, the reference sample set may include reference samples {1, 3, 5, 7}. Alternatively, the reference sample set may include reference samples {0, 2, 4, 6}.

That is, the reference sample set may include the remaining reference samples, excluding the reference samples corresponding to "(reference sample index % (ratio of shorter side to longer side))=(predetermined remainder)". "%" represents a modulo operation. Here, if the upper side of the current block 901 is longer than the left side thereof, the reference sample index may indicate the x-coordinate of the reference sample. In addition, if the left side of the current block 901 is longer than the upper side thereof, the reference sample index may indicate the y-coordinate of the reference sample. In addition, "predetermined remainder" may be any one of the possible remainders according to "ratio of shorter side to longer side", which is a dividend in the modulo operation. Specific positions of the reference samples, which are not included in the reference sample set, among the DC reference samples may be determined according to "predetermined remainder".

In the embodiment shown in FIG. 10, the ratio of a shorter side to a longer side of the current block 1001 may be "16/4" (i.e., "4"). In FIG. 10, the reference sample set DC0 may include reference samples {0, 2, 3, 4, 6, 7, 8, 10, 11, 12, 14, 15}. FIG. 10 shows a reference sample set configured in the case where a predetermined remainder is "1". The reference sample set DC0 may include the remaining reference samples, excluding the reference samples, which are arranged at equal intervals from the reference sample located at the second place from the left, from the reference samples corresponding to the upper side of the current block. However, the present disclosure is not limited thereto. If a predetermined remainder has a value other than "1", the positions of the excluded reference samples may differ.

In the embodiment shown in FIG. 11, the ratio of a shorter side to a longer side of a current block 1101 may be "32/4" (i.e., "8"). In this case, a reference sample set DC0 may include the remaining reference samples, excluding reference sample {0, 8, 16, 24} from DC reference samples. In addition, the embodiments described with reference to FIGS. 9 and 10 may be applied to the embodiment in FIG. 11 in the same or corresponding manner.

Figure 12:
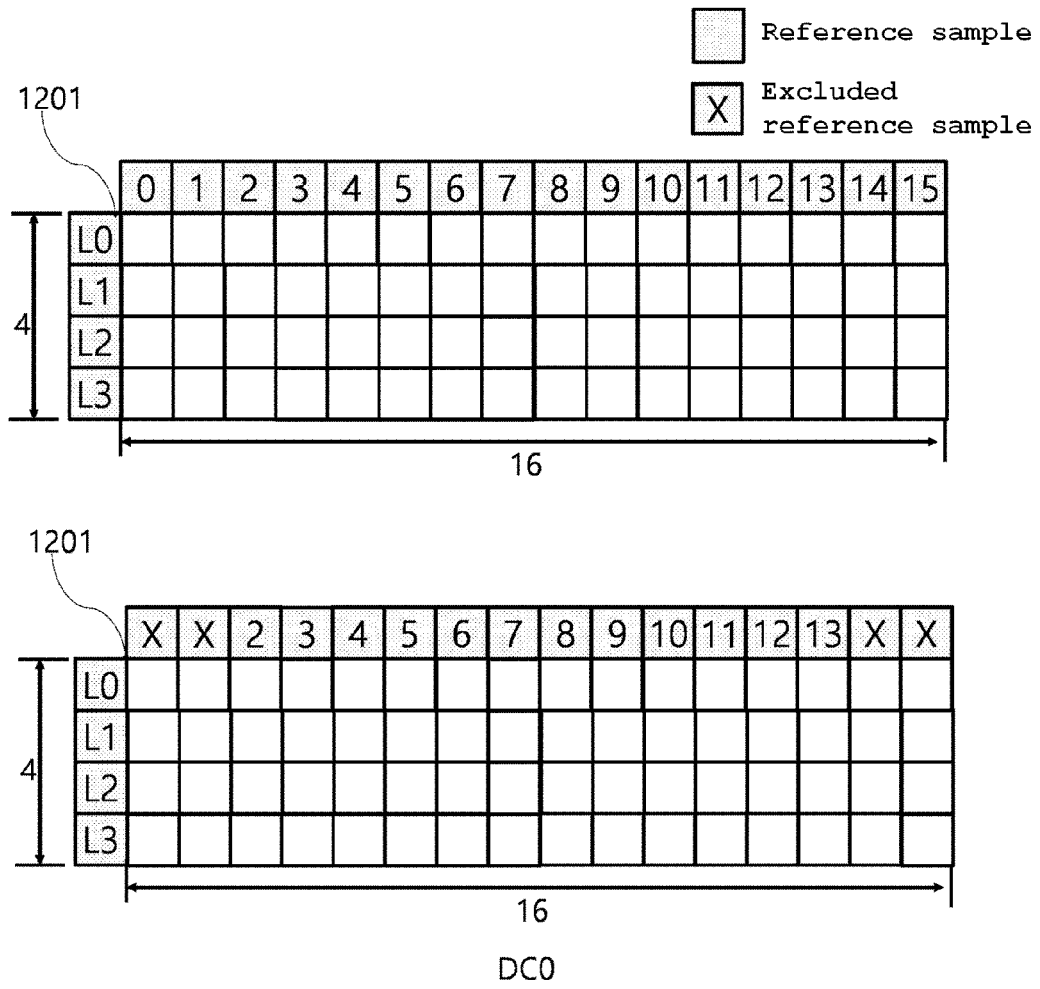
FIG. 12 is a diagram illustrating another embodiment of a method of configuring a reference sample set in the case where the height and the width of a current block are different from each other.

According to another specific embodiment, a reference sample set may include the remaining reference samples, excluding a predetermined number of consecutive reference samples from the DC reference samples. FIG. 12 is a diagram illustrating another embodiment of a method of configuring a reference sample set in the case where the height and the width of a current block 1201 are different from each other. Referring to FIG. 12, a reference sample set DC0 may include the remaining reference samples, excluding reference samples {0, 1, 14, 15} from DC reference samples.

In FIGS. 9 to 12, although it is illustrated that the reference sample set includes all of the reference samples on the shorter side of the current block and some of the reference samples on the longer side thereof, the present disclosure is not limited thereto. For example, the reference sample set may include the remaining reference samples, excluding some of the reference samples on the shorter side of the current block from all of the DC reference samples.

According to a specific embodiment, the reference sample set may include the remaining reference samples, excluding the reference samples on the shorter side of the current block from all of the DC reference samples. The shorter side of the current block may be the shorter one of the first side and the second side of the current block. That is, the reference sample set may include the reference samples on the longer one of the first side and the second side of the current block. A DC value of the current block may be obtained based on the reference sample set including the reference samples on the longer one of the first side and the second side. In addition, a DC value of the current block may be obtained based on the length of the longer one of the first side and the second side.

For example, the encoder and the decoder may compare the length of the first side with the length of the second side of the current block. If the length of the first side is greater than the length of the second side as a result of the comparison, the encoder and the decoder may obtain a reference sample set including the reference samples on the first side. In addition, the encoder and the decoder may obtain a DC value of the current block based on the average of values of the reference samples on the first side. On the other hand, if the length of the second side is greater than the length of the first side, the encoder and the decoder may obtain a reference sample set including the reference samples on the second side. In this case, the encoder and the decoder may obtain a DC value of the current block based on the reference sample set including the reference samples on the second side.

Figure 13:
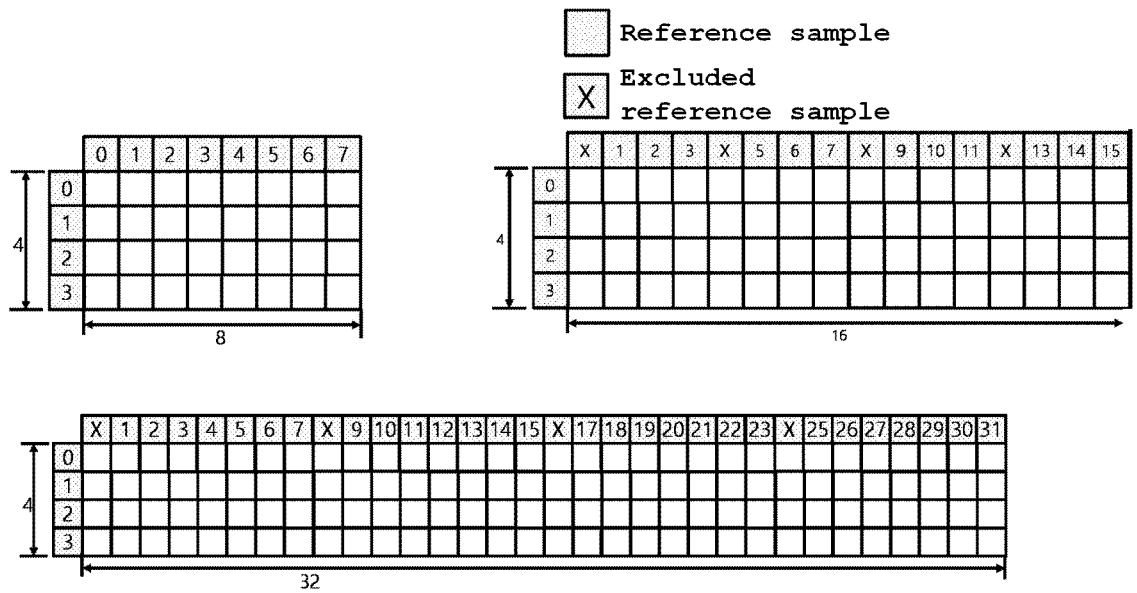
FIG. 13 is a diagram illustrating a method of obtaining a DC value of a current block based on a ratio between the width and the height of the current block according to an embodiment of the present disclosure.

According to an additional embodiment, the reference sample set may be configured only if the ratio of a shorter side to a longer side is greater than or equal to a reference ratio. FIG. 13 is a diagram illustrating a method of determining a DC value of a current block based on the ratio between the width and the height of the current block according to an embodiment of the present disclosure. Referring to FIG. 13, a DC value of the current block may be obtained based on a reference sample set only when the ratio of a shorter side to a longer side is "4" or more.

For example, the encoder and the decoder may obtain the ratio of a longer side to a shorter side based on the height and the width of the current block. If the ratio of the shorter side to the longer side of the current block is greater than or equal to a reference ratio, the encoder and the decoder may configure a reference sample set. In addition, the encoder and the decoder may obtain a DC value of the current block based on the configured reference sample set. On the other hand, if the ratio of the shorter side to the longer side of the current block is less than a reference ratio, the encoder and the decoder may obtain a DC value of the current block in different methods. For example, the encoder and the decoder may obtain a DC value of the current block based on weights depending on the ratio of the current block. A method in which the encoder and the decoder obtains a DC value of the current block based on the weight depending on the ratio of the current block in the case where the height and the width of the current block are different from each other will be described later with reference to FIG. 30.

Figure 14:
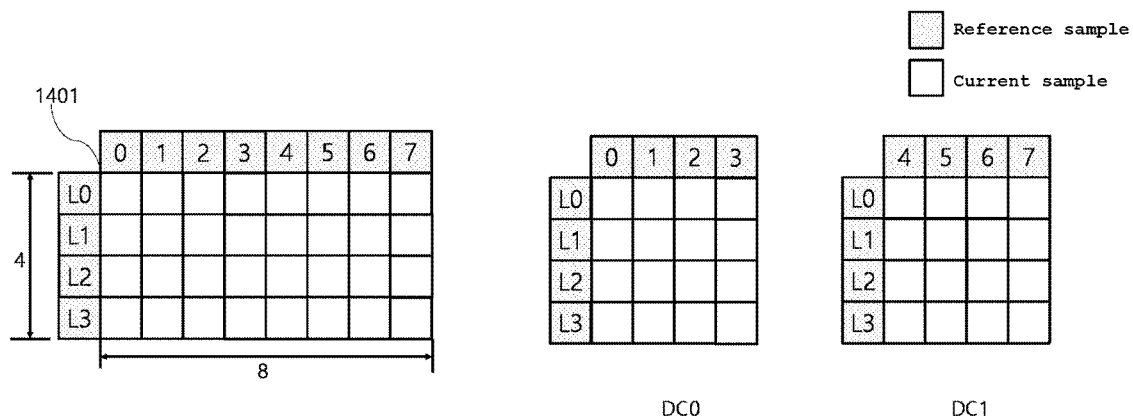
FIG. 14 is a diagram illustrating another embodiment of a method of configuring a reference sample set in the case where the height and the width of a current block are different from each other according to an embodiment of the present disclosure.

FIG. 14 is a diagram illustrating another embodiment of a method of configuring a reference sample set in the case where the height and the width of a current block are different from each other according to an embodiment of the present disclosure. According to an embodiment, the number of reference samples on a longer side and the number of reference samples on a shorter side, which constitute a reference sample set, may be the same. The encoder and the decoder may cause the number of reference samples on the longer side to match the number of reference samples on the shorter side, which are included in the reference sample set, such that the number of reference samples included in the reference sample set becomes 2 to the power of n.

In FIG. 14, the length of the shorter side of a current block 1401 may be "4", and the length of the longer side thereof may be "8". In this case, a reference sample set may include four specific reference samples among reference samples 0, 1, 2, 3, 4, 5, 6, and 7 on the longer side. According to a specific embodiment, the reference sample set may include some reference samples 0, 1, 2, and 3 at the left portion, excluding some reference samples 4, 5, 6, and 7 at the right portion from the reference samples 0, 1, 2, 3, 4, 5, 6, and 7 on the longer side. According to another embodiment, the reference sample set may include some reference samples 4, 5, 6, and 7 at the right portion, excluding some reference samples 0, 1, 2, and 3 at the left portion from the reference samples 0, 1, 2, 3, 4, 5, 6, and 7 on the longer side. However, the present disclosure is not limited thereto. For example, the reference sample set may include odd-numberth reference samples 0, 2, 4, and 6 relative to the leftmost reference sample, among the reference samples on the longer side of the current block. Alternatively, the reference sample set may include even-numberth reference samples 1, 3, 5, and 7 relative to the leftmost reference sample, among the reference samples on the longer side of the current block.

According to an embodiment, a DC value of the current block 1401 may be obtained based on one of either a first reference sample set DC0 or a second reference sample set DC1. The first reference sample set DC0 may include {L0, L1, L2, L3, 0, 1, 2, 3}. In addition, the second reference sample set DC1 may include {L0, L1, L2, L3, 4, 5, 6, 7}. That is, the reference samples L0, L1, L2, and L3 on the shorter side may be included both in the first reference sample set DC0 and in the second reference sample set DC1.

For example, a DC value of the current block 1401 may be obtained based on the average of values of reference samples included in the first reference sample set DC0. Alternatively, a DC value of the current block 1401 may be obtained based on the average of values of reference samples included in the second reference sample set DC1.

Meanwhile, according to an embodiment of the present disclosure, a DC value of the current block may also be obtained based on a plurality of reference sample sets. For example, a plurality of reference sample sets may be configured based on the reference samples corresponding to the upper side and the left side of the current block. In this case, the number of reference samples included in each of the plurality of reference sample sets may be 2 to the power of n. In this case, a DC value of the current block may be obtained based on two or more of the plurality of reference sample sets. The encoder and the decoder may determine two or more reference sample sets from among the plurality of reference sample sets. In addition, the encoder and the decoder may obtain the average of sample values of the reference samples included in the reference sample set for each determined reference sample set. In addition, the encoder and the decoder may obtain a DC value of the current block based on the final average between the averages for the respective reference sample sets.

According to a specific embodiment, a DC value of the current block 1401 may be obtained based on the first reference sample set DC0 and the second reference sample set DC1. Specifically, the encoder and the decoder may obtain a first average of values of all the reference samples included in the first reference sample set DC0. In addition, the encoder and the decoder may obtain a second average of values of all the reference samples included in the second reference sample set DC1. Next, the encoder and the decoder may obtain a DC value of the current block 1401 based on the first average and the second average. A DC value of the current block 1401 may be obtained based on the final average between the first average and the second average. Equation 3 shows an embodiment in which a DC value of the current block is obtained based on a plurality of reference sample sets.

$$(\text{Average\_DC0} + \text{Average\_DC1} + \text{offset}) >> \log 2(W/H) \quad \text{[Equation 3]}$$

In Equation 3, Average_DC0 and Average_DC1 represent a first average and a second average, respectively. In addition, offset may be a parameter for rounding off the fractional part of the average value. In Equation 3, W represents the length of the longer side of the current block, and H represents the length of the shorter side of the current block.

Figure 15:
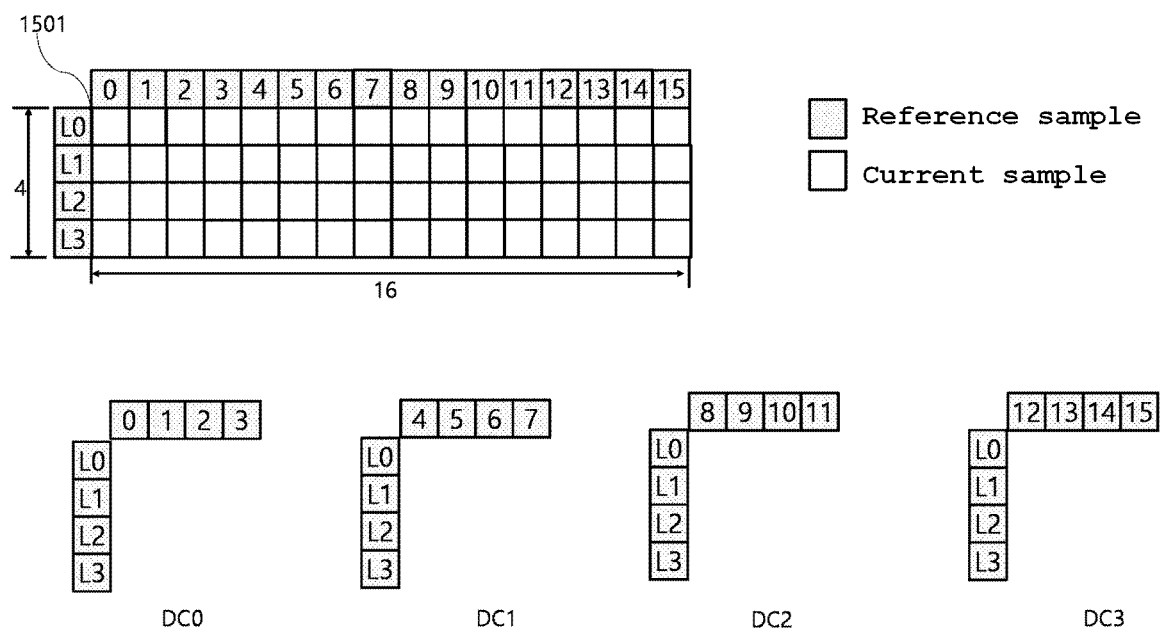
FIGS. 15 and 16 are diagrams illustrating an embodiment of a reference sample set for obtaining a DC value of a current block in the case where the height and the width of the current block are "4" and "16", respectively.
Figure 16:
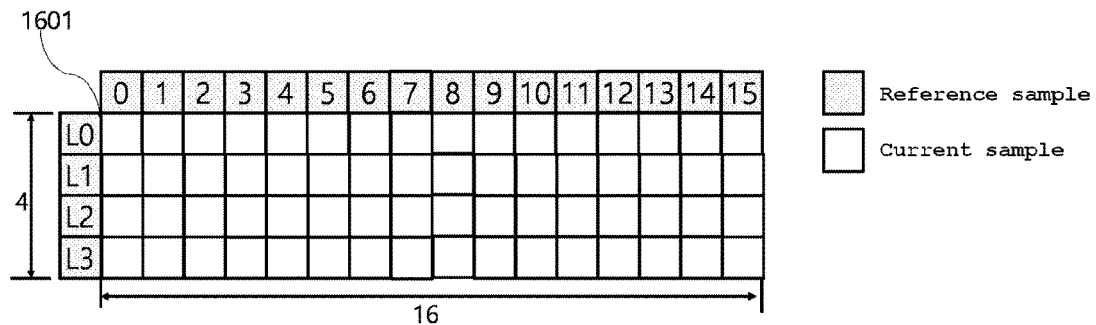
Figure 16:
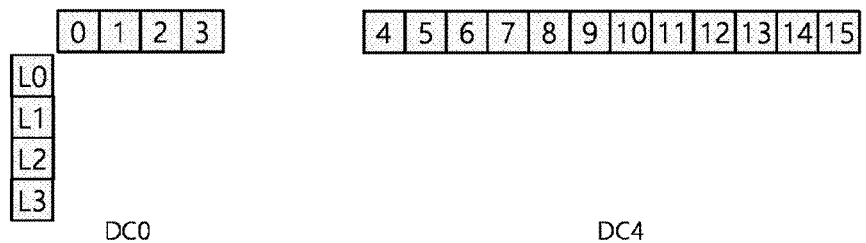

FIGS. 15 and 16 are diagrams illustrating an embodiment of a reference sample set for obtaining a DC value of a current block in the case where the height and the width of the current block are "4" and "16", respectively. Referring to FIG. 15, a current block 1501 is a rectangular block of which the height and the width are "4" and "16", respectively. In this case, a DC value of the current block 1501 may be obtained based on at least one of a first reference sample set DC0, a second reference sample set DC1, a third reference sample set DC2, and a fourth reference sample set DC3. The first reference sample set DC0 may include {L0, L1, L2, L3, 0, 1, 2, 3}. The second reference sample set DC1 may include {L0, L1, L2, L3, 4, 5, 6, 7}. The third reference sample set DC0 may include {L0, L1, L2, L3, 8, 9, 10, 11}. In addition, the fourth reference sample set DC1 may include {L0, L1, L2, L3, 12, 13, 14, 15}.

$$(\text{Average\_DC0} + \text{Average\_DC1} + \text{Average\_DC2} + \text{Average\_DC3} + \text{offset}) >> \log 2(W/H) \quad \text{[Equation 4]}$$

In the case where the encoder and the decoder obtain a DC value of the current block based on a plurality of reference sample sets, operation may be performed as shown in Equation 4. In Equation 4, Average_DC0 represents a first average of values of the reference samples included in the first reference sample set DC0. Average_DC1 represents a second average of values of the reference samples included in the second reference sample set DC1. Average_DC2 represents a third average of values of the reference samples included in the third reference sample set DC2. Average_DC3 represents a fourth average of values of the reference samples included in the fourth reference sample set DC3. Offset may be a parameter for rounding off the fractional part of the average value. In Equation 4, W represents the length of the longer side, and H represents the length of the shorter side.

According to an additional embodiment, a fifth reference sample set DC4 may be configured to include the remaining reference samples, excluding the reference samples constituting the first reference sample set DC0. Referring to FIG. 16, a DC value of a current block 1601 may be obtained based on the first reference sample set DC0 and the fifth reference sample set DC4. In this case, as described with reference to FIGS. 14 and 15, a DC value of a current block 1601 may be obtained based on a first average of values of the reference samples included in the first reference sample set DC0 and a fifth average of values of the reference samples included in the fifth reference sample set DC4. Although the first reference sample set DC0 has been described by way of example for convenience of explanation, the present disclosure is not limited thereto. For example, a reference sample set may be configured to include reference samples, excluding the reference samples constituting the second reference sample set DC1 in FIG. 15.

Figure 17:
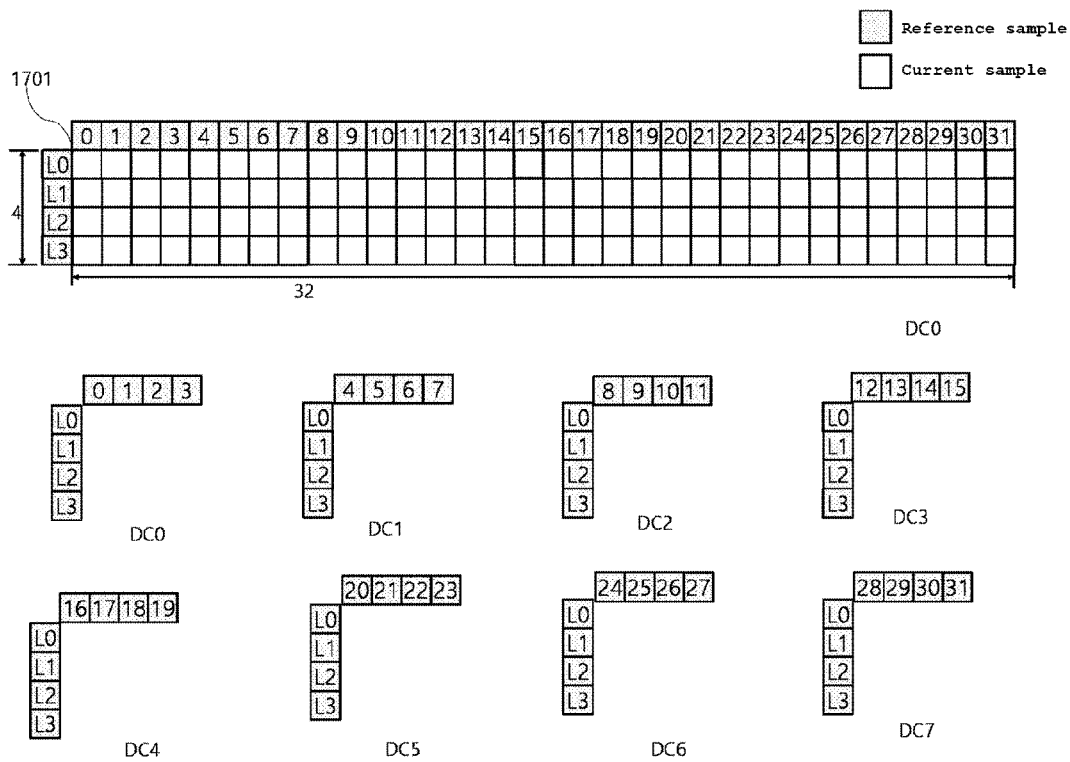
FIGS. 17 and 18 are diagrams illustrating an embodiment of a reference sample set for obtaining a DC value of a current block in the case where the height and the width of the current block are "4" and "32", respectively.
Figure 18:
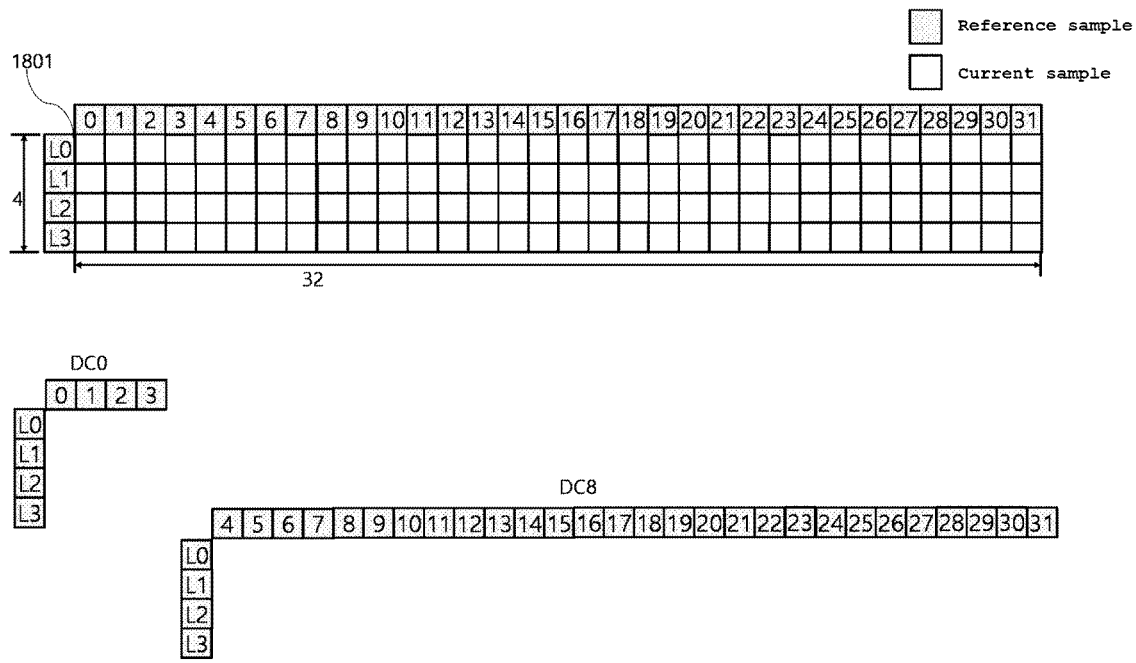

FIGS. 17 and 18 are diagrams illustrating an embodiment of a reference sample set for obtaining a DC value of a current block in the case where the height and the width of the current block are "4" and "32", respectively. Referring to FIG. 17, a current block 1701 is a rectangular block of which the height and the width are "4" and "32", respectively. In this case, a DC value of the current block 1701 may be obtained based on at least one of a first reference sample set DC0, a second reference sample set DC1, a third reference sample set DC2, a fourth reference sample set DC3, a fifth reference sample set DC4, a sixth reference sample set DC5, a seventh reference sample set DC6, and an eighth reference sample set DC7.

According to an additional embodiment, a ninth reference sample set DC8 may be configured to include the remaining reference samples, excluding the reference samples included in the first reference sample set DC0 from the reference samples on the longer side of a current block 1801. Referring to FIG. 18, the ninth reference sample set DC8 may further include the reference samples on the shorter side of the current block 1701. In this case, as described with reference to FIG. 14, a DC value of the current block 1801 may be obtained based on a first average of values of the reference samples included in the first reference sample set DC0 and a ninth average of values of the reference samples included in the ninth reference sample set DC8.

Meanwhile, according to an embodiment of the present disclosure, a reference sample set may include reference samples corresponding to one of the first side and the second side of the current block. That is, the reference sample set may not include reference samples corresponding to any one of the first side and the second side of the current block. In this case, the number of reference samples included in the reference sample set may be 2 to the power of n. For example, the reference sample set may include reference samples on the remaining side, among DC reference samples, excluding reference samples on a specific side of the current block. The specific side may be one of the first side and the second side of the current block.

According to an embodiment, the specific side may be the shorter one of the first side and the second side of the current block. In this case, the reference sample set may include reference samples corresponding to the longer one of the first side and the second side. For example, if the width of the current block is greater than the height thereof, the specific side may be a left side. In addition, if the width of the current block is smaller than the height thereof, the specific side may be an upper side.

According to a specific embodiment, the encoder and the decoder may compare the length of the first side with the length of the second side thereof of the current block. If the first side of the current block is longer than the second side thereof as a result of the comparison, the encoder and the decoder may obtain a reference sample set including the reference samples on the first side. In addition, the encoder and the decoder may obtain a DC value of the current block based on the reference sample set including the reference samples on the first side. On the other hand, if the length of the second side is greater than the length of the first side, the encoder and the decoder may obtain a reference sample set including the reference samples on the second side. In this case, the encoder and the decoder may obtain a DC value of the current block based on the reference sample set including the reference samples on the second side.

Figure 19:
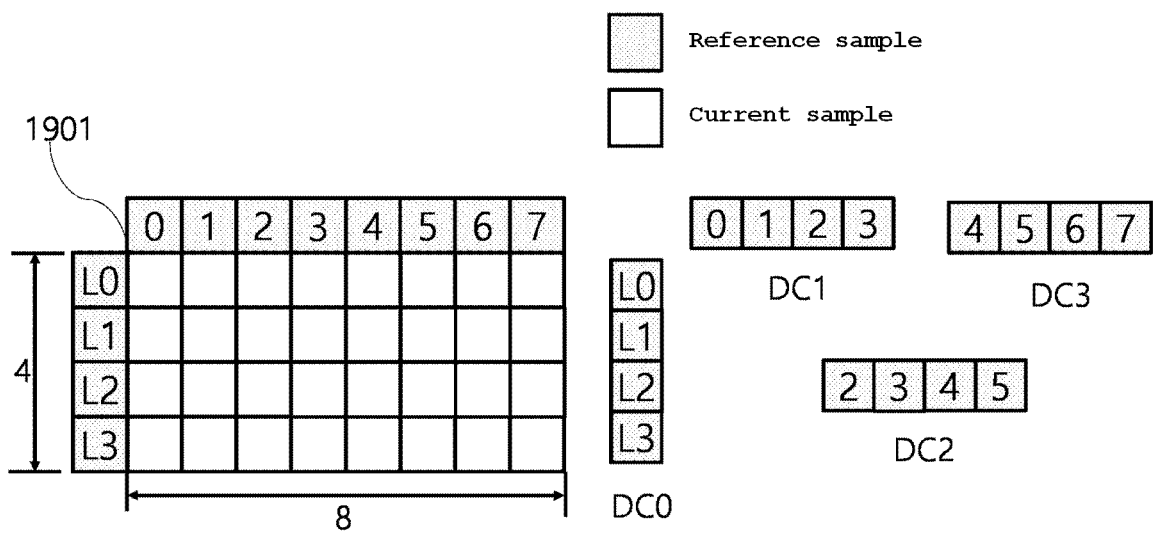
FIGS. 19, 20, and 21 are diagrams illustrating another embodiment of a reference sample set for obtaining a DC value of a current block in the case where the height and the width of the current block are different from each other.
Figure 20:
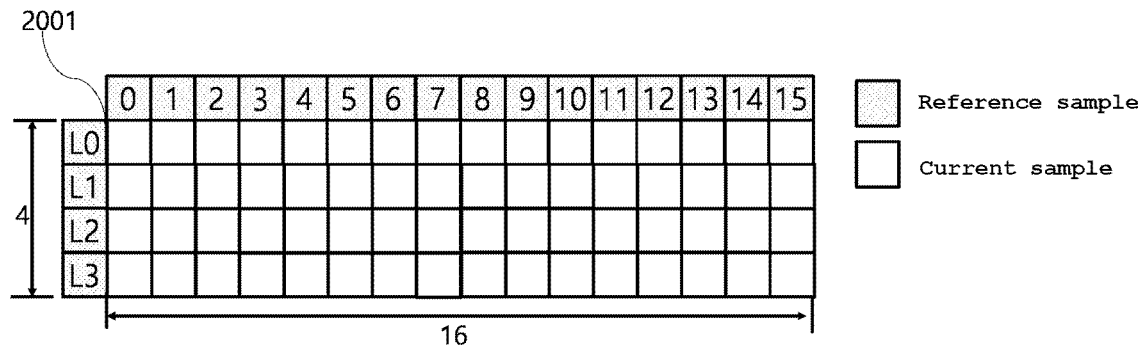
Figure 20:
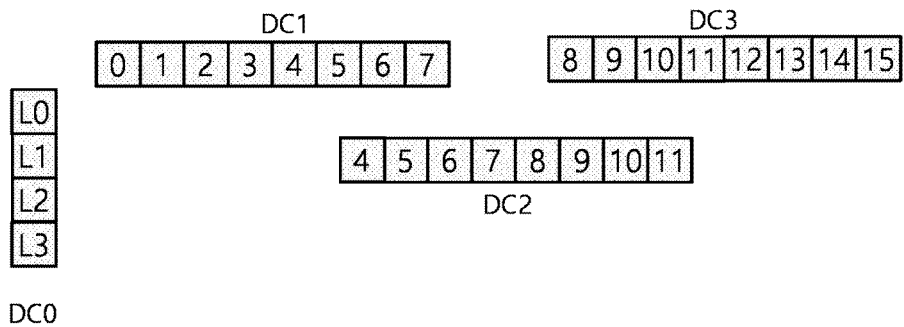
Figure 21:
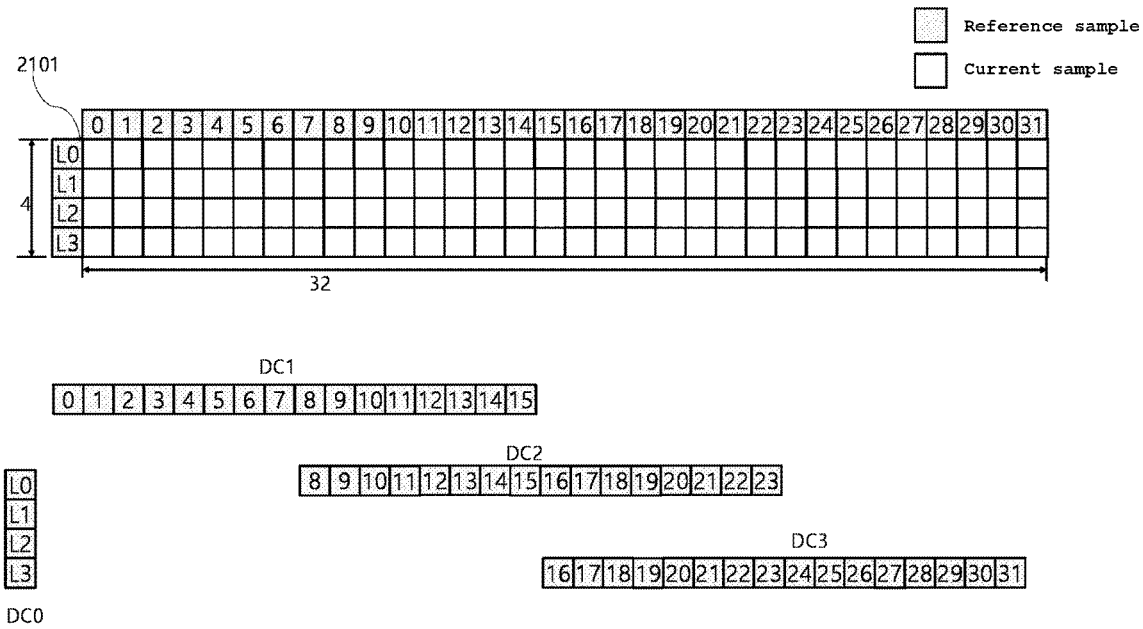

FIGS. 19, 20, and 21 are diagrams illustrating another embodiment of a reference sample set for obtaining a DC value of a current block in the case where the height and the width of the current block are different from each other. Referring to FIG. 19, a current block 1901 is a rectangular block of which the height and the width of "4" and "8", respectively. The encoder and the decoder may configure a first reference sample set DC0 including reference samples on a shorter side. In addition, the encoder and the decoder may configure a reference sample set including at least some of reference samples on a longer side of the current block 1901.

In FIG. 19, each of a second reference sample set DC1, a third reference sample set DC2, and a fourth reference sample set DC3 includes at least some of the reference samples on the longer side of the current block 1901. In FIG. 19, each of the second reference sample set DC1, the third reference sample set DC2, and the fourth reference sample set DC3 includes four reference samples. However, the present disclosure is not limited thereto. For example, the number of reference samples included in the reference sample set based on the longer side of the current block may be equal to or less than the length of the longer side, and may be 2 to the power of n. That is, the reference sample set may include 2 or 8 reference samples. According to an embodiment, the encoder and the decoder may obtain a DC value of the current block based on any one of the first reference sample set DC0, the second reference sample set DC1, the third reference sample set DC2, and the fourth reference sample set DC3.

Meanwhile, in the case where the number of reference sample sets used to obtain a DC value is not 2 to the power of n, a division operation may be further required for the process of obtaining a final average from the averages for the respective reference sample sets. As described above, the division operation may increase the complexity and the amount of computation of the encoder and the decoder. Accordingly, in the case where a DC value of the current block is obtained based on a plurality of reference sample sets, the number of reference sample sets may be 2 to the power of n.

According to an embodiment, a DC value of the current block may be obtained based on one short-sided reference sample set and a predetermined number of long-sided reference sample sets. In the present disclosure, the short-sided reference sample set may represent a reference sample set including at least some of the reference samples on the shorter side of the current block. In addition, the long-sided reference sample set may represent a reference sample set including at least some of the reference sample sets on the longer side of the current block. The number of long-sided reference sample sets may be configured such that the total number of reference sample sets used to obtain a DC value of the current block is 2 to the power of n. For example, the number of long-sided reference sample sets may be $((2^n)-1)$. Here, "n" may be an integer.

In FIG. 19, a first reference sample set DC0 may be configured to include only the reference samples on the shorter side of the current block 1901. In addition, three long-sided reference sample sets may be configured to include some of the reference samples on the longer side of the current block 1901. For example, the encoder and the decoder may configure a second reference sample set DC1, a third reference sample set DC2, and a fourth reference sample set DC3. In this case, some of the reference samples constituting any two of the second reference sample set DC1, the third reference sample set DC2, and the fourth reference sample set DC3 may be duplicate. In addition, the number of reference samples included in the reference sample set may differ between the plurality of reference sample sets. For example, DC0 may have 4 reference samples, DC1 may have 8 reference samples, DC2 may have 4 reference samples, and DC3 may have 4 reference samples.

Next, the encoder and the decoder may obtain averages for the respective ones of the first reference sample set DC0, the second reference sample set DC1, the third reference sample set DC2, and the fourth reference sample set DC3. In addition, the encoder and the decoder may obtain a DC value of the current block based on the final average of the averages for the respective reference sample sets by the method described with reference to FIG. 8 above. The above-described methods may be applied to the embodiment in FIGS. 20 and 21 in the same or corresponding manner.

Referring to FIG. 20, a current block 2001 is a rectangular block of which the height and the width are "4" and "16", respectively. In this case, a DC value of the current block 2001 may be obtained based on at least one of one short-sided reference sample set, i.e., a first reference sample set DC0, and three long-sided reference sample sets, i.e., a second reference sample set DC1, a third reference sample set DC2, and a fourth reference sample set DC3.

Referring to FIG. 21, a current block 2101 is a rectangular block of which the height and the width are "4" and "32", respectively. In this case, a DC value of the current block 2101 may be obtained based on at least one of one short-sided reference sample set, i.e., a first reference sample set DC0, and three long-sided reference sample sets. i.e., a second reference sample set DC1, a third reference sample set DC2, and a fourth reference sample set DC3.

Figure 22:
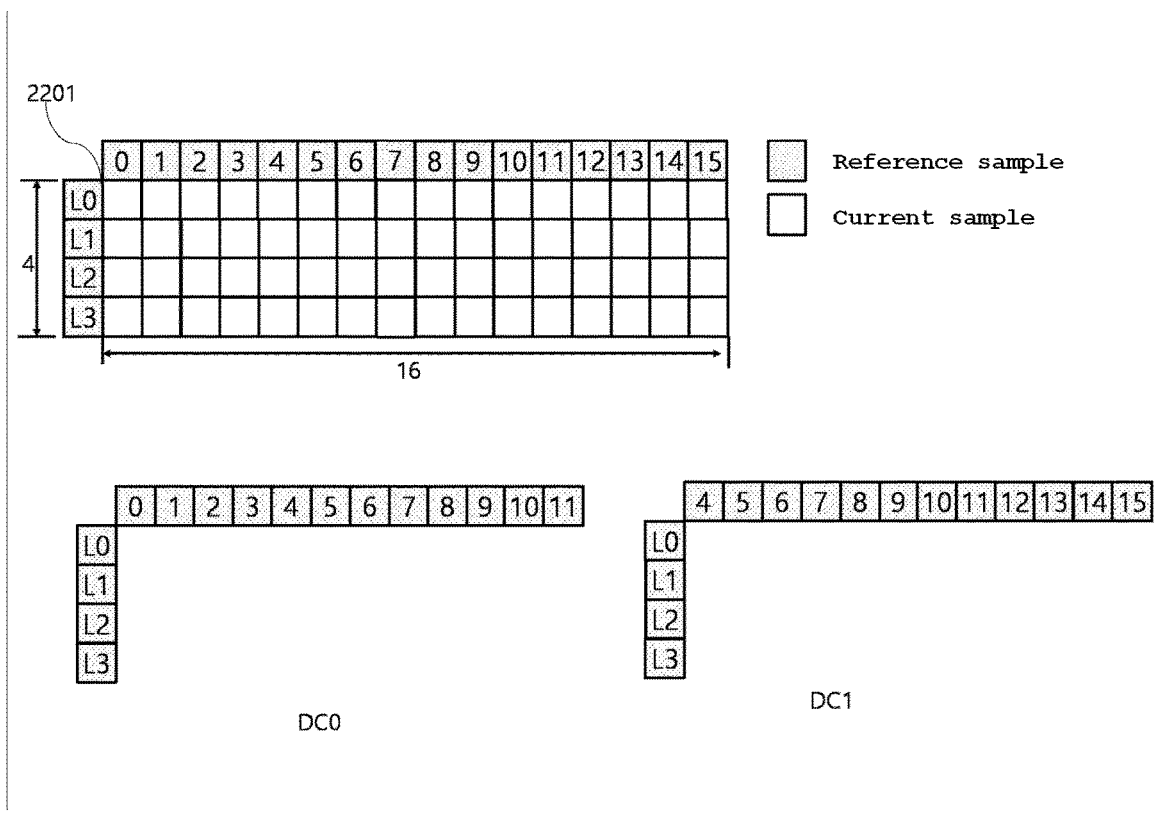
FIGS. 22, 23, and 24 are diagrams illustrating another embodiment of a reference sample set for obtaining a DC value of a current block in the case where the height and the width of the current block are different from each other.
Figure 23:
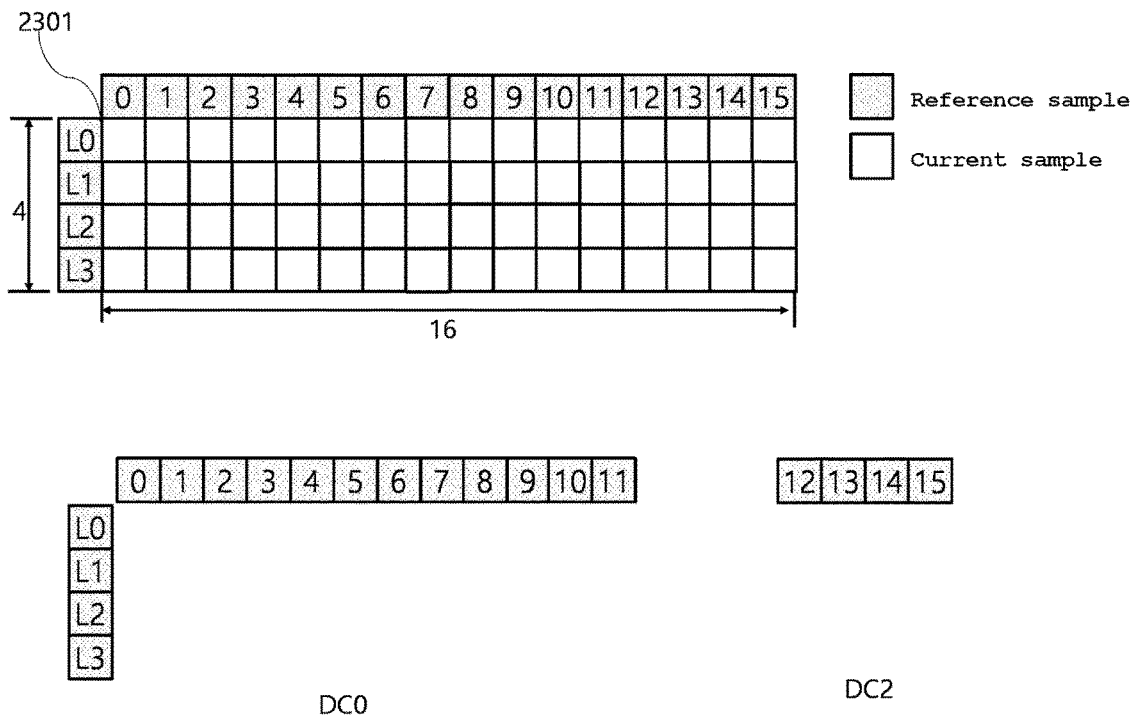
Figure 24:
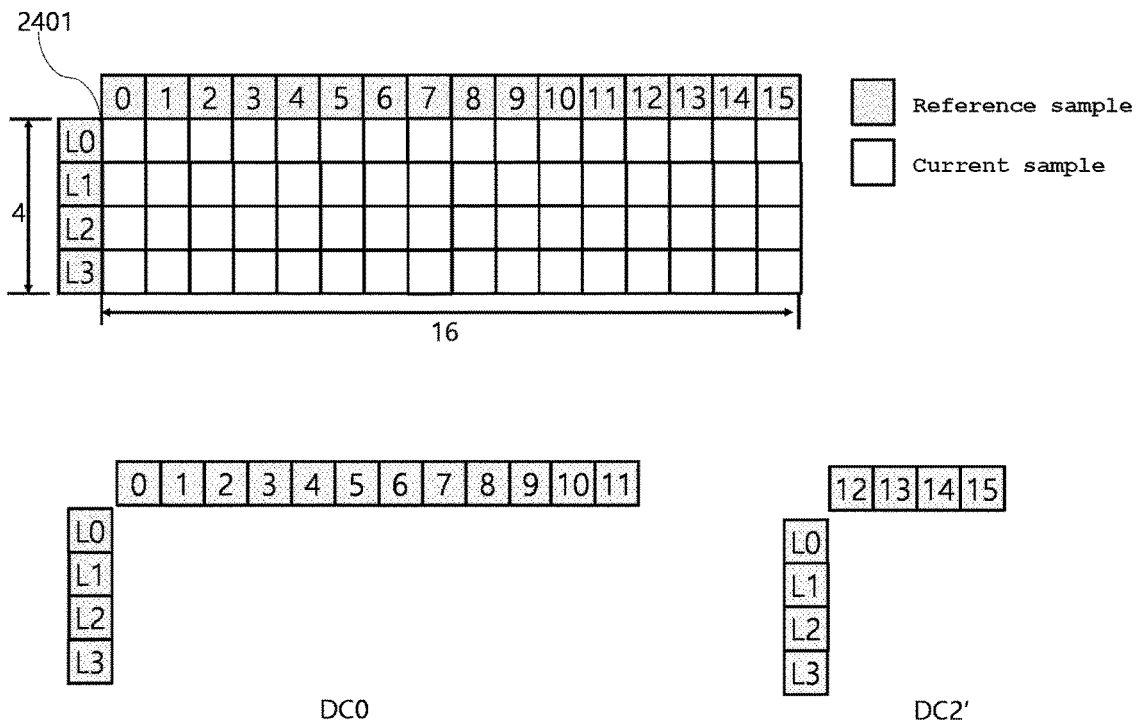

According to an embodiment of the present disclosure, the reference sample set may include the remaining reference samples, excluding as many as reference samples corresponding to the number of samples on the shorter side from the total reference samples on the shorter side and the longer side of the current block. FIGS. 22, 23, and 24 are diagrams illustrating another embodiment of a reference sample set for obtaining a DC value of a current block in the case where the height and the width of the current block are "4" and "16", respectively.

In FIG. 22, a current block 2201 is a rectangular block of which the height and the width are "4" and "16", respectively. According to an embodiment, the encoder and the decoder may configure reference sample sets including (16+4−4) (i.e., 16) reference samples. For example, the encoder and the decoder may configure a first reference sample set DC0 including reference samples L0, L1, L2, and L3 on the shorter side of the current block and some reference samples 0, 1, 2, 3, 4, 5, 6, 7, 8, 9, 10, and 11 on the longer side of the current block. The encoder and the decoder may configure a second reference sample set DC1 including reference samples L0, L1, L2, and L3 on the shorter side of the current block and some reference samples 4, 5, 6, 7, 8, 9, 10, 11, 12, 13, 14, and 15 on the longer side of the current block 2201. However, the present disclosure is not limited thereto.

For example, the reference sample set may include only the reference samples 0, 1, 2, 3, 4, 5, 6, 7, 8, 9, 10, 11, 12, 13, 14, and 15 on the longer side of the current block. The reference sample set may not include the reference samples L0, L1, L2, and L3 on the shorter side of the current block. According to another embodiment, the encoder and the decoder may configure a reference sample set based on sample values of the reference samples. For example, the reference sample set may not include the reference sample having a maximum sample value, among the reference samples corresponding to the upper side and the left side of the current block. In addition, the reference sample set may not include the reference sample having a minimum sample value, among the reference samples corresponding to the upper side and the left side of the current block.

According to an additional embodiment, a third reference sample set DC2 may be configured to include reference samples other than the reference samples included in the first reference sample set DC0, among the reference samples corresponding to the upper side and the left side of the current block. Referring to FIG. 23, a first reference sample set DC0 may be configured to include the remaining reference samples, excluding some of the reference samples corresponding to the longer side from the reference samples corresponding to the longer side and the shorter side of the current block 2301. In this case, a third reference sample set DC2 may be configured to include the excluded reference samples 12, 13, 14, and 15.

Additionally, referring to FIG. 24, a third reference sample set' DC2' may further include reference samples on the shorter side. In addition, a DC value of the current block 2401 may be obtained based on the first reference sample set DC0 and the third reference sample set DC2. In this case, as described above with reference to FIGS. 14 and 15, a DC value of the current block 2401 may be obtained based on a first average of values of the reference samples included in the first reference sample set DC0 and a third average of values of the reference samples included in the third reference sample set DC2.

Figure 25:
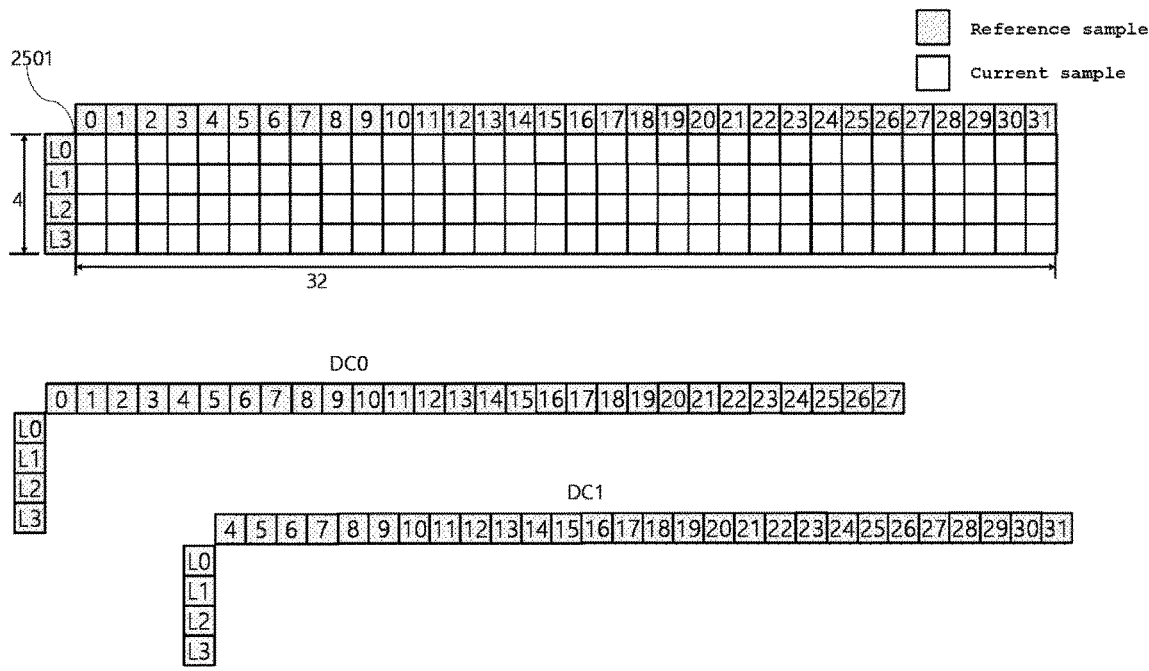
FIGS. 25 and 26 are diagrams illustrating an embodiment of a reference sample set for obtaining a DC value of a current block in the case where the height and the width of the current block are "4" and "32", respectively.
Figure 26:
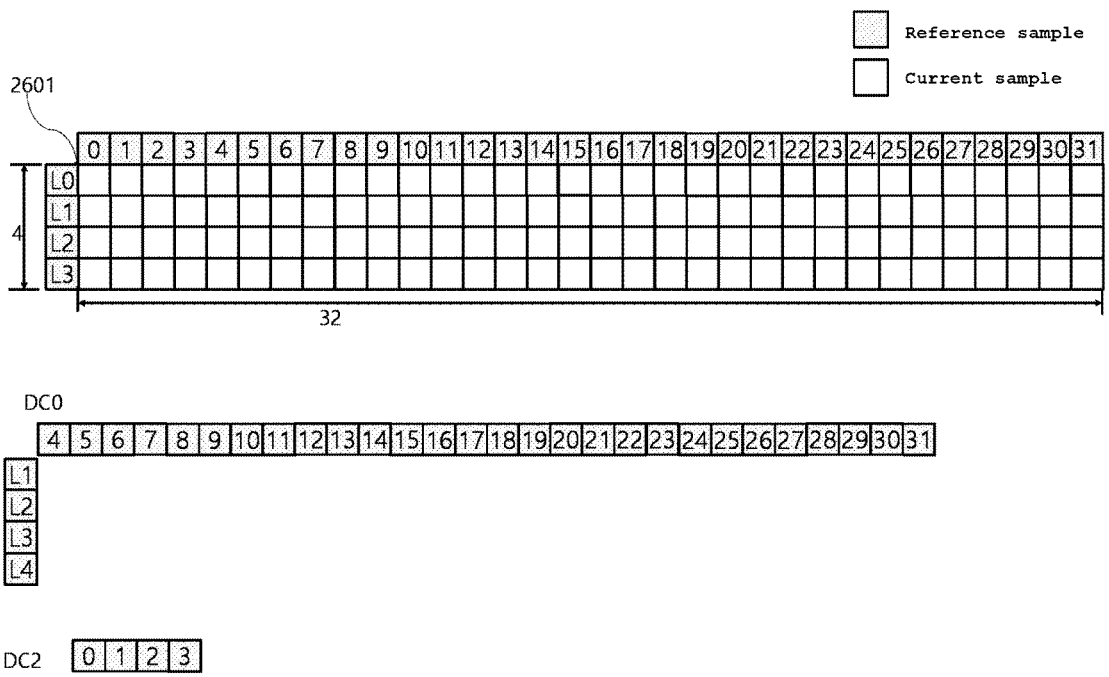

FIGS. 25 and 26 are diagrams illustrating an embodiment of a reference sample set for obtaining a DC value of a current block in the case where the height and the width of the current block are "4" and "32", respectively. In FIG. 25, a current block 2501 is a rectangular block of which the height and the width are "4" and "32", respectively. The embodiments described with reference to FIG. 22 may be applied to the embodiments in FIGS. 25 and 26. For example, the encoder and the decoder may configure a reference sample set including (32+4−4) (i.e., 32) reference samples. Specifically, the encoder and the decoder may obtain a first reference sample set including the remaining reference samples, excluding some reference samples 28, 29, 30, 31 on the longer side from all reference samples corresponding to the longer side and the shorter side of the current block.

According to an additional embodiment, referring to FIG. 26, a third reference sample set DC2 may be configured to include reference samples 0, 1, 2, and 3 other than the reference samples included in the first reference sample set DC0. In addition, a DC value of the current block 2601 may be obtained based on the first reference sample set DC0 and the second reference sample set DC1.

According to an embodiment of the present disclosure, a DC value of the current block may be obtained based on a reference sample set including some of the reference samples on the shorter side of the current block and some of the reference samples on the longer side of the current block. The encoder and the decoder may determine the number of short-sided reference samples and the number of long-sided reference samples, respectively, which are included in the reference sample set. The encoder and the decoder may determine a first number of short-sided reference samples and a second number of long-sided reference samples such that the sum of the number of short-sided reference samples and the number of long-sided reference samples, which are included in the reference sample set, is 2 to the power of n. The encoder and the decoder may configure a reference sample set including $2^n$ reference samples on the basis of the determined first and second numbers.

Figure 27:
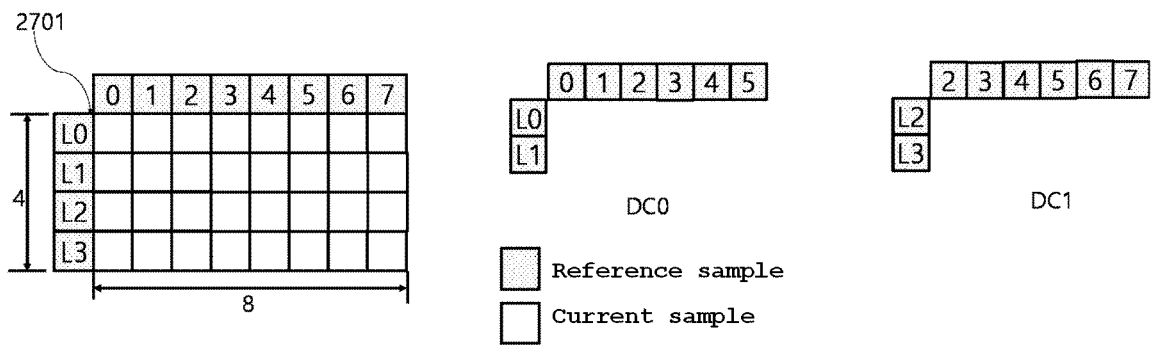
FIGS. 27, 28, and 29 are diagrams illustrating a reference sample set including some of the reference samples on the shorter one of a current block and some of the reference samples on a longer side of the current block according to an embodiment of the present disclosure.
Figure 28:
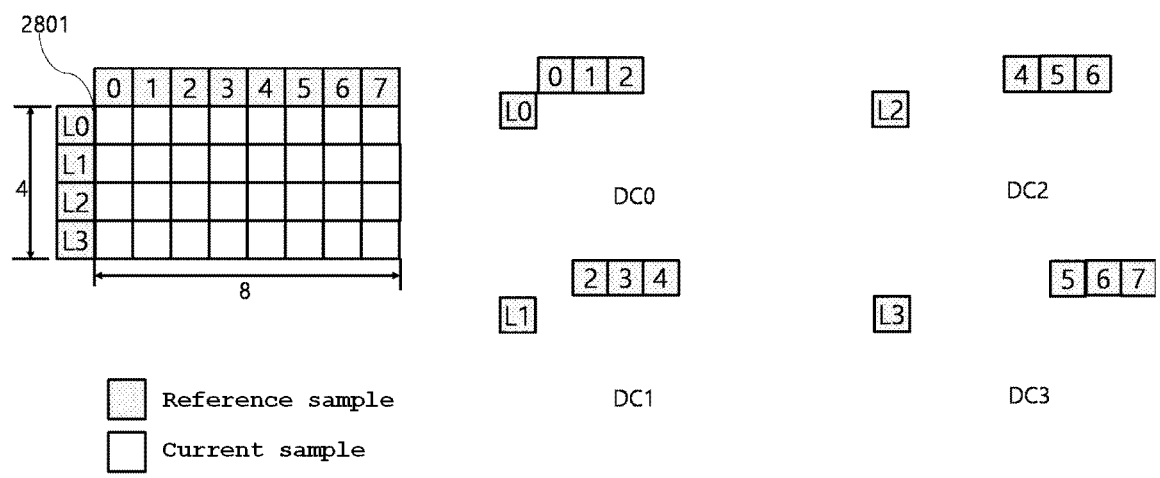
Figure 29:
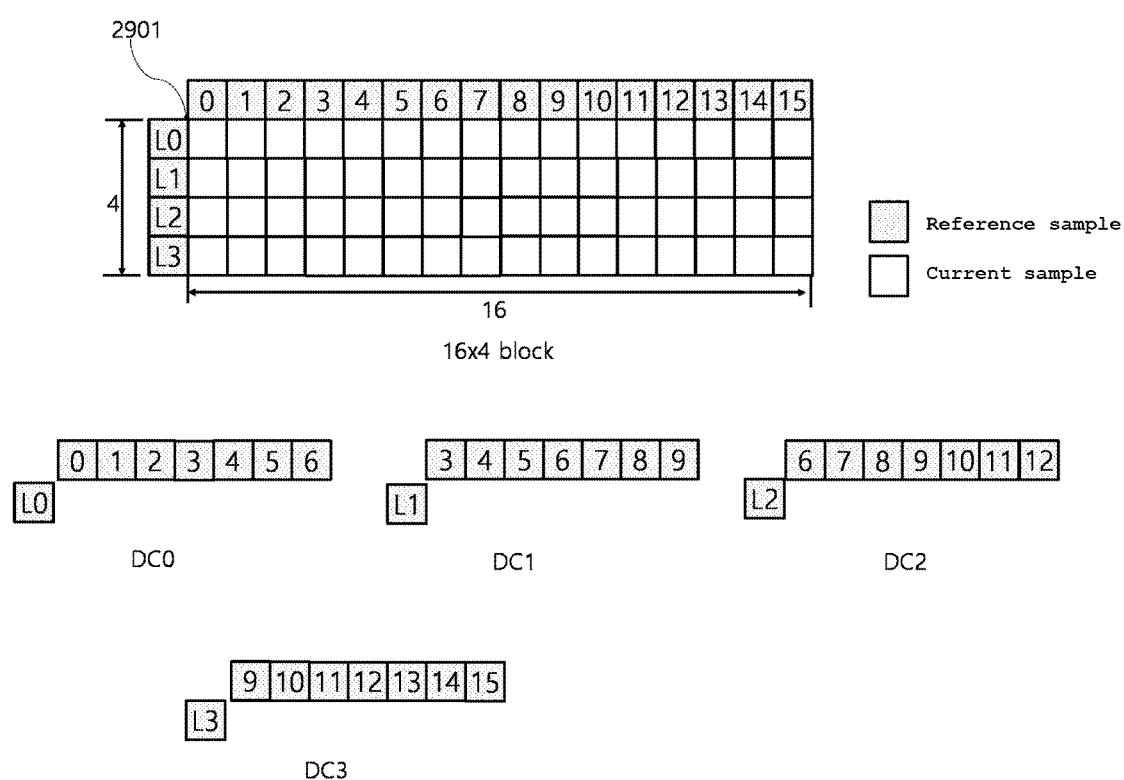

FIGS. 27, 28, and 29 are diagrams illustrating a reference sample set including some of the reference samples on a shorter side of a current block and some of the reference samples on a longer side of the current block according to an embodiment of the present disclosure. In FIG. 27, a current block 2701 is a rectangular block of which the height and the width are "4" and "8", respectively. According to an embodiment, a reference sample set may include two short-sided reference samples and six long-sided reference samples. For example, a first reference sample set DC0 may be configured to include two reference samples L0 and L1 positioned at the upper portion, among the short-sided reference samples, and six reference samples 0, 1, 2, 3, 4, and 5 sequenced from the left end of the long-sided reference samples. In addition, a second reference sample set DC1 may be configured to include two reference samples L2 and L3 positioned at the lower portion, among the short-sided reference samples, and six reference samples 2, 3, 4, 5, 6, and 7 sequenced from the right end of the long-sided reference samples.

In FIG. 28, a current block 2801 is a rectangular block of which the height and the width are "4" and "8", respectively. According to an embodiment, a reference sample set may include one short-sided reference sample and three long-sided reference samples. For example, a first reference sample set DC0 may be configured to include the uppermost reference sample L0 of the short-sided reference samples and three reference samples 0, 1, and 2 sequenced from the left end of the long-sided reference samples. In addition, a second reference sample set DC1 may be configured to include a reference sample L1 positioned at the second place from the top of the short-sided reference samples and three reference samples 2, 3, and 4 of the long-sided reference samples.

In FIG. 29, a current block 2901 is a rectangular block of which the height and the width are "4" and "16", respectively. According to an embodiment, a reference sample set may include one short-sided reference sample and seven long-sided reference samples. For example, a first reference sample set DC0 may be configured to include the uppermost reference sample L0 of the short-sided reference samples and seven reference samples 0, 1, 2, 3, 4, 5, and 6 sequenced from the left end of the long-sided reference samples.

Meanwhile, as described above, a DC value of the current block may be obtained based on at least one of a plurality of reference sample sets. According to a specific embodiment, each of a plurality of reference sample sets may include reference samples corresponding to any one of the first side and the second side of the current block. For example, a first reference sample set may include reference samples on the longer one of the first side and the second side of the current block. In addition, a second reference sample set may include reference samples on the shorter one of the first side and the second side of the current block. In addition, a DC value of the current block may be obtained based on at least one of the first reference sample set and the second reference sample set.

For example, a DC value of the current block may be obtained based on both the first reference sample set and the second reference sample set. In this case, a DC value of the current block may be obtained based on an average for each reference sample set as described above with reference to FIG. 14. Specifically, a DC value of the current block may be obtained based on the final average of a first average and a second average. In this case, the first average may be an average of reference samples included in the first reference sample set. In addition, the second average may be an average of reference samples included in the second reference sample set. Meanwhile, the number of reference samples included in the second reference sample set may be less than the number of reference samples included in the first reference sample set. In this case, the final average may be affected more by values of the reference samples on the shorter side than by values of the reference samples on the longer side. Accordingly, the encoder and the decoder according to an embodiment of the present disclosure may obtain the final average by applying a weight to each of the first average and the second average.

Figure 30:
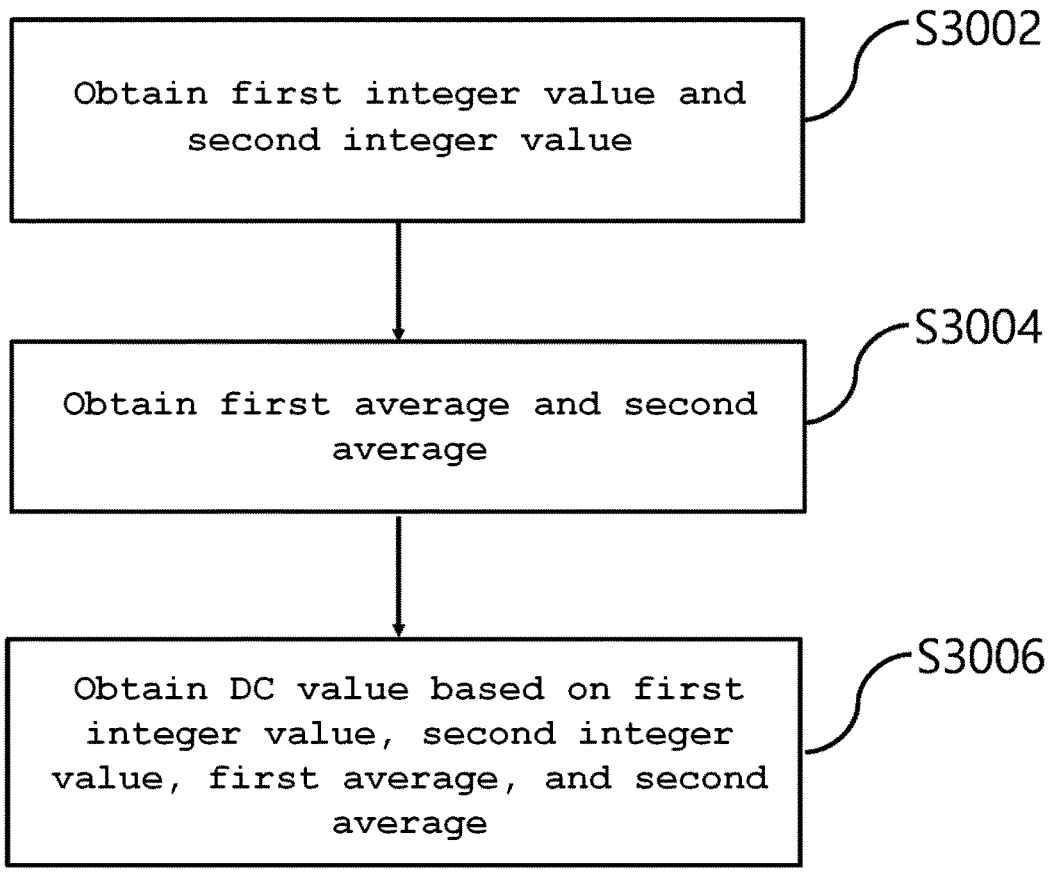
FIG. 30 is a flowchart illustrating a method of applying a weight to an average for each reference sample set according to an embodiment of the present disclosure.

FIG. 30 is a flowchart illustrating a method of applying a weight to an average for each reference sample set according to an embodiment of the present disclosure. In step S3002, the encoder and the decoder may obtain a first integer value and a second integer value based on the ratio of the shorter side to the longer side of the current block. Here, the first integer value may be an integerized weight applied to the first average of sample values of the reference samples on the longer side of the current block. In addition, the second integer value may be an integerized weight applied to the second average of sample values of the reference samples on the shorter side of the current block. For example, the encoder and the decoder may obtain a first weight and a second weight based on the ratio of the shorter side to the longer side of the current block. The first weight and the second weight may be weights for the first average and the second average, respectively. Next, the encoder and the decoder may obtain a first integer value and a second integer value by integerizing the first weight and the second weight. The first weight and the second weight may be expressed as shown in Equation 5 below.

First weight: $2*W/(H+W)$(longer side)

Second weight: $2*H/(H+W)$(shorter side)  [Equation 5]

According to a specific embodiment, weights according to the ratio of the shorter side (H) to the longer side (W) may be as follows. In this case, each of the weights may be expressed as a floating point value.

1) W×H=1:2
First weight: 1.3333
Second weight: 0.66667
2) W×H=1:4
First weight: 1.5873
Second weight: 0.4
3) W×H=1:8
First weight: 1.7921
Second weight: 0.22222
4) W×H=1:16
First weight: 1.8382
Second weight: 0.11765

The weights according to the shape of the current block are provided by way of example, and the present disclosure is not limited thereto. In addition, a place where rounding is performed after a decimal point may vary. For example, the place where rounding is performed after the decimal point may be determined based on at least one of an accuracy or a size of a scaling number.

Next, the encoder and the decoder may integerize the first weight and the second weight based on a predetermined index value. The encoder and the decoder may obtain a first integer value and a second integer value by multiplying each of the first weight and the second weight by a predetermined index value. The predetermined index value may be 2 to the power of n. For example, the predetermined index value may be 2 to the power of 16. Hereinafter, a method of obtaining a first integer value and a second integer value in the case where the predetermined index value is 2 to the power of 16 will be described.

If a predetermined index value is 16, and if the ratio of a shorter side to a longer side is 1:2, 1:4, 1:8, and 1:16, the following results are obtained by multiplying a first weight by the predetermined index value.

$W×H=1:2: 2/3*2^16=43690.6666666667$  1)

$W×H=1:4: 4/5*2^16=52428.8000000000$  2)

$W×H=1:8: 8/9*2^16=58254.2222222222$  3)

$W×H=1:16: 16/17*2^16=61680.9411764706$  4)

First weights for respective ratios multiplied by the predetermined index value are real values including a decimal point. The encoder and the decoder may integerize the first weight multiplied by the predetermined index value. In this case, the encoder and the decoder may integerize the first weight multiplied by the predetermined index value using any one of rounding off, a ceiling function, and a floor function. According to an embodiment, the same method may be applied to the first weight and the second weight, or a plurality of methods may be applied thereto. For example, rounding off may be applied to the first weight value, and a ceiling function may be applied to the second weight value.

According to an embodiment, when rounding off is applied to the first weight multiplied by a predetermined index value, the encoder and the decoder may obtain the following first integer values.

1) W×H=1:2: 43690.6666666667 becomes 43691.
2) W×H=1:4: 52428.8000000000 becomes 52429.
3) W×H=1:8: 58254.2222222222 becomes 58254.
4) W×H=1:16: 61680.9411764706 becomes 61681.

According to another embodiment, when applying a ceiling function to the first weight multiplied by a predetermined index value, the encoder and the decoder may obtain the following first integer values.

1) W×H=1:2: 43690.6666666667 becomes 43691.
2) W×H=1:4: 52428.8000000000 becomes 52429.
3) W×H=1:8: 58254.2222222222 becomes 58255.
4) W×H=1:16: 61680.9411764706 becomes 61681.

According to another embodiment, when applying a floor function to the first weight multiplied by a predetermined index value, the encoder and the decoder may obtain the following first integer values.

1) W×H=1:2: 43690.6666666667 becomes 43690.
2) W×H=1:4: 52428.8000000000 becomes 52428.
3) W×H=1:8: 58254.2222222222 becomes 58254.
4) W×H=1:16: 61680.9411764706 becomes 61680.

In step S3004, the encoder and the decoder may obtain a first average and a second average. Here, the first average and the second average may be rounded values. In step S3006, the encoder and the decoder may obtain a DC value of the current block based on the first average, the second average, the first integer value, and the second integer value. For example, the encoder and the decoder may obtain a first intermediate value by applying the first integer value to the first average. In addition, the encoder and the decoder may obtain a second intermediate value by applying the second integer value to the second average. Next, the encoder and the decoder may obtain a DC value of the current block based on the average of the first intermediate value and the second intermediate value. In addition, the encoder and the decoder may predict the current block based on the obtained DC value.

Figure 31:
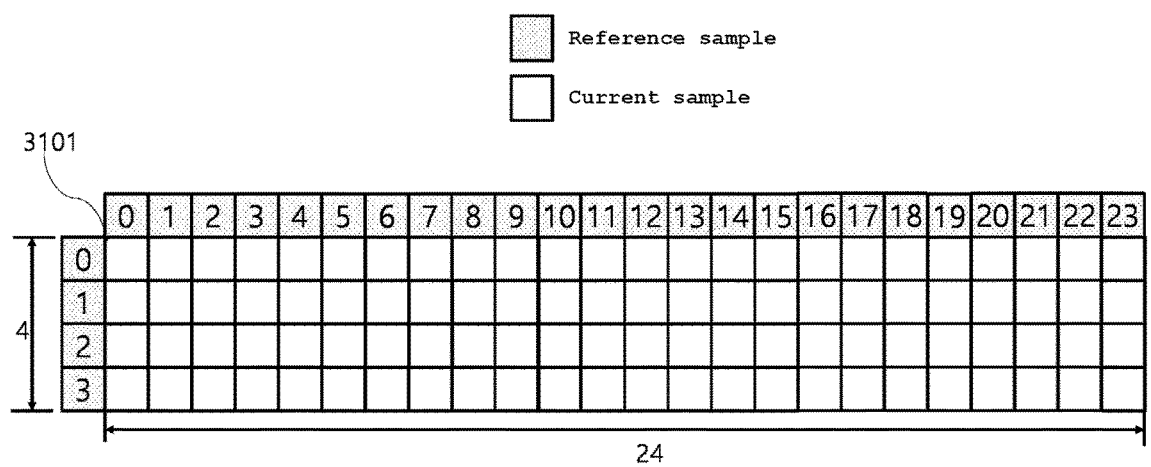
FIG. 31 is a diagram illustrating a method of obtaining a DC value in the case where the length of one of a first side and a second side of a current block is not 2 to the power of n according to an embodiment of the present disclosure.

Meanwhile, at least one of the width and the height of the current block may not be 2 to the power of n. In this case, like the above-described embodiments, the number of reference samples corresponding to the upper side and the left side of the current block may not be 2 to the power of n. FIG. 31 is a diagram illustrating a method of obtaining a DC value in the case where the length of any one of a first side and a second side of a current block is not 2 to the power of n according to an embodiment of the present disclosure. In FIG. 31, the current block 3101 is a rectangular block of which the height and the width are "4" and "24", respectively. Also, the ratio of a shorter side to a longer side of the current block 3101 may be "6". In this case, a DC value of the current block 3101 may be obtained using the method described with reference to FIG. 30 above.

For example, the encoder and the decoder may obtain a first average of values of reference samples on the longer side of the current block 3101. The encoder and the decoder may obtain a second average of values of reference samples on the shorter side of the current block 3101. A second weight and a first weight for the first average and the second average may be obtained based on the length of the shorter side and the length of the longer side, respectively. The encoder and the decoder may normalize the first weight and the second weight based on the above-described predetermined index value. In addition, the encoder and the decoder may normalize the first weight and the second weight, thereby obtaining a first integer value and a second integer value. In addition, the encoder and the decoder may apply the first integer value and the second integer value to the first average and the second average, respectively, thereby obtaining a DC value of the current block.

The encoder and the decoder may use the above-described methods for obtaining a DC value of the current block. In addition, in the step of obtaining a DC value, the encoder may obtain a DC value using addition and shift operations without a division operation. The decoder may obtain a prediction mode of a corresponding block from a bitstream. In addition, in the case where the prediction mode of the current block is a DC mode, the decoder may obtain a DC value using addition and shift operations without a division operation.

Figure 32:
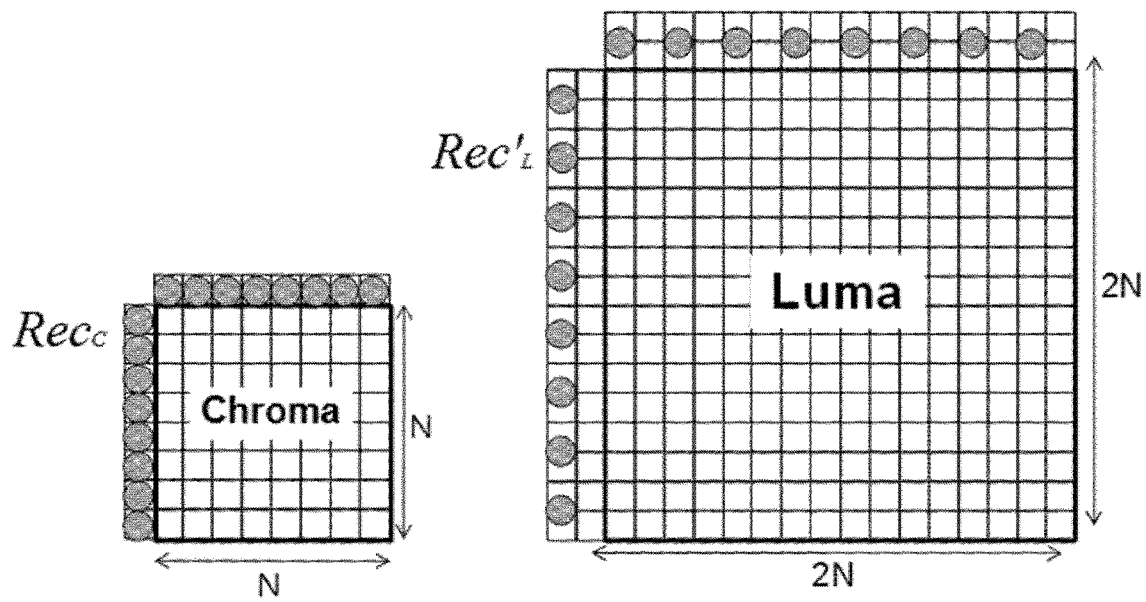
FIG. 32 shows an embodiment of a luma block and a chroma block of a current unit.

Meanwhile, as described above, the current unit may include both a luma component and a chroma component corresponding to a corresponding image area. Hereinafter, a method of predicting a chroma block of the current unit according to an embodiment of the present disclosure will be described with reference to FIGS. 32 to 41. FIG. 32 shows an embodiment of a luma block and a chroma block of a current unit. According to an embodiment of the present disclosure, a prediction block corresponding to a specific component of the current unit may be obtained using reconstructed sample values of other components of the current unit. This method may be referred to as a "cross-component linear model (CCLM) method". According thereto, the encoder and the decoder according to the present disclosure may improve compression performance of a video signal.

For example, the current unit may include a first component and a second component. In this case, the encoder and the decoder may obtain a prediction block corresponding to the second component based on a reconstructed sample value of the first component. According to an embodiment, the encoder and the decoder may obtain a relationship model indicating a relationship between the first component and the second component of the current unit. For example, the relationship model may be a mathematical relationship. In addition, the encoder and the decoder may obtain a prediction block corresponding to the second component from the reconstructed sample value of the first component based on the obtained relationship model.

According to an embodiment of the present disclosure, the relationship model representing a relationship between the first component and the second component may be obtained based on reference samples of the current unit. For example, the current unit may include a first block corresponding to the first component and a second block corresponding to the second component. As shown in FIG. 32, the first block and the second block may have different sizes. In addition, the encoder and the decoder may obtain a relationship model indicating a relationship between the first component and the second component based on first reference samples around the first block and second reference samples around the second block. In addition, the second block may be predicted using the first block and the obtained relationship model. According to an embodiment, the first component may be any one of a luma component and chroma components (i.e., Cb and Cr). In addition, the second component may be any one, which is different from the first component, among the luma component and the chroma components. For example, the first component may represent the luma component. In addition, the second component may represent any one of the chroma components. Further, the encoder and the decoder may predict another component based on reconstructed sample values of two or more components. For example, the encoder and the decoder may use the above-described method for chroma intra-prediction.

Hereinafter, a method of predicting a chroma block of the current unit using the CCLM method will be described. According to an embodiment, the relationship model used in the CCLM method may be expressed as a linear model shown in Equation 6. In Equation 6, predC(i, j) represents the predicted sample value at the position (i, j) in the chroma block. In addition, recL(i, j) represents the reconstructed sample value at the position (i, j) in the luma block of the current unit.

$$predC(i,j) = \alpha \cdot recL(i,j) + \beta \qquad \text{[Equation 6]}$$

In this case, the number of samples included in the chroma block may be smaller than the number of samples included in the luma block. For example, the YCbCr sampling ratio of a video signal processed by the encoder and the decoder may be 4:2:0. In this case, the prediction block of the chroma block may be obtained based on down-sampled luma sample values. In addition, the parameters α and β may be obtained based on a relationship between luma reference samples around the luma block and chroma reference samples around the chroma block.

$$\alpha = \frac{N \cdot \sum (L(n) \cdot C(n)) - \sum L(n) \cdot \sum C(n)}{N \cdot \sum (L(n) \cdot L(n)) - \sum L(n) \cdot \sum L(n)} \qquad \text{[Equation 7]}$$

$$\beta = \frac{\sum C(n) - \alpha \cdot \sum L(n)}{N} \qquad \text{[Equation 8]}$$

In Equation 7, L(n) represents an $n^{th}$ luma reference sample, and C(n) represents an $n^{th}$ chroma reference sample. In addition, in the case where the number of luma reference samples is larger than the number of chroma reference samples, down-sampled luma reference samples may be used. In Equation 8, N may represent the number of chroma reference samples. For example, C(n) may be an $n^{th}$ chroma reference sample among the chroma reference samples on the upper and left portions of the chroma block.

According to an embodiment of the present disclosure, a modeling group including a plurality of reference samples used to obtain a relationship model may be configured in various ways. The modeling group may include a plurality of reference samples used to obtain a relationship model, among the reference samples of the current block. In addition, the modeling group may include a luma modeling group including luma reference samples and a chroma modeling group including chroma reference samples. For example, the chroma component of the current unit may be more likely to be predicted in a direction similar to the direction in which the luma component is predicted. Accordingly, the modeling group may be configured based on a prediction mode of the luma block. The prediction mode of the luma block may be a prediction mode used in prediction of a luma component.

Figure 35:
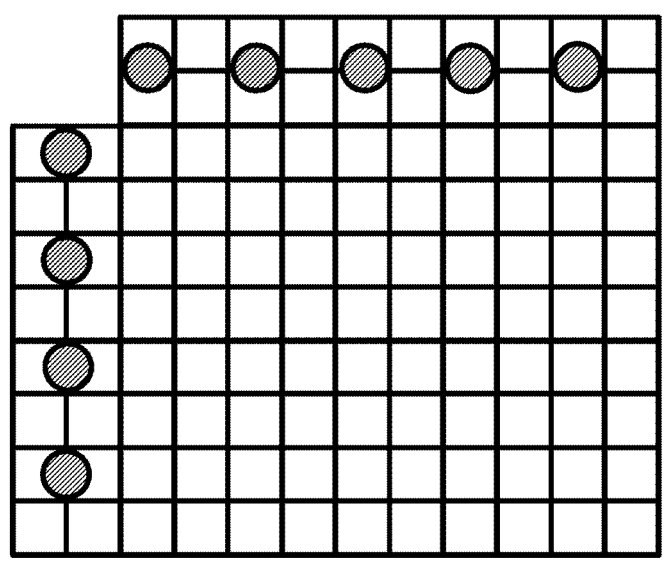
FIG. 35 is a diagram illustrating a modeling group in the case where a representative prediction mode of a luma block of a current unit is not an angular mode according to an embodiment of the present disclosure.
Figure 36:
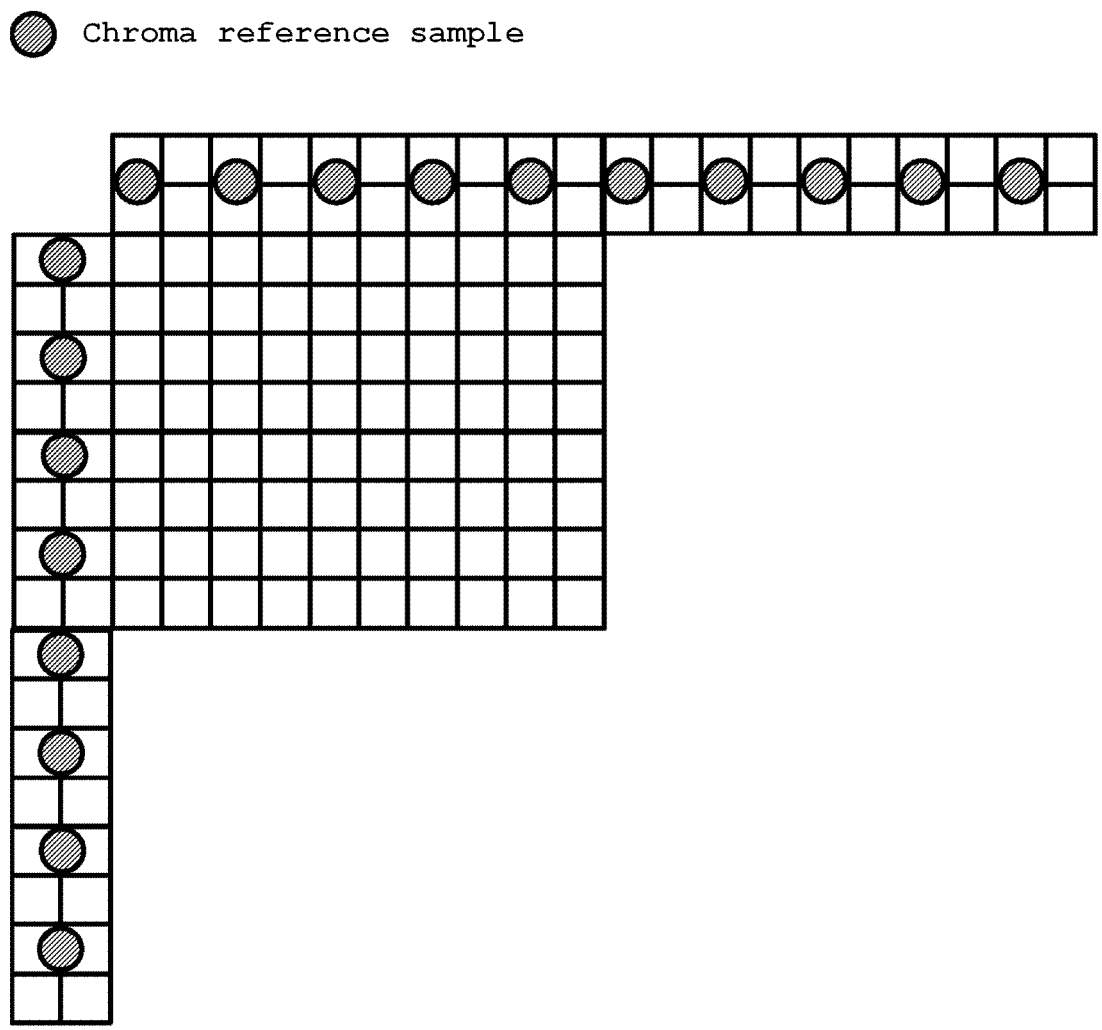
FIG. 36 is a diagram illustrating a modeling group according to another embodiment of the present disclosure.
Figure 38:
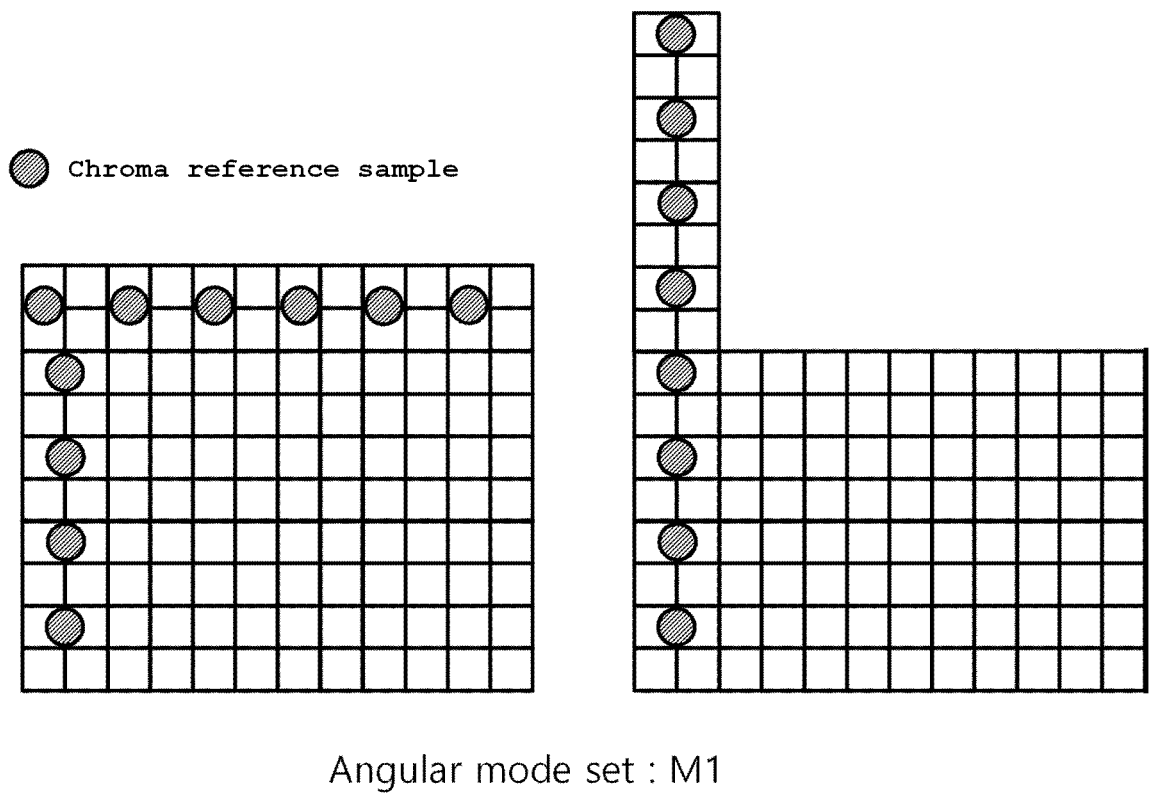

According to an embodiment, if the prediction mode of a luma component is not an angular mode, the reference samples at the positions shown in FIG. 35, 36, or 38 may be used to obtain a relationship model. For example, the prediction mode may be one of a planar mode and a DC mode, instead of the angular mode. In addition, even if the prediction mode of the luma component is a diagonal mode or an angular mode around the diagonal mode, the reference samples at the positions shown in FIG. 35, 36, or 38 may be used to obtain a relationship model.

Figure 37:
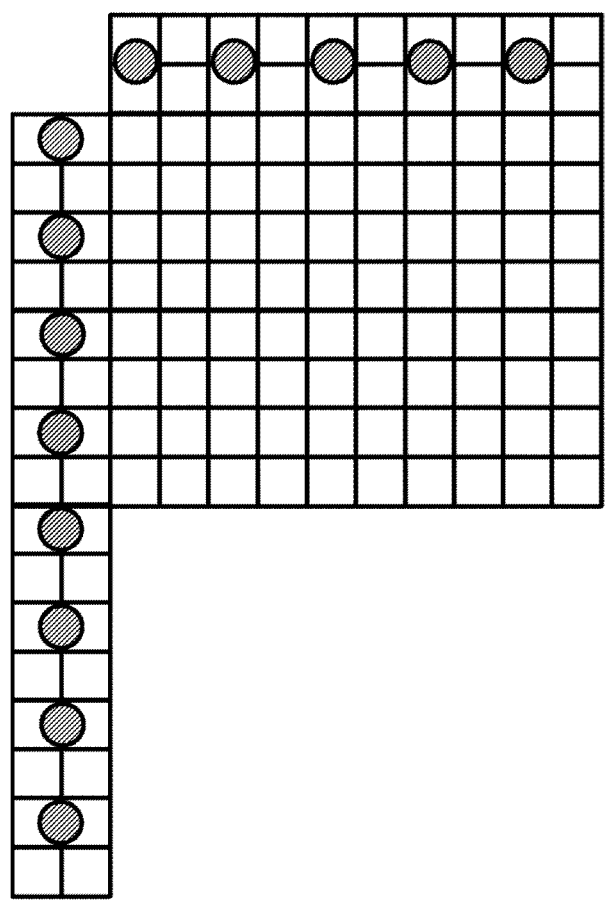
FIGS. 37, 38, and 39 are diagrams illustrating a modeling group according to another embodiment of the present disclosure.

According to another embodiment, if the prediction mode of the luma block is a horizontal mode or an angular mode around the horizontal mode, the reference samples at the positions shown in FIG. 37 may be used to obtain a relationship model. According to another embodiment, if the prediction mode of the luma block is a vertical mode or an angular mode around the vertical mode, the reference samples at the positions shown in FIG. 39 may be used to obtain a relationship model.

Meanwhile, the encoder may signal a method of configuring the above-described modeling group. Hereinafter, a method of signaling the method of configuring a modeling group will be described. According to an embodiment of the present disclosure, a method of configuring a modeling group may be signaled based on a luma prediction mode. According to an embodiment, the method of configuring a modeling group may include a first configuration method, a second configuration method, and a third configuration method. In this case, the first configuration method, the second configuration method, and the third configuration method may be signaled through first signaling, second signaling, and third signaling, respectively. At this time, each of the signaling methods may be signaled based on the prediction mode of a luma block.

According to an embodiment, a method of configuring a modeling group may be signaled using variable length bits. For example, the first configuration method, the second configuration method, and the third configuration method may be signaled through bits such as 0, 10, or 11 (or 1, 01, or 00), respectively. The method of configuring a modeling group illustrated in FIG. 35, 36, or 38 may be a first configuration method, the method of configuring a modeling group illustrated in FIG. 37 may be a second configuration method, and the method of configuring a modeling group illustrated in FIG. 39 may be a third configuration method. In this case, a modeling group configuration method signaled using a minimum bit may be determined based on the luma component prediction mode. For example, if the prediction mode of a luma block is a horizontal mode, the encoder may signal the second configuration method using the smallest number of bits. In addition, if the prediction mode of a luma block is a vertical mode, the encoder may signal the third configuration method using the smallest number of bits.

Meanwhile, in a picture (tile or slice), a luma block and a chroma block may be divided by independent methods of each other. Accordingly, there may be a plurality of prediction modes of the luma block corresponding to the chroma block. In this case, the encoder and the decoder may determine a representative prediction mode that is one of the plurality of prediction modes. A description thereof will be made later with reference to FIG. 33. In addition, if there is a plurality of prediction modes of the luma block corresponding to the chroma block of the current unit, reference samples at different positions may be used for respective sub-blocks corresponding to the plurality of luma prediction modes.

Figure 33:
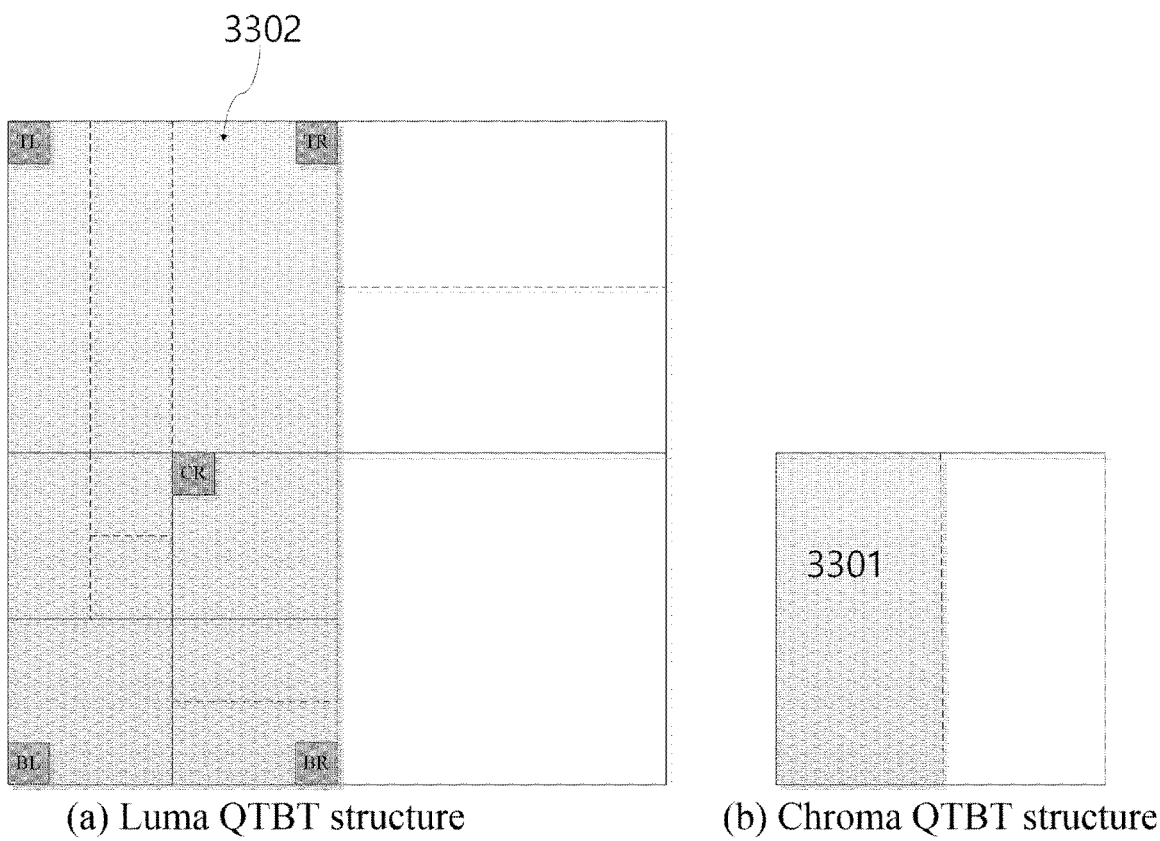
FIG. 33 is a diagram illustrating an embodiment in which a luma block and a chroma block are divided in different forms.

Hereinafter, a method of configuring a modeling group according to an embodiment of the present disclosure will be described in detail with reference to FIGS. 33 to 39. FIG. 33 is a diagram illustrating an embodiment in which a luma block and a chroma block are divided in different forms from each other. A current unit may be included in an I-picture (tile/slice). In addition, the sampling ratio of YCbCr of the current unit may be 4:2:0.

According to an embodiment of the present disclosure, the method of configuring a modeling group may vary depending on the structure in which a luma block and a chroma block are divided. In the case where the luma block and the chroma block of the current unit are divided according to a single tree method, there may be one-to-one correspondence between the chroma block and the luma block of the current unit. The single tree method may represent a method in which the luma block and the chroma block of the current unit are divided in the same manner. In this case, the modeling group may be configured based on an intra-prediction mode of the luma block of the current unit.

On the other hand, in the case where the luma block and the chroma block of the current unit are divided according to a split tree method, the chroma block and the luma block of the current unit may be divided in different structures as shown in FIG. 33. The split tree method may represent a method in which the luma block and the chroma block of the current unit are divided in different structures. In this case, it may be difficult to make one-to-one correspondence between the chroma block and the luma block of the current unit. A chroma block 3301 at the left portion in FIG. 33(b) and a luma block 3302 corresponding to the chroma block 3301 may be divided by different methods. Accordingly, a method of determining a representative prediction mode of a luma block may be required.

According to an embodiment, a method of configuring a modeling group may be determined based on intra-prediction mode information corresponding to each luma sub-block including specific positions. For example, five predetermined positions may be the top-left (TL), the top-right (TR), the center-right (CR), the below-left (BL), and the below-right (BR). The encoder and the decoder may determine a representative prediction mode of a luma block among the intra-prediction modes of luma sub-blocks including respective predetermined positions. For example, the encoder and the decoder may use an angular mode having the highest priority according to a predetermined order as a representative prediction mode, among the intra-prediction modes of luma sub-blocks including predetermined positions.

According to another embodiment, the intra-prediction mode of a luma sub-block including a predetermined position may be used as a representative prediction mode. For example, the predetermined position may be any one of the five predetermined positions described above. For example, the predetermined position may be the BR. The BR may be the farthest position from the reference samples.

According to another embodiment, a representative prediction mode may be obtained based on an intra-prediction mode of luma sub-blocks including respective ones of two or more predetermined positions. For example, the encoder and the decoder may obtain a representative prediction mode based on an average of the indices of the first intra-prediction mode and the second intra-prediction mode corresponding to two predetermined positions, respectively.

According to another embodiment, a representative prediction mode may be obtained based on the frequency of intra-prediction modes corresponding to respective ones of the five predetermined positions in FIG. 33(a). For example, the encoder and the decoder may obtain a frequency for each intra-prediction mode among the intra-prediction modes corresponding to the TL, the TR, the CR, the BL, and the BR. In addition, the encoder and the decoder may use an intra-prediction mode having a high frequency as a representative prediction mode based on the frequency of each intra-prediction mode.

Figure 34:
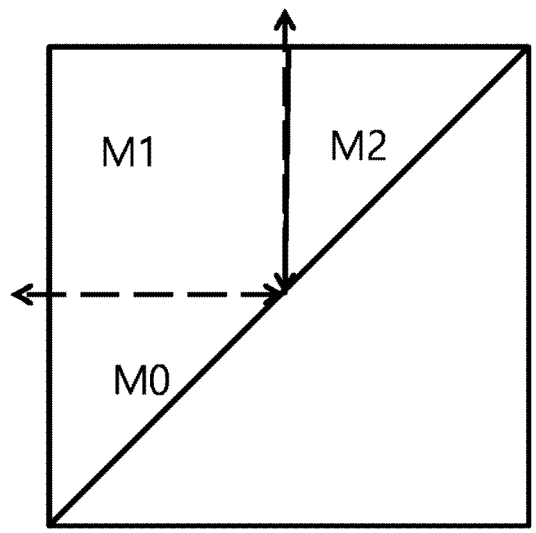
FIG. 34 is a diagram illustrating intra-prediction modes classified by areas according to an embodiment of the present disclosure.

According to an additional embodiment, the encoder and the decoder may group intra-prediction modes, thereby obtaining the frequency for each prediction mode group. FIG. 34 is a diagram illustrating intra-prediction modes classified by areas according to an embodiment of the present disclosure. FIG. 34 is a diagram illustrating an embodiment in which angular modes are grouped into three prediction mode groups M0, M1, and M2. However, the present disclosure is not limited thereto, and the encoder and the decoder may make three or less or three or more prediction mode groups depending on the angles of the angular modes.

For example, among the intra-prediction modes corresponding to five predetermined positions, intra-prediction modes belonging to a first prediction mode group M0 may be the most. In this case, the encoder and the decoder may use any one of the intra-prediction modes belonging to the first prediction mode group M0 as a representative prediction mode.

FIG. 35 is a diagram illustrating a modeling group in the case where a representative prediction mode of a luma block of a current unit is not an angular mode according to an embodiment of the present disclosure. According to an embodiment, if a representative prediction mode of a luma block of a current unit is not an angular mode, the encoder and the decoder may obtain a relationship model between a luma block and a chroma block using reference samples corresponding to the left side and the upper side of the chroma block.

FIG. 36 is a diagram illustrating a modeling group according to another embodiment of the present disclosure. According to an embodiment, if a representative prediction mode of a luma block of a current unit is a non-directional mode, an extended modeling group may be used as shown in FIG. 36. Alternatively, in the case of obtaining a relationship model using reference samples at different positions for respective luma sub-blocks, an extended modeling group may be used as shown in FIG. 36. According to the modeling group in FIG. 36, the encoder and the decoder may obtain a relationship model between a first component and a second component using a wider range of reference samples than that in the modeling group shown in FIG. 35.

Figure 39:
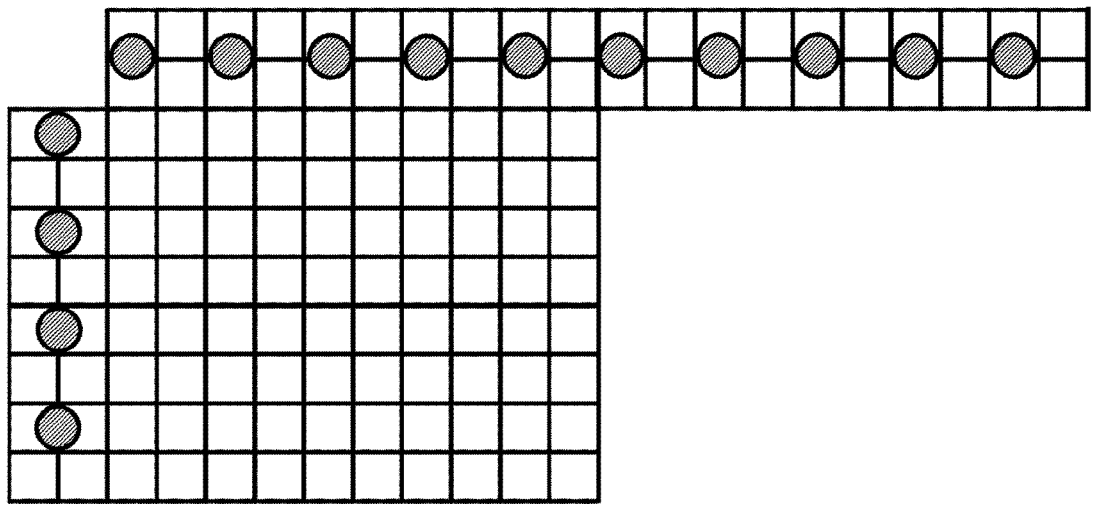

FIGS. 37, 38, and 39 are diagrams illustrating a modeling group according to another embodiment of the present disclosure. FIG. 37 may show a modeling group used for a relationship model between a first component and a second component of a current unit in the case where a representative prediction mode of a luma block of the current unit belongs to the first prediction mode group M0 shown in FIG. 34. Intra-prediction modes belonging to the first prediction mode group M0 may be predicted using reference samples on the left boundary of the current block. Accordingly, a relationship model may be obtained based on a first modeling group further including reference samples on the line adjacent to the left boundary of the current block, compared to the modeling group shown in FIG. 35.

FIG. 38 may show a modeling group used for a relationship model between a first component and a second component of a current unit in the case where a representative prediction mode of a luma block of the current unit belongs to the second prediction mode group M1 shown in FIG. 34. If the intra-prediction mode of the luma block belongs to the second prediction mode group M1, values of samples of the current block may be similar to values of samples at the upper-left portion of the current block. Accordingly, a relationship model may be obtained based on a second modeling group further including a sample positioned at the upper-left portion of the current block, compared to the modeling group shown in FIG. 35. The position of the upper-left sample, among the chroma reference samples, may vary depending on a sub-sampling method.

FIG. 39 may show a modeling group used for a relationship model between a first component and a second component of a current unit in the case where a representative prediction mode of a luma block of the current unit belongs to the third prediction mode group M2 shown in FIG. 34. Intra-prediction modes belonging to the third prediction mode group M2 may be predicted using reference samples on the upper boundary of the current block. Accordingly, a relationship model may be obtained based on a third modeling group further including reference samples on the line adjacent to the upper boundary of the current block, compared to the modeling group shown in FIG. 35.

Figure 40:
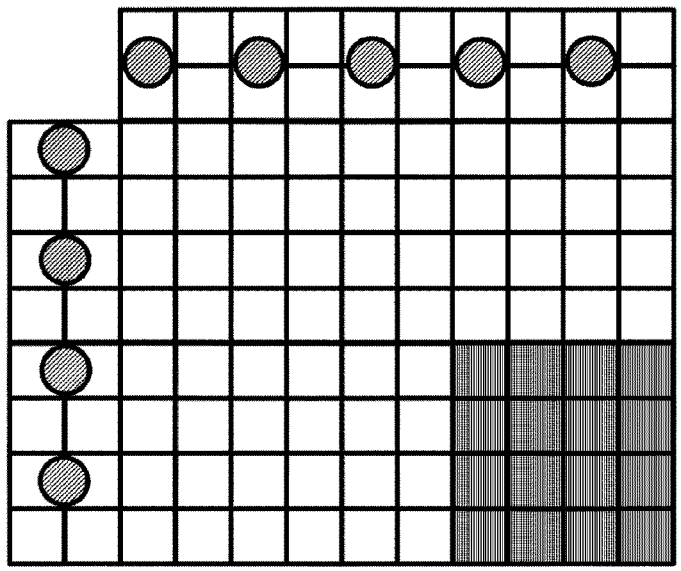
FIG. 40 is a diagram illustrating a method of reconstructing a chroma block based on a plurality of relationship models according to an embodiment of the present disclosure.

FIG. 40 is a diagram illustrating a method of reconstructing a chroma block based on a plurality of relationship models according to an embodiment of the present disclosure. As described above, in the case where a current unit is divided by a split tree method, there may be a plurality of prediction modes of a luma block corresponding to a chroma block. In this case, a CCLM method may be applied to divide the prediction mode of the luma block into the same areas.

Referring to FIG. 40, the current unit may be divided into a first area and a second area. According to an embodiment, the current unit may be divided into a first area and a second area based on a prediction mode of a luma block. In addition, a relationship model between a luma block and a chroma block may be obtained separately for the first area and the second area. For example, a first relationship model corresponding to the first area and a second relationship model corresponding to the second area may be independent of each other. In addition, the encoder and the decoder may obtain the first relationship model and the second relationship model in different methods. For example, the encoder and the decoder may obtain the first relationship model based on a prediction mode in the first area. In addition, the encoder and the decoder may obtain the second relationship model based on a prediction mode in the second area. Next, the encoder and the decoder may reconstruct samples at the positions corresponding to the first area in the chroma block based on the first relationship model. In addition, the encoder and the decoder may reconstruct samples at the positions corresponding to the second area in the chroma block based on the second relationship model.

According to an embodiment, a plurality of different relationship models may be used depending on the positions of samples in the current unit. For example, the samples positioned at the upper portion of a reference diagonal line may be reconstructed using an upper relationship model. In this case, the reference diagonal line may be a diagonal line connecting the position of the upper left sample and the position of the lower right sample of the current unit. In addition, the upper relationship model may be a model obtained based on the reference samples positioned at the upper portion of the current unit. Here, the reference samples positioned at the upper portion of the current unit may be the reference samples positioned at the upper portions of the chroma and luma blocks of the current unit. The samples positioned at the lower portion of the reference diagonal line may be reconstructed using a left relationship model. In this case, the left relationship model may be a model obtained based on left reference samples of the current unit. Here, the left reference samples of the current unit may be the left reference samples of the chroma and luma blocks of the current unit.

Figure 41:
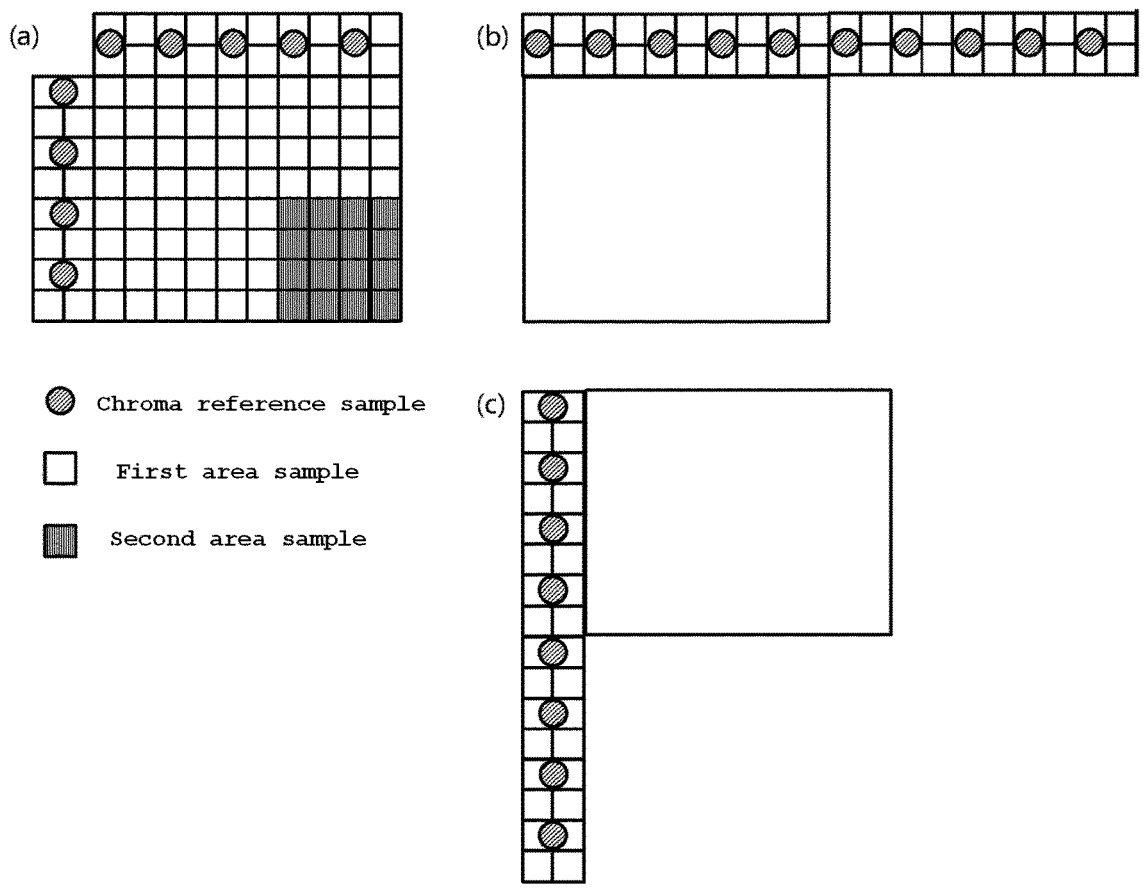
FIG. 41 is a diagram illustrating a detailed embodiment of a method of reconstructing a chroma block based on a plurality of relationship models.

FIG. 41 is a diagram illustrating a detailed embodiment of a method of reconstructing a chroma block based on a plurality of relationship models. Referring to FIG. 41, a current unit may be divided into a first area and a second area. In this case, a first relationship model for the first area may be obtained based on the modeling group configured as shown in FIG. 41(*b*). In addition, a second relationship model for the second area may be obtained based on the modeling group configured as shown in FIG. 41(*c*).

For example, the encoder and the decoder may obtain a first relationship model based on reference samples positioned at the upper portion of the current unit. In addition, the encoder and the decoder may obtain a second relationship model based on reference samples positioned at the left portion of the current unit. Next, the encoder and the decoder may reconstruct the samples at the positions corresponding to the first area in the chroma block based on the first relationship model. In addition, the encoder and the decoder may reconstruct the samples at the positions corresponding to the second area in the chroma block based on the second relationship model.

Figure 42:
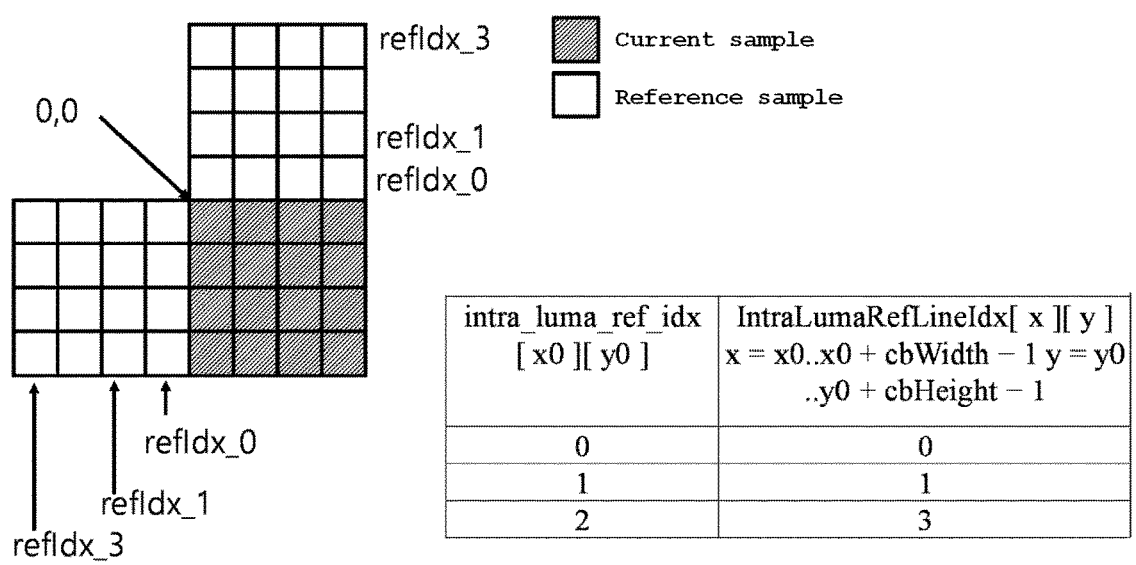
FIG. 42 is a diagram illustrating an embodiment of reference samples in the case where a prediction mode of a current block is a DC mode.

Meanwhile, as described above, the samples on a plurality of reference lines may be used for intra-prediction of the current block. FIG. 42 is a diagram illustrating an embodiment of reference samples in the case where a prediction mode of a current block is a DC mode. Referring to FIG. 42, the current block is a square block having a size of 4×4. If the prediction mode of the current block is a DC mode, the encoder and the decoder may obtain a DC value of the current block based on DC reference samples on any one of a plurality of reference lines refIdx_0, refIdx_1, and refIdx_3.

According to an embodiment, the encoder may signal a reference line index indicating any one of the plurality of reference lines. The decoder may obtain a reference line index indicating any one of the plurality of reference lines. Specifically, the decoder may obtain intra_luma_ref_Idx[x0][y0] by parsing a bitstream. In addition, the decoder may obtain a reference line index IntraLumaRefLineIdx[x0][y0] from intra_luma_ref_Idx[x0][y0]. For example, if the reference line index is "0", the reference line index may indicate a reference line adjacent to the boundary of the current block. In addition, if the reference line index is "1", the reference line index may indicate a reference line spaced by one sample apart from the boundary of the current block. Further, if the reference line index is "3", the reference line index may indicate a reference line spaced by three samples apart from the boundary of the current block.

According to an embodiment, if the reference line index is "refIdx", a DC value of the current block may be obtained based on reference samples on the left side at the positions of x=−1-refIdx and y=0 . . . nTbH−1 and reference samples on the upper side at the positions of x=0 . . . nTbW−1 and y=−1-refIdx. Here, nTbW and nTbH may represent the width and the height of the current block, respectively.

Figure 43:
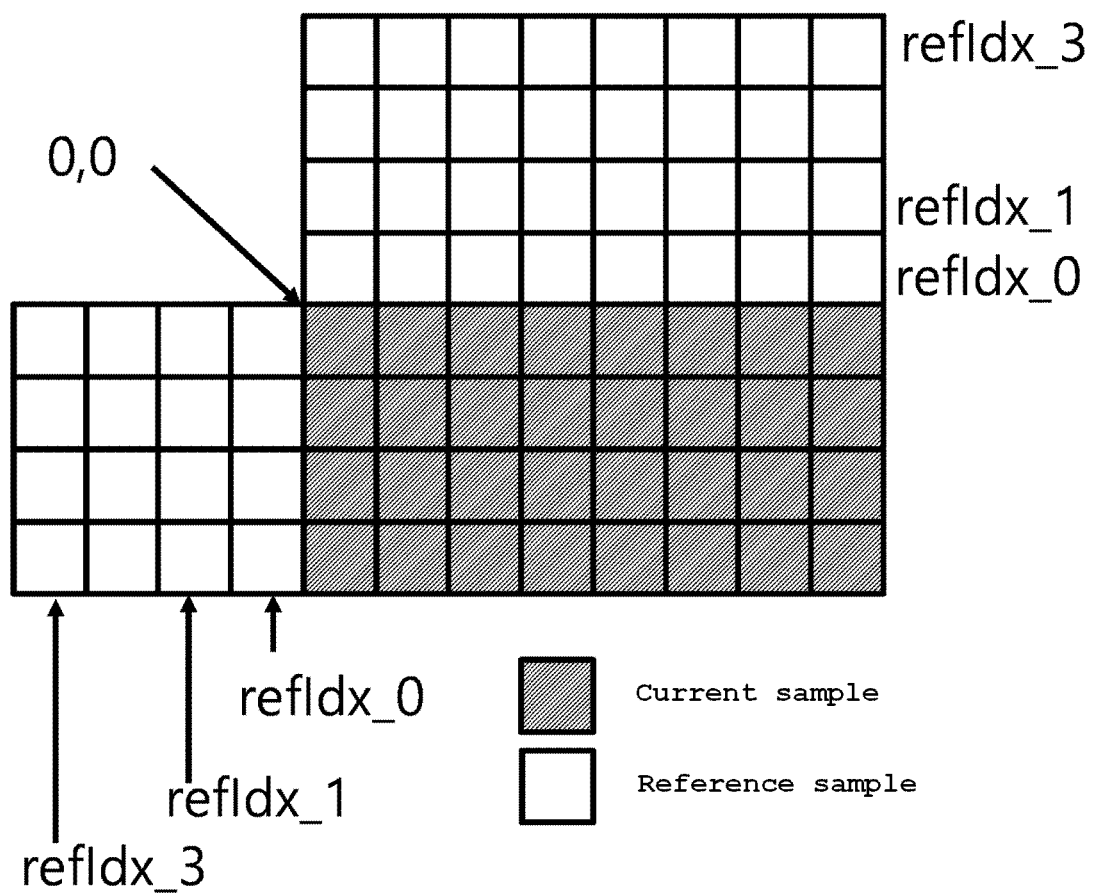
FIGS. 43 and 44 are diagrams illustrating an embodiment of reference samples used to obtain a DC value in the case where the current block is a rectangular block.
Figure 44:
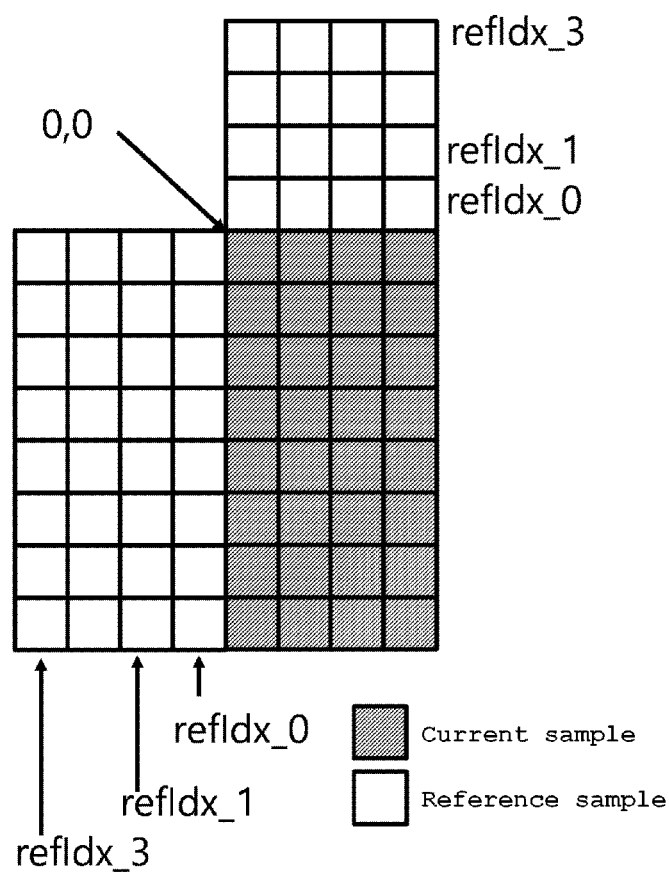

FIGS. 43 and 44 are diagrams illustrating an embodiment of reference samples used to obtain a DC value in the case where the current block is a rectangular block. If the height and the width of the current block are different from each other, a DC value of the current block may be obtained by the methods described with reference to FIGS. 8 to 31. For example, as shown in FIG. 43, if the length of the upper side is greater than the left side of the current block, a DC value of the current block may be obtained based on a reference sample set including reference samples on the upper side. If the reference line index is "refIdx", a DC value of the current block may be obtained based on reference samples on the upper side at the positions of x=0 . . . nTbW−1 and y=−1-refIdx.

As shown in FIG. 44, if the length of the left side is greater than the upper side of the current block, a DC value of the current block may be obtained based on a reference sample set including reference samples on the left side. If the reference line index is "refIdx", a DC value of the current block may be obtained based on the reference samples on the left side at the positions of x==−1-refIdx and y=0 . . . nTbH−1.

The above-described embodiments of the present invention can be implemented through various means. For example, embodiments of the present invention may be implemented by hardware, firmware, software, or a combination thereof.

For implementation by hardware, the method according to embodiments of the present invention may be implemented by one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, and the like.

In the case of implementation by firmware or software, the method according to embodiments of the present invention may be implemented in the form of a module, procedure, or function that performs the functions or operations described above. The software code can be stored in memory and driven by a processor. The memory may be located inside or outside the processor, and may exchange data with the processor by various means already known.

Some embodiments may also be implemented in the form of a recording medium including computer-executable instructions such as a program module that is executed by a computer. Computer-readable media may be any available media that may be accessed by a computer, and may include all volatile, nonvolatile, removable, and non-removable media. In addition, the computer-readable media may include both computer storage media and communication media. The computer storage media include all volatile, nonvolatile, removable, and non-removable media implemented in any method or technology for storing information such as computer-readable instructions, data structures, program modules, or other data. Typically, the communication media include computer-readable instructions, other data of modulated data signals such as data structures or program modules, or other transmission mechanisms, and include any information transfer media.

The above-mentioned description of the present invention is for illustrative purposes only, and it will be understood that those of ordinary skill in the art to which the present invention belongs may make changes to the present invention without altering the technical ideas or essential characteristics of the present invention and the invention may be easily modified in other specific forms. Therefore, the embodiments described above are illustrative and are not restricted in all aspects. For example, each component described as a single entity may be distributed and implemented, and likewise, components described as being distributed may also be implemented in an associated fashion.

The scope of the present invention is defined by the appended claims rather than the above detailed description, and all changes or modifications derived from the meaning and range of the appended claims and equivalents thereof are to be interpreted as being included within the scope of present invention.

The invention claimed is:

1. A non-transitory computer-readable medium storing a bitstream, the bitstream being decoded by a decoding method,
   wherein the decoding method, comprising:
   obtaining reference samples corresponding to a first side of a current block and reference samples corresponding to a second side of the current block based on reconstructed samples around the current block,
   wherein a length of the first side corresponding to a height of the current block and a length of the second side corresponding to a width of the current block are different from each other;
   obtaining a direct current (DC) value for prediction of the current block based on a reference sample set comprising at least some of the reference samples corresponding to the first side and the reference samples corresponding to the second side,
   wherein the reference sample set comprises $2^n$ reference samples, excluding some reference samples from the reference samples corresponding to the first side and the reference samples corresponding to the second side,
   wherein when the length of the first side is greater than the length of the second side, the reference samples corresponding to the first side are determined based on a line spaced apart by a specific interval from the first side indicated by a reference line index, and
   wherein when the length of the second side is greater than the length of the first side, the reference samples corresponding to the second side are determined based on a line spaced apart by the specific interval from the second side indicated by the reference line index; and
   reconstructing the current block based on the DC value.

2. The non-transitory computer-readable medium storing a bitstream of claim 1, wherein the reference sample set comprises $2^n$ reference samples, excluding as many as reference samples corresponding to the length of a shorter side of the first side and the second side from all of the reference samples corresponding to the first side and the reference samples corresponding to the second side.

3. The non-transitory computer-readable medium storing a bitstream of claim 2, wherein the reference sample set comprises reference samples corresponding to any one of the first side and the second side of the current block.

4. The non-transitory computer-readable medium storing a bitstream of claim 3, wherein the reference sample set comprises reference samples corresponding to a longer side of the first side and the second side.

5. The non-transitory computer-readable medium storing a bitstream of claim 3, wherein the reference sample set comprises remaining reference samples, excluding reference samples corresponding to the shorter side of the first side and the second side from the reference samples corresponding to the first side and the reference samples corresponding to the second side.

6. The non-transitory computer-readable medium storing a bitstream of claim 3, wherein the obtaining a DC value comprises:
   comparing the length of the first side with the length of the second side; and
   if the length of the first side is greater than the length of the second side as a result of the comparison, obtaining the DC value based on the reference sample set comprising the reference samples corresponding to the first side.

7. The non-transitory computer-readable medium storing a bitstream of claim 6, wherein the obtaining a DC value comprises, if the length of the first side is greater than the length of the second side, obtaining the DC value based on an average of the reference samples corresponding to the first side.

8. The non-transitory computer-readable medium storing a bitstream of claim 6, wherein the obtaining a DC value comprises obtaining the DC value based on a length of a longer side of the first side and the second side as a result of the comparison.

9. A video signal decoding device comprising a processor, wherein the processor is configured to:
obtain reference samples corresponding to a first side of a current block and reference samples corresponding to a second side of the current block based on reconstructed samples around the current block,
wherein a length of the first side corresponding to a height of the current block and a length of the second side corresponding to a width of the current block are different from each other;
obtain a direct current (DC) value for prediction of the current block based on a reference sample set comprising at least some of the reference samples corresponding to the first side and the reference samples corresponding to the second side,
wherein the reference sample set comprises $2^n$ reference samples, excluding some reference samples from the reference samples corresponding to the first side and the reference samples corresponding to the second side,
wherein when the length of the first side is greater than the length of the second side, the reference samples corresponding to the first side are determined based on a line spaced apart by a specific interval from the first side indicated by a reference line index, and
wherein when the length of the second side is greater than the length of the first side, the reference samples corresponding to the second side are determined based on a line spaced apart by the specific interval from the second side indicated by the reference line index; and
reconstruct the current block based on the DC value.

10. The video signal decoding device of claim 9, wherein the reference sample set comprises $2^n$ reference samples, excluding as many as reference samples corresponding to the length of a shorter side of the first side and the second side from all of the reference samples corresponding to the first side and the reference samples corresponding to the second side.

11. The video signal decoding device of claim 10, wherein the reference sample set comprises reference samples corresponding to any one of the first side and the second side of the current block.

12. The video signal decoding device of claim 11, wherein the reference sample set comprises reference samples corresponding to a longer side of the first side and the second side.

13. The video signal decoding device of claim 11, wherein the reference sample set comprises remaining reference samples, excluding reference samples corresponding to the shorter side of the first side and the second side from the reference samples corresponding to the first side and the reference samples corresponding to the second side.

14. The video signal decoding device of claim 11, wherein the processor is configured to:

compare the length of the first side with the length of the second side; and
if the length of the first side is greater than the length of the second side as a result of the comparison, obtain the DC value based on the reference sample set comprising the reference samples corresponding to the first side.

15. The video signal decoding device of claim 14, wherein the processor is configured to obtain the DC value based on an average of the reference samples corresponding to the first side if the length of the first side is greater than the length of the second side.

16. The video signal decoding device of claim 14, wherein the processor is configured to obtain the DC value based on a length of a longer side of the first side and the second side as a result of the comparison.

17. A video signal encoding device comprising a processor, wherein the processor is configured to:
obtain reference samples corresponding to a first side of a current block and reference samples corresponding to a second side of the current block based on reconstructed samples around the current block,
wherein a length of a first side corresponding to a height of the current block and a length of a second side corresponding to the width of the current block are different from each other,
obtain a direct current (DC) value for prediction of the current block based on a reference sample set comprising at least some of the reference samples corresponding to the first side and the reference samples corresponding to the second side,
wherein the reference sample set comprises $2^n$ reference samples, excluding some reference samples from the reference samples corresponding to the first side and the reference samples corresponding to the second side,
wherein when the length of the first side is greater than the length of the second side, the reference samples corresponding to the first side are determined based on a line spaced apart by a specific interval from the first side indicated by a reference line index, and
wherein when the length of the second side is greater than the length of the first side, the reference samples corresponding to the second side are determined based on a line spaced apart by the specific interval from the second side indicated by the reference line index,
generate a prediction block of the current block based on the DC value,
obtain a residual signal of the current block based on the prediction block, and
generate a bitstream comprising the residual signal of the current block.

18. The video signal encoding device of claim 17, wherein the reference sample set comprises $2^n$ reference samples, excluding as many as reference samples corresponding to the length of a shorter side of the first side and the second side from all of the reference samples corresponding to the first side and the reference samples corresponding to the second side.

19. The non-transitory computer-readable medium storing a bitstream of claim 1,
wherein when the length of the first side is greater than the length of the second side, the reference samples corresponding to the first side are determined as a plurality of samples corresponding to the line indicated by the reference line index, and the plurality of samples are composed of samples located in same rows as rows corresponding to the height of the current block, wherein when the length of the second side is greater than the length of the first side, the reference samples corresponding to the second side are determined a plurality of samples corresponding to the line indicated by the reference line index, and the plurality of samples are composed of samples located in same columns as columns corresponding to the width of the current block.

20. The non-transitory computer-readable medium storing a bitstream of claim 19, wherein a coordinate for a top-left sample of the current block is (0, 0), wherein when the length of the first side is greater than the length of the second side, the plurality of samples have coordinates (−1—the reference line index, y), where y=0, . . . , the length of the first side=− 1, wherein when the length of the second side is greater than the length of the first side, the plurality of samples have coordinates (x, −1—the reference line index), where x=0, . . . , the length of the second side=− 1.

\* \* \* \* \*